US012330307B2

(12) United States Patent
Lovett et al.

(10) Patent No.: US 12,330,307 B2
(45) Date of Patent: Jun. 17, 2025

(54) ROBOT WITH LINEAR 7TH AXIS

(71) Applicant: Dexterity, Inc., Redwood City, CA (US)

(72) Inventors: Andrew Lovett, Burlingame, CA (US); Zhouwen Sun, San Mateo, CA (US); Matthew Rodolfo Molina, San Francisco, CA (US); Robert Holmberg, Mountain View, CA (US); Derek Pan, Palo Alto, CA (US)

(73) Assignee: Dexterity, Inc., Redwood City, CA (US)

( * ) Notice: Subject to any disclaimer, the term of this patent is extended or adjusted under 35 U.S.C. 154(b) by 216 days.

(21) Appl. No.: 17/993,595

(22) Filed: Nov. 23, 2022

(65) Prior Publication Data

US 2023/0092900 A1 Mar. 23, 2023

Related U.S. Application Data

(63) Continuation of application No. 17/716,433, filed on Apr. 8, 2022, now Pat. No. 11,571,812.

(Continued)

(51) Int. Cl.
*B25J 9/16* (2006.01)
*G05B 19/4155* (2006.01)

(52) U.S. Cl.
CPC ........ *B25J 9/1661* (2013.01); *G05B 19/4155* (2013.01); *G05B 2219/40269* (2013.01); *G05B 2219/50391* (2013.01)

(58) Field of Classification Search
CPC . B25J 9/1661; B25J 5/005; B25J 5/007; B25J 5/02; B25J 5/04; B25J 9/0093;

(Continued)

(56) References Cited

U.S. PATENT DOCUMENTS

| 3,449,977 A | 6/1969 | Benjamin |
| 3,828,622 A | 8/1974 | Neff |

(Continued)

FOREIGN PATENT DOCUMENTS

| JP | 2000194412 | 7/2000 |
| JP | 2009028871 | 2/2009 |

(Continued)

OTHER PUBLICATIONS

Lisa Eitel. Designing (seventh-axis) linear motion tracks for robotic positioning. May 2, 2016 (May 2, 2016). [retrieved on Jun. 9, 2022]. Retrieved from the Internet: <URL: https://www.linearmotiontips.com/designing-linear-motion-tracks-robotic-positioning/> entire document.

(Continued)

*Primary Examiner* — Abby Y Lin
*Assistant Examiner* — Esvinder Singh
(74) *Attorney, Agent, or Firm* — Van Pelt, Yi & James LLP

(57) ABSTRACT

The present application discloses a robotic control system, and a method and a computer system for controlling a robot. The robotic control system includes a memory and one or more processors coupled to the memory. The memory is configured to store configured to store a model of a robot having a plurality of axes of control including at least a linear axis and one or more rotational axes. The one or more processors are configured to use the model to control the robot to perform a task, including by sending to the robot a set of control signals to cause the robot to move with respect to two or more of said axes of control including at least the linear axis.

20 Claims, 17 Drawing Sheets

Related U.S. Application Data

(60) Provisional application No. 63/175,787, filed on Apr. 16, 2021.

(58) Field of Classification Search
CPC . B25J 9/162; B25J 9/1602; B25J 9/163; B25J 9/1641; B25J 9/1656; B25J 9/1664; B25J 9/1679; B25J 11/0095; B25J 9/103; B25J 9/1035; B25J 9/1697; G05B 2219/32423; G05B 2219/36039; G05B 2219/37447; G05B 2219/39125; G05B 2219/39159; G05B 2219/39174; G05B 2219/40113; G05B 2219/40114; G05B 2219/40115; G05B 2219/40419; G05B 2219/40487; G05B 2219/40518; G05B 2219/40629; G05B 19/4155; G05B 2219/40269; G05B 2219/50391; G05B 2219/41032; G05B 2219/45063; G05B 2219/50393; F16H 19/04; F16H 55/28
See application file for complete search history.

(56) References Cited

U.S. PATENT DOCUMENTS

| | | | |
|---|---|---|---|
| 4,072,301 | A | 2/1978 | Brouwer |
| 4,550,626 | A | 11/1985 | Brouwer |
| 4,687,361 | A | 8/1987 | Kikuchi |
| 9,821,458 | B1 | 11/2017 | Watts |
| 10,399,778 | B1 | 9/2019 | Shekhawat |
| 2009/0320630 | A1 | 12/2009 | Bayer |
| 2013/0131865 | A1 | 5/2013 | Yamane |
| 2016/0288324 | A1 | 10/2016 | Bradski |
| 2018/0107175 | A1 | 4/2018 | Ha |
| 2018/0333868 | A1 | 11/2018 | Tanaka |
| 2018/0354136 | A1 | 12/2018 | Carlisle |
| 2019/0070734 | A1* | 3/2019 | Wertenberger ...... B25J 15/0616 |
| 2020/0030995 | A1 | 1/2020 | Lu |
| 2020/0086485 | A1* | 3/2020 | Johnson ................ B25J 9/1682 |
| 2020/0115169 | A1 | 4/2020 | Condon |
| 2020/0254610 | A1 | 8/2020 | Maier |
| 2020/0269429 | A1 | 8/2020 | Chavez |
| 2021/0046655 | A1 | 2/2021 | Deyle |
| 2021/0069910 | A1 | 3/2021 | Oleynik |
| 2021/0094188 | A1 | 4/2021 | Rodionov |
| 2021/0129328 | A1 | 5/2021 | Pipe-Mazo |
| 2021/0276197 | A1* | 9/2021 | Ye ............................ B25J 13/08 |
| 2021/0316440 | A1 | 10/2021 | Peterson |
| 2022/0048707 | A1* | 2/2022 | Matl ..................... B65G 1/1373 |
| 2022/0161424 | A1 | 5/2022 | Guo |
| 2022/0163762 | A1 | 5/2022 | Lavine |
| 2022/0270198 | A1* | 8/2022 | Han ...................... H04N 23/90 |

FOREIGN PATENT DOCUMENTS

| | | |
|---|---|---|
| JP | 2019188580 | 10/2019 |
| TW | 201121737 | 7/2011 |
| WO | 2013027283 | 2/2013 |
| WO | 2017197170 | 11/2017 |

OTHER PUBLICATIONS

Zhang et al., A Task-Priority Coordinated Motion Planner Combined with Visual Servo for Mobile Manipulator, 2019 IEEE/ASME International Conference on Advanced Intelligent Mechatronics (AIM), Jul. 8-12, 2019, pp. 7-12.

* cited by examiner

"reach space" of a 6-axis robot from given position along linear track

300

"reach space" of a 7-axis robot from same position

350

1

ROBOT WITH LINEAR 7TH AXIS

CROSS REFERENCE TO OTHER APPLICATIONS

This application is a continuation of U.S. patent application Ser. No. 17/716,433, entitled ROBOT WITH LINEAR 7TH AXIS filed Apr. 8, 2022 which is incorporated herein by reference for all purposes, which claims priority to U.S. Provisional Application No. 63/175,787, entitled ROBOT WITH LINEAR 7TH AXIS filed Apr. 16, 2021 which is incorporated herein by reference for all purposes.

BACKGROUND OF THE INVENTION

In certain warehouse and similar operations, a set of tasks sometimes referred to herein as "line kitting" may be performed to assemble stacked trays of items for further distribution, such as delivery to a retail point of sale. Stacks of trays containing the same type of item may be received, and trays may be drawn from different homogeneous stacks each having trays of items of a corresponding type to assemble a mixed stack of trays, e.g., to be sent to a given destination.

For example, a bakery may bake different types of products and may fill stackable trays each with a corresponding homogeneous type of product, such as a particular type of bread or other baked good. Stacks of trays may be provided by the bakery, e.g., to a distribution center. One stack may include trays holding loaves of sliced white bread, another may have trays holding loaves of whole wheat bread, still another tray holding packages of blueberry cupcakes, etc. Trays may be drawn from the various stacks to assemble a (potentially) mixed stack of trays. For example, a stack of six trays of white bread, three trays of whole wheat, and one tray of blueberry cupcakes may be assembled, e.g., for delivery to a retail store.

While the above example involves trays of different types of baked good, in other line kitting operations stackable trays may hold other products.

In a typical approach, trays are handled by human workers. The trays may include handholds to enable a human worker to grasp and move trays, e.g., by placing the workers hand on or in the handhold. Such work by human workers may cause fatigue or injuries, may take a lot of time to complete, and could be error prone.

BRIEF DESCRIPTION OF THE DRAWINGS

Various embodiments of the invention are disclosed in the following detailed description and the accompanying drawings.

DETAILED DESCRIPTION

Figure 1A:
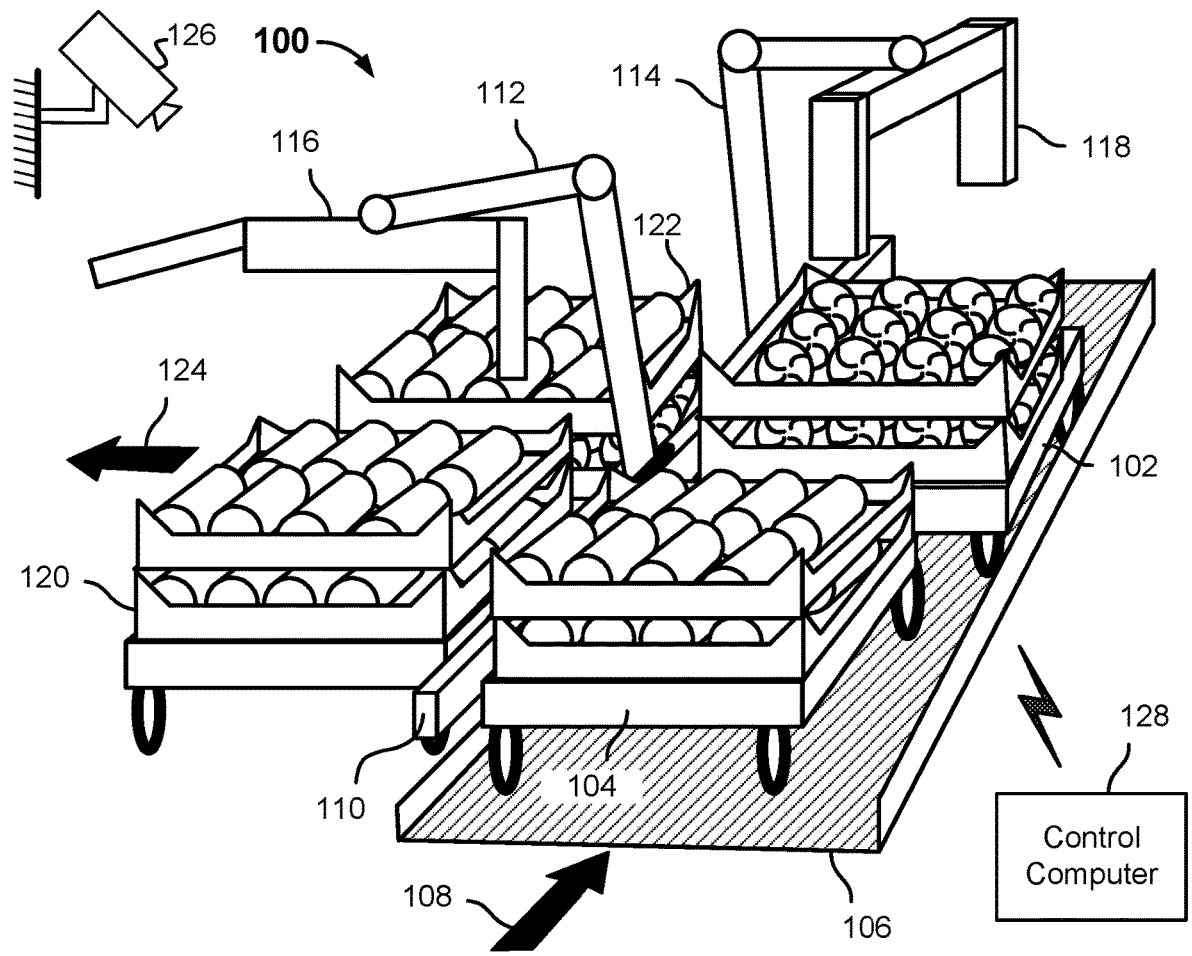
FIG. 1A is a block diagram illustrating a robotic line kitting system according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, palletization of an item or a set of items includes picking an item from a source location, such as a conveyance structure, and placing the item on a pallet such as on a stack of items on the pallet.

As used herein, depalletization includes picking an item from a pallet, such as from a stack of items on the pallet, moving the item, and placing the item at a destination location such as a conveyance structure.

As used herein, singulation of an item includes picking an item from a source pile/flow and placing the item on a conveyance structure (e.g., a segmented conveyor or similar conveyance). Optionally, singulation may include sortation of the various items on the conveyance structure such as via singly placing the items from the source pile/flow into a slot or tray on the conveyor.

As used herein, kitting includes the picking of one or more items/objects from corresponding locations and placing the one or more items in a predetermined location in a manner that a set of the one or more items correspond to a kit.

As used herein, a vehicle means a cart, a trolley, a dolly, carriage, wagon, pallets, or other structure configured to hold or support one or more items such as trays (e.g., a stack of trays).

Various embodiments include a robotic system. The robotic system includes a communication interface, and one or more processors coupled to the communication interface. The one or more processors are configured to receive sensor data via the communication interface, and use the sensor data to determine and implement a strategy to control an n-axis robot to perform a task with respect to an item. The strategy is determined at least in part by taking into consideration the n axes of the robot and one or more additional axes. The strategy includes a set of one or more commands to maneuver the robot with respect to at least a subset of the n axes of the robot and the one or more additional axes to perform the task with respect to the item. In some embodiments, the robotic system further comprises a memory that is configured to store data such as the strategy or plan to perform the task, a model for controlling the robot to perform one or more tasks, etc.

Various embodiments include a robotic control system. The robotic control system includes a memory and one or more processors. The memory is configured to store a model of a robot having a plurality of axes of control including at least a linear axis and one or more rotational axes. The one or more processors are configured to use the model to control the robot to perform a task, including by sending to the robot a set of control signals to cause the robot to move with respect to two or more of said axes of control including at least the linear axis.

Various embodiments include a robot. The robot includes (i) a plurality of motors each associated with a corresponding one of a plurality of axes of control of the robot, the axes of control including at least a linear axis and one or more rotational axes, (ii) a plurality of motor controllers each associated with one of the motors, (iii) a communication interface, and (iv) a processor coupled to the motor controllers and the communication interface, the processor being configured to receive via the communication interface a set of control signals to cause the robot to move in a specific manner with respect to each of two or more of said axes of control, including at least the linear axis, and to send commands to corresponding ones of the motor controllers to control the motors to cause the robot to move in the specific manner.

Various embodiments include a mechanism to adjust backlash in a rack and pinion powertrain assembly. The mechanism includes (i) a mounting frame having an opening defined therein to receive an operative end of a drive assembly, the operative end of the drive assembly having a power-driven pinion mounted on or near a distal end of the operative end of the drive assembly, the drive assembly including a mounting flange that is larger than the opening, and the mounting frame and mounting flange including complementary sets of holes each set including a hole in the mounting frame and a corresponding hole in the mounting flange, (ii) a shoulder fastener positioned through a first complementary set of holes at a first end of the mounting flange to movably couple the mounting flange to the mounting frame, the fastener being fastened in a manner such that the mounting flange and drive assembly have freedom to pivot about a longitudinal axis of the first complementary set of holes, and (iii) an adjustable length coupling device having a first end coupled mechanically to the mounting plate and a second end coupled mechanically to the mounting flange at a location substantially opposite the first end of the mounting flange, wherein the first end of the adjustable length coupling device is coupled to the mounting plate and the second end of the adjustable length coupling device is coupled to the mounting flange such that adjustment of the length of the coupling device causes the mounting flange and components of the drive assembly attached directly or indirectly to the mounting flange to rotate about said longitudinal axis of the first complementary set of holes resulting in a corresponding adjustment to the backlash of the rack and pinion powertrain assembly.

Various embodiments include a method, or computer program product embodied in a non-transitory computer readable medium and comprising computer instructions for, controlling a robot with respect to n-axes and one or more additional axes. The method includes (i) receiving, by one or more processors, sensor data via a communication interface, and (ii) using the sensor data to determine and implement a strategy to control an n-axis robot to perform a task with respect to an item. The strategy is determined at least in part by taking into consideration the n axes of the robot and one or more additional axes. The strategy includes a set of one or more commands to maneuver the robot with respect to at least a subset of then axes of the robot and the one or more additional axes to perform the task with respect to the item. In some embodiments, the task comprises grasping, moving, and placing the item.

Related art robotic systems generally implement a 6-axis robot. The 6-axes of such a robot includes (i) a first axis corresponding to a rotation of the robot around a base, (ii) a second axis corresponding to movement of a lower arm of the robot in a forward and backward direction, (iii) a third axis corresponding to movement to raise an upper arm of the robot, (iv) a fourth axis corresponding to rotation of the upper arm of the robot, (v) a fifth axis corresponding to a movement to raise a wrist of the robot, and (vi) a sixth axis corresponding to rotation of the wrist of the robot. Related art systems use such 6-axis robots in a fixed position within a workspace. Movement with respect to each of the 6-axes is controlled by one or more motors (e.g., servo motors, etc.). In some implementations, related art 6-axis robots may be mounted on a rail that carries the robot to a position at which the robot stops and performs a task while in a static position relative to the rail. For example, a robot is moved along a rail to a position at which a task is to be performed, the robot stops at such position, and performs the task in a fixed position relative to the rail.

When a 6-axis robot is positioned at a workspace, the robot generally operates within an oblong-shaped area around the working area at which robot is positioned to perform a task (e.g., a task with respect to an item within the working area, such as to grasp, move, and place the item). For example, the robot has an ovoid area within which the robot is able to operate when positioned at the working area. The oblong-shaped area (e.g., the ovoid) defines a solution space of possible locations at which the end effector, or the item grasped by the end effector, can be moved (e.g., a set of locations that can be at least part of a trajectory of the end effector or item grasped by the end effector). However, related art systems in which the robot operates in a fixed position to perform the task have a sub-optimal set of solutions within the oblong-shaped area (e.g., the ovoid) with respect to locations at which the end effector, or item grasped by the end effector, can be moved. For example, the oblong-shaped area (e.g., the ovoid) comprises certain locations at which the end-effector cannot be moved such as because of constraints of the robot joints (e.g., constraints with respect to angles at which the joints can be positioned). As another example, the oblong-shaped area (e.g., the ovoid) comprises certain locations at which movement of the robot is inefficient or otherwise awkward.

Various embodiments implement a robot that is controlled to move within one or more additional dimensions while performing a task. Controlling the robot to move within the one or more additional dimensions allows the robot to operate (e.g., move the end effector or item grasped by the end effector) within the oblong-shaped area (e.g., the ovoid) around the base of the robot. According to various embodiments, the entire oblong-shaped area (e.g., the ovoid) corresponding to the working area is available as a solution space for possible locations at which the end effector, or the item grasped by the end effector, can be moved (e.g., a set of locations that can be at least part of a trajectory of the end effector or item grasped by the end effector). For example, in contrast to related art systems that use a robot fixed at a particular location in a working area during performing a task and thereby having certain locations within the oblong-shaped area (e.g., the ovoid) corresponding to the working area which are not comprised in the solution space (e.g., because of the constraints of the robot joints, or inefficient or awkward positioning of the robot), various embodiments control the robot to move within one or more additional axes to facilitate the robot to operate in such certain locations that are excluded from the solution space of the working area for a related art system. Various embodiments store a mapping of positioning of the robot with an indication of whether such corresponding positioning of the robot is inefficient or awkward. The system can control the robot to avoid positioning the robot or operating the robot in a position that is inefficient or awkward. In some embodiments, the system stores a cost function associated with movement/positioning of the robot. In some embodiments, the cost function indicates a higher cost to perform a task using an awkward pose of the robotic arm of the robot (e.g., positioning/orientation of the robot). In some embodiments, the cost function indicates a speed or efficiency to perform a task based on various combinations of movement along a linear and one or more other axes (e.g., rotational axes). The cost function can restrict solutions to those that satisfy a threshold for minimum likelihood of success in performing the task.

In some embodiments, the robotic system dynamically uses a 7th axis to implement a task. The robotic system comprises a 6-axis robot mounted on a carriage that traverses a guide rail (e.g., a linear track, etc.). In connection with implementing a task within a working area, the robotic system controls to move the robot along a dimension corresponding to the guide rail. Such control of the robot to move during implementation of a task allows for all locations within the oblong area around the working area to be included in the solution space of possible locations (e.g., possible locations of the end effector or item grasped by the end effector as the item end effector or item is moved through the working area).

According to various embodiments, the robotic system determines to perform a task with respect to an item. In response to determining to perform the task with respect to the item, the robotic system controls the robot to position the robot within the working area. For example, the robotic system controls to move the robot along a rail to the working area. In some embodiments, the robotic system obtains a plan and/or strategy for performing the task with respect to the item. As an example, the robotic system determines the plan and/or strategy based at least in part on a model of the working area and/or the item (e.g., one or more attributes associated with the item). The system determines whether to move the robot along the rail (e.g., along the 7th axis), to enable the robot to grasp, move, and/or place the item most efficiently, such as by using optimal poses and efficient movements etc. As an example, control of the robot to move within one or more additional axes gives the robot the ability to always pick and place items from optimal poses.

According to various embodiments, one or more additional axes (e.g., an axis in addition to the 6-axis of a 6-axis robot) is fully integrated and a degree of freedom within robot control. In various embodiments, a robot with a $7^{th}$ linear degree of freedom integrated into its control, as disclosed herein, is disposed on a rail or other linear conveyance. The robot may be positioned initially along the rail to a location near a next task (e.g., a working area), then controlled within 7 degrees of freedom, including the linear degree, to perform tasks as disclosed herein, e.g., using rapid repositioning along the linear DOF to enable the robot to avoid suboptimal poses and otherwise operate with optimized speed and efficiency.

Various embodiments include a stiff and secure mounting position or structure for the robot. The mounting position and/or adjustment of a backlash arising from a powertrain assembly enable the robotic system to implement tasks at relatively high speeds and accelerations. For example, the limiting of backlash in the powertrain assembly and the secure mounting position or structure allows the robotic system to move the robot along the rail at relatively high speeds and accelerations, such as while the robot has an item grasped and in connection with implementing a task with respect to such item.

Various embodiments improve the efficiency and effectiveness of using a robotic system to implement a task with respect to an item in a working area. An n-axis robot can be moved within one or more additional axes (e.g., axes in addition to the n-axes of the n-axis robot), or uses one or more additional degrees of freedom, to implement a task with respect to an item. According to various embodiments, implementing one or more additional axes with respect to which a robot moves enables a range of the robot to be increased, and a solution space for efficient (e.g., optimal) paths/trajectories and strategies for moving the item from a source location to a destination location.

In some embodiments, movement of the robot (e.g., the 6-axis robot) along the one or more additional axes extends (i) a reach of the robot along at least the one or more additional axes, and (ii) a range of vision of the system.

In some embodiments, the system (e.g., one or more processors) control the robot to move along at least one of the one or more additional axes while the robot has the item grasped.

FIG. 1A is a block diagram illustrating a robotic line kitting system according to related art. In the example shown, system 100 includes source tray stacks 102 and 104 moving along an input stack conveyance (e.g., conveyance 106) fed in this example from an input end (staging and loading area) 108. Each of the source tray stacks 102 and 104 in this example is shown to be stacked on a wheeled cart or chassis. In various embodiments, source tray stacks 102 and 104 may be pushed manually onto the conveyance 106, which may be a conveyor belt or other structure configured to advance the source tray stacks 102 and 104 through the workspace defined by conveyance 106. In some embodiments, the chassis or other base structure on which the source trays are stacked may be self-propelled. In some embodiments, source tray stacks 102 and 104 may be advanced through/by conveyance 106 under robotic control. For example, the speed and times at which the source tray stacks 102 and 104 are advanced by/through conveyance 106 may be controlled to facilitate efficient grasping of trays from the source tray stacks 102 and 104.

In the example shown, a single rail (e.g., rail 110) is disposed along one long side of the conveyance 106. In this example, two robots, one comprising robot 112 and another comprising robot 114, are mounted movably, independent of one another, on rail 110. For example, each robot 112, 114 may be mounted on a self-propelled chassis that rides along rail 110. In this example, each robot 112, 114 terminates with a tray handling end effector (e.g., end effector 116, 118).

The tray handling end effector (e.g., end effector 116, 118) is operated under robotic control to grasp one or more trays from a source tray stack 102, 104. As shown in FIG. 1A, each end effector 116, 118 includes a lateral member attached to the end of the robot 112, 114. A side member is mounted on each end of the lateral member. As shown, at least one of the side members is opened or closed under robotic control, in various embodiments, to enable a tray to be grasped (by closing the side member) or released (by opening the side member).

Each end effector 116, 118 includes one non-moving ("passive") side member and one movable ("active") side member. In this example, the movable or "active" side member swings open (position in which end effector 116 is shown), e.g., to enable the end effector to be placed in position to grasp one or more trays, and swings closed (position in which end effector 118 is shown), e.g., to complete a grasp of one or more trays. A robotic control system (e.g., a computer that controls robot 112, 114, such as control computer 128) controls the end effector to actuate the opening/closing of the end effector such as in connection with grasping or releasing a tray. The robotic control system controls the end effector based at least in part on image data of the workspace and/or one or more sensors comprised in (or connected to) the corresponding end effector. In some embodiments, the one or more sensors one or more sensors comprised in (or connected to) the corresponding end effector are configured to: (i) obtain information indicative of whether a gasping mechanism (e.g., an active member) of the end effector is in an open position or a closed position, (ii) obtain information indicative of an extent to which the grasping mechanism is open, (iii) obtain information indicative of when the tray (or end effector relative to the tray) is in a position at which the end effector is controlled to engage at least one side of the end effector (e.g., a passive member or a structure comprised on the passive member) with a hole, a recess, or the a comprised in a side of a tray (e.g., a tray being grasped), (iv) obtain information indicative of when the tray (or end effector relative to the tray) is in a position at which the end effector (e.g., a passive member or a structure comprised on the passive member) is engaged with the hole, the recess, or the handle comprised in the a side of a tray, and/or (v) obtain information indicative of whether the grasping mechanism is closed or otherwise engaged with the tray.

Each end effector 116, 118 includes on each side member one or more protrusions or similar structures of a size and shape such that the protrusion, etc., fits into and, in various embodiments, can be slid under robotic control into holes or other openings in the sides the tray(s) to be grasped. For example, in some embodiments, protrusions on the inner face of the side members, sometimes called "thumbs" herein, may be slotted into handholds (e.g., holes sized to accommodate a human hand) on opposite sides of a tray, as described and illustrated more fully below.

The respective robots 112, 114 are operated at the same time, fully autonomously, to pick trays from source tray stacks 102, 104 and place them on destination tray stacks, such as destination tray stacks 120, 122, in a destination tray stack assembly area on an opposite side of rail 110 from conveyance 106 and source tray stacks 102, 104. The destination tray stacks may be assembled, in various embodiments, according to invoice, manifest, order, or other information. For example, for each of a plurality of physical destinations (e.g., retail stores), a destination stack associated with that destination (e.g., according to an order placed by the destination) is built by selecting trays from respective source tray stacks 102, 104 and stacking them on a corresponding destination tray stack 120, 122. Completed destination tray stacks 120, 122 may be removed from the destination tray stack assembly area, as indicated by arrow 124, e.g., to be place on trucks, rail cars, containers, etc. for delivery to a further destination, such as a retail store.

Referring further to FIG. 1A, in the example shown in the system 100 includes a control computer 128 configured to communicate wirelessly with robotic elements comprising system 100, including in various embodiments one of more of conveyance 106; the wheeled chassis on which source tray stacks 102, 104 are stacked (if self-propelled); the robots 112, 114 and/or the respective chassis on which the robots 112, 114 are mounted on rail 110 (which may also be referred to herein as a guide rail); and the robotically controlled tray handling end effectors (e.g., end effector 116, 118). In various embodiments, the robotic elements are controlled by control computer 128 based on input data, such invoice, order, and/or manifest information, as well as input state information, such inventory data indicating which source tray stacks include which type and/or quantity of product.

According to various embodiments, robot 112 and robot 114 are n-axis robots. For example, robot 112 and robot 114 are 6-axis robots. Robots 112 and 114 are controlled to perform a task with respect to an item, such as a tray or an object on a tray, based on a solution space defined at least on the n-axis of the robot 112 and robot 114. N may be a positive integer. For example, control computer 128 determines a plan and/or strategy for performing the task (e.g., grasping the item from a source location, moving the item, and placing the item at a destination location, etc.). Control computer 128 determines a path or trajectory along which robot 112 and/or robot 114 moves (e.g., a trajectory of the corresponding end effector). In some embodiments, control computer 128 uses a model that is based at least in part on the corresponding n-axes of robot 112 and/or robot 114. For example, control computer 128 determines (e.g., selects) a plan/strategy (e.g., a path or trajectory) based on a set of constraints or solutions (e.g., the solution space). The set of constraints or solutions is based at least in part on the n-axes of robot 112 and/or robot 114. As an example, the n-axes of robot 112 and/or robot 114 help define a set of possible locations and/or possible configurations of robot 112 and/or robot 114. The set of possible locations and/or possible configurations can correspond to an oblong-shaped area (e.g., an ovoid), and locations within the oblong-shaped area can may be excluded from the set of possible locations and/or possible configurations because the robot is unable to position itself in the location or configuration because of constraints such as constraints of the robot joints, or because such locations or configurations do not satisfy a threshold such as an efficiency threshold (e.g., the robot has difficulty configuring itself in such a configuration, etc.). Control computer 128 can determine the plan based at least in part on determining an optimal plan (e.g., an optimal path). Control computer 128 can determine the plan based at least in part on determining a plan that satisfies one or more thresholds such as a maximum cost threshold (e.g., the cost can be determined according to a predefined cost function of the model, etc.). Various other thresholds can be implemented, such as an efficiency threshold, a time threshold, a speed threshold, etc.

According to various embodiments, control computer 128 dynamically controls robot 112 and/or robot 114 to use one or more additional axes (e.g., axes in addition to the n-axis of the robot) in connection with implementing a task (e.g., grasping, moving, placing an item, etc.). Control computer 128 determines the plan or strategy based at least in part on (i) the n-axes corresponding to the robot (e.g., robot 112 and/or robot 114), and (ii) one or more additional axes. For example, the model for determining a plan/strategy includes the possibility of the robot moving with respect to the one or more additional axes (e.g., the solution space includes locations or configurations that are made possible and/or are deemed efficient in view of movement of the robot in the one or more additional axes). With respect to the example illustrated in FIG. 1A, the one or more additional axes include a dimension (e.g., a 7th axis) defined based on rail 110. Robot 112 and/or robot 114 can be controlled to be translated along the direction defined by rail 110. Control computer 128 determines the strategy for implementing a task with respect to an item at least in part by taking into consideration the n axes of the robot and one or more additional axes. The strategy includes a set of one or more commands to maneuver the robot with respect to at least a subset of then axes of the robot and the one or more additional axes to perform the task with respect to the item.

In some embodiments, control computer 128 determines the strategy for implementing a task with respect to an item based at least in part on the one or more additional axes. For example, the control computer 128 extends the solution space for movement of robot 112 and/or robot 114 while implementing a task with respect to an item to include movement along rail 110. In connection with implementing the strategy to perform the task, control computer 128 can cause robot 112 and/or robot 114 to move along the dimension defined by rail 110 (e.g., the carriage on which the corresponding robot is mounted and traverses rail 110) as the task is being implemented. As an example, robot 112 and/or robot 114 is moved along the direction defined by rail 110 while an item is grasped to move the item along a path/ trajectory (e.g., a path or trajectory that may have been not possible or otherwise inefficient if the robot was not moved).

According to various embodiments, the system (e.g., control computer 128) determines the strategy for implementing the task with respect to an item based at least in part on a predefined cost function. The predefined cost function can be based at least in part on one or more of: (i) a time to perform the task, (ii) a likelihood that the task is successfully completed, (iii) an amount of energy required to perform the task (e.g., a load on one or more motors that operate the robot, etc.). The system uses the predefined cost function to select a strategy that efficiently performs the task. As an example, a strategy that is efficient to perform the task can include an optimal strategy among all possible strategies or a set of strategies determined with respect to the task. As another example, a strategy that is efficient to perform the task can include a strategy having a lowest cost among all possible strategies or a set of strategies determined with respect to the task. As another example, a strategy that is efficient to perform the task can include a strategy having a cost that satisfies one or more predefined criterion (e.g., a cost that is less than a predefined cost threshold, etc.). The predefined cost function can be extended to include solutions enabled by moving robot along the one or more additional axes, such as moving the robot along the rail within a threshold distance of the working area (e.g., to enable the robot to make use of the entire working area that was otherwise restricted based on joint constraints of the robot or inefficient poses/configurations of the robot).

In some embodiments, in response to determining that a task is to be implemented with respect to an item (e.g., that a tray is to be moved from a stack to a destination location), control computer 128 controls to move robot 112 to within proximity of the item (e.g., a source location or location at which the robot is to engage the item). For example, control computer 128 controls to move the robot to a working area. In some embodiments, the working area corresponds to an area (e.g., corresponding to a location of a base of the robot or carriage on which the robot is mounted) that is within a predefined distance of the item, or source location of the item. The predefined distance can be set by an administrator. The predefined distance can be determined based at least in part on a range of the corresponding robot. In connection with implementing the strategy to perform the task, control computer 128 controls to move robot 112 in the one or more additional dimensions such as along the direction defined by rail 110. Moving robot 112 in the one or more additional dimensions enables robot to use an efficient or optimal strategy for moving an end effector or item grasped by the end effector through the working area. In some embodiments, an extent to which the robot 112 is moved in the one or more additional dimensions during implementation of a task is constrained by one or more predefined thresholds. For example, control computer 128 controls to move robot 112 with respect to the one or dimensions up to an extent that robot remains within proximity of the source location or working area. In some embodiments, the model used to determine the strategy for implementing the task is based at least in more predefined thresholds with respect to which a robot may move in the one or more directions while the robot is implementing the task (e.g., after the robot has been moved to the working area, etc.).

Source tray stacks 102, 104 may be inserted into a gate or other ingress/control structure at the input end 108 of conveyance 106. Conveyance 106 may comprise an apparatus (stack mover) that moves the source tray stacks 102, 104 along the rail 110 to optimize throughput and minimize robot displacement, e.g., by minimizing how far and/or often the robot 112, 114 must be moved along rail 110 to grasp source trays and place them on respective destination stacks. The source tray stacks 102, 104 can come in with trays in different orientations/weights/and weight distribution. The system 100 uses force and moment control to operate robots 112, 114 to insert a thumb or other protrusion gently and securely into a tray and plans its motion and tray trajectory in order to not collide with itself or the environment. In various embodiments, each robot 112, 114 operates in a very tight space of roughly 2.5 m in width and has a very light footprint. The robot utilizes its full workspace and intelligently plans its motion optimizing its grasp and/or efficiency (e.g., time, collision avoidance, etc.) in de-stacking source tray stacks 102, 104. It recognizes the need to perform orientation changes and handles that accordingly while avoiding obstacles. The robot moves to the correct output (e.g., destination tray stack 120, 122) corresponding to the right customer while coordinating with the other robots on the rail 110. It then uses advanced force control and interactions with the environment to figure out a proper place strategy. The cycle then restarts.

In the example shown in FIG. 1A, the system 100 includes a 3D camera 126. In various embodiments, the system 100 may include a plurality of 3D (or other) cameras, such as camera 126, and may use image and depth data generated by such cameras to generate a three-dimensional view of at least relevant portions of the workspace and scene, such as the scene/state shown in FIG. 1A. In some embodiments, cameras such as camera 126 may be used to identify the contents of trays in source trays comprising a tray stack, e.g., by recognizing the size, shape, packaging, and/or labeling of such items, and/or by recognizing the shape, color, dimensions, or other attributes of the source stack trays themselves and/or by reading bar code, QR code, radio frequency tag, or other image or non-image based information on or emitted by the trays.

In various embodiments, image data generated by cameras such as camera 126 is used to move robotic arms and end effectors into a position near a tray or stack of two or more trays to be grasped and picked up from a source stack and/or to position the tray(s) near a destination at which they are to be place, e.g., at the top of a corresponding destination stack. In some embodiments, force control is used, as described more fully below, to complete the final phases of a pick/grasp episode and/or a placement episode.

Although a single camera (e.g., camera 126) mounted to a wall in the workspace of system 100 is shown in FIG. 1A, in various embodiments, multiple cameras or other sensors, or a combination thereof, may be mounted statically in a workspace. In addition, or instead, one or more cameras or other sensors may be mounted on or near each robot 112, 114, such as on the arm itself and/or on the end effector 116, 118, and/or on a structure that travels with the robot 112, 114 as it is moved along rail 110. In some embodiments, a superstructure comprising a vertical support and/or upper frame 1216 provides mounting locations for 3D cameras or other sensors. In various embodiments, one or more 3D cameras may be placed near the base of the robot. The vertical support can be coupled to, or integrated robot 112, 114. For example, the vertical support can be a chassis that is integrated with, or coupled to, robot 112, 114. Such a chassis can also attenuate or otherwise reduce a backlash of robot 112, 114 as robot 112, 114 is operating (e.g., moving an item) or as robot 112, 114 is moved along rail 110, etc.

Figure 1B:
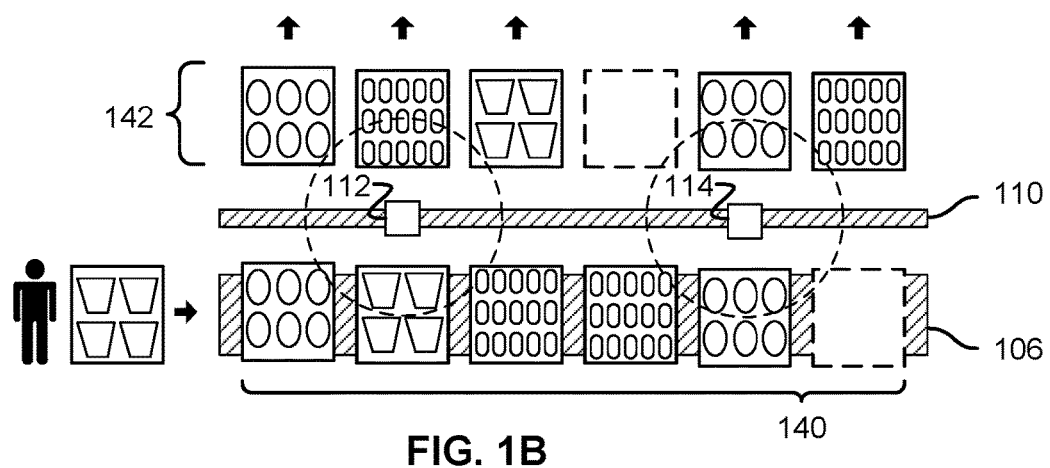
FIG. 1B is a block diagram illustrating a robotic line kitting system according to various embodiments.

FIG. 1B is a block diagram illustrating a robotic line kitting system according to related art. In FIG. 1B, an example is shown of an overhead view of a workspace in which the system 100 of FIG. 1A may operate. In the example shown, robots 112, 114 move along a common rail (e.g., rail 110), as in FIG. 1A, to access and pick trays from source stacks 140 moving along a conveyor (e.g., conveyance 106) and play trays on corresponding destination stacks 142 in the destination stack assembly area on the opposite side of rail 110 from the source stacks 140 and conveyance 106. In this example, a human worker manually feeds source stacks onto the conveyance 106, but in some embodiments a robotic worker performs all or part of that task, e.g., according to plan generated programmatically to fulfill a set of orders, each associated with a corresponding destination. As destinations stacks 142 are completed, they are moved out of the destination stack assembly area, as indicated by the arrows that the top of FIG. 1B, which corresponding to arrow 124 of FIG. 1A.

While in the example shown in FIGS. 1A and 1B the trays each contain only one type of item (e.g., object), in various embodiments and applications source and destination trays having mixes of items may be handled to assemble destination stacks of trays as disclosed herein. Similarly, while in the example shown in FIGS. 1A and 1B the source stacks of trays each contain only trays of the same type and content, in other embodiments and applications source tray stacks may include a mix of trays and/or item types. For example, the control computer 128 may be provided with information indicating which types of tray are in which position in each source tray stack, and may use that information, along with manifest or other information indicating the required contents of each destination tray stack, to build the required destination tray stacks by picking needed trays each from a corresponding position on a source tray stack and adding the tray to a corresponding destination stack.

Figure 2A:
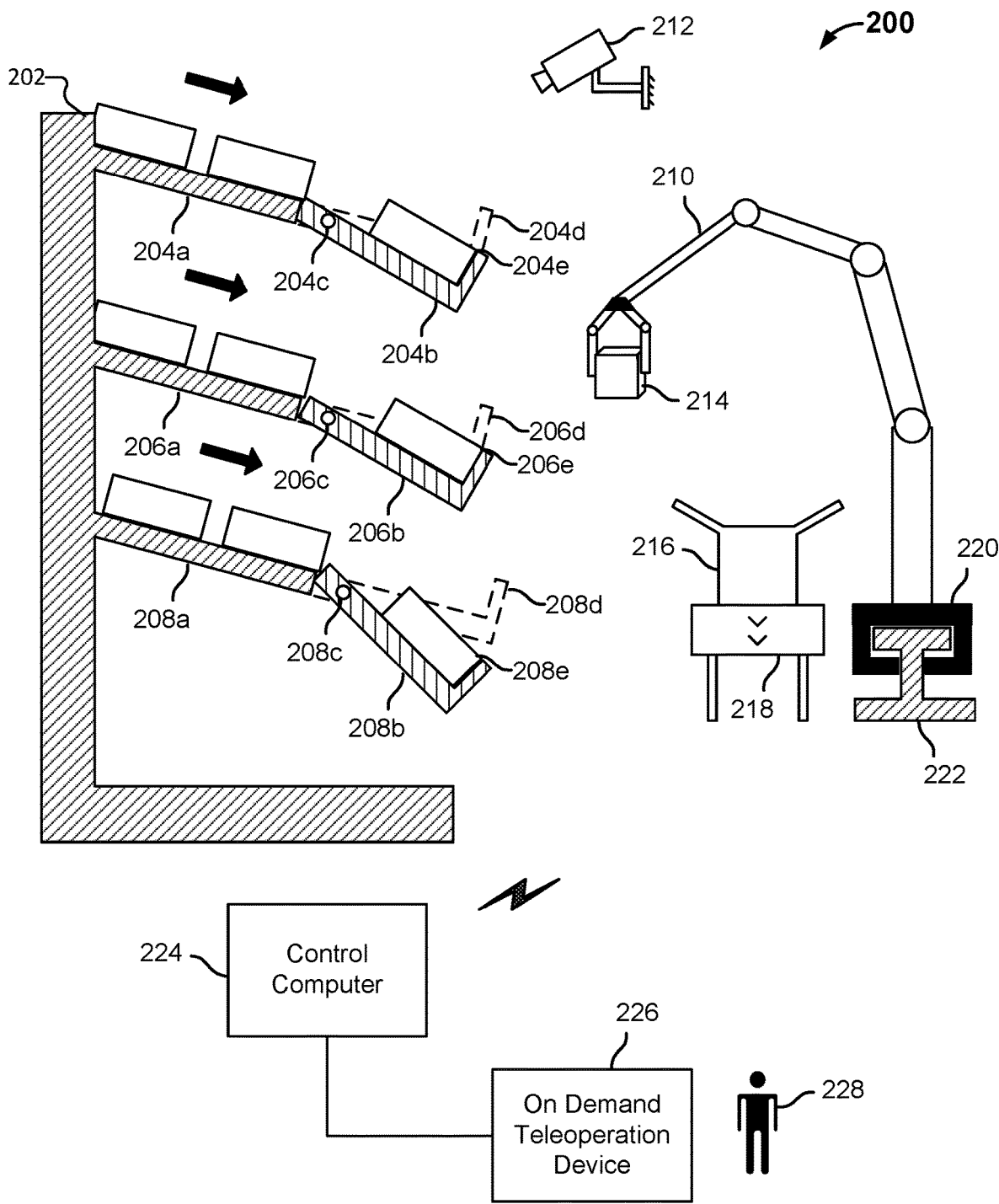
FIG. 2A is a block diagram illustrating a robotic line kitting system according to related art.

FIG. 2A is a block diagram illustrating a robotic line kitting system according to related art. In the example shown, kitting system 200 includes a kitting shelf system, such as kitting shelf system 202, and robot 210 (e.g., a robotic arm mounted on a carriage, etc.). In some embodiments, kitting system 200 corresponds to a kitting system described in U.S. patent application Ser. No. 17/219,503 and U.S. application Ser. No. 17/246,356, the entireties of which are hereby incorporated for all purposes. According to various embodiments, kitting shelf system 202 includes one or more shelves. Each of the one or more shelves comprises a presentation face (e.g., presentation face 204b, presentation face 206b, and/or presentation face 208b). The presentation face corresponds to an area or surface on which an item is disposed on the kitting shelf system. In connection with kitting of one or more items, robotic arm (also referred to herein as a robot) picks an item (or object from within an item) from at least one presentation face. Kitting shelf system 202 may include one or more feeder portions (e.g., feeder portion 204a, feeder portion 206a, and/or feeder portion 208a). In some embodiments, kitting shelf system 204 includes a gate structure (e.g., gate portion 204c, gate portion 206c, and/or gate portion 208c) that is configured to control conveyance of an item from a feeder portion to the corresponding presentation face. The gate structure may be coupled to, or integrated with, the presentation face.

In some embodiments, robot 210 is movable with respect to kitting system 200 and/or with respect to a conveyor or other location at which a receptacle is disposed. In the example shown in FIG. 2A, robot 210 is mounted on carriage 220, which is configured to ride along a rail or other linear guide (e.g., rail 222) disposed alongside and substantially parallel to the conveyor 218. As an example, the robot 210 may be mounted on a side opposite the kitting system 200. As an example, the robot 210 may be mounted on a same side as the kitting system 200. In some embodiments, one or more robots (e.g., robotic arms) are mounted on a same side of conveyor 218 as a kitting shelf system and one or more robots are mounted on a side of conveyor 218 that is opposing to kitting shelf system. In various embodiments, a motor, belt, chain, or other source of motive force is applied via a controller (not shown in FIG. 1) to move the carriage 220 and attached robot 210 along the rail or guide (e.g., rail 222) to facilitate the automated retrieval of items from one or more kitting shelf systems, and the placement of items (e.g., object 214) in receptacle 216 (e.g., a box, a tray, etc.) as the receptacle 216 is moved along conveyor 218. Control of robotic arm may be coordinated based at least in part on one or more items to be picked and placed in receptacle 216, a location of receptacle 216 (e.g., a predetermined location at which the item is to be kitted), and/or a path of receptacle 216 (e.g., based on a determined movement of conveyor 218).

In some embodiments, kitting system 200 includes control computer 224 and/or on operation teleoperation device 226. In the example shown, operation of kitting shelf system 202, conveyor 218; and robot 210, and/or carriage 220 are operated in a coordinated manner under the control of control computer 224. In the example shown, control computer 224 is in communication (e.g., wireless communication) with controllers, not shown in FIG. 2A, each configured to control operation of a corresponding element comprising kitting system 200, e.g., kitting shelf system 202; robot 210, conveyor 218, carriage 220, and/or receptacle source (not shown). Although wireless connections are shown in FIG. 2A, in various embodiments wired connections or a combination of wired and wireless connections may be used.

According to various embodiments, the gate structure permits or prevents an item to flow from a feeder portion to the presentation face. The control of flow of items from the feeder portion to the presentation face may prevent items from being cluttered on the presentation face and can assist with providing sufficient space and order of items on the presentation face for a robotic arm to pick and place an item/object from the presentation face. The gate structure may be configured to prevent/inhibit more than a threshold of items to be disposed on a presentation face at any particular time. In some embodiments, the gate structure is toggled (e.g., moved) between an open position and a closed position. As an example, the open position may correspond to an orientation of the gate structure when no item is present on the presentation face. As another example, the open position may correspond to an orientation of the gate structure when a quantity of items on the presentation of items is less than a threshold number of items. As another example, the open position may correspond to an orientation of the gate structure when a weight on (or force applied to) the presentation face is less than a threshold weight (or threshold force). When the gate structure is oriented in the open position, a flow or conveyance of an item from the feeder portion to the presentation face may be permitted (e.g., unblocked). Conversely, when the gate structure is oriented in the closed position, a flow or conveyance of an item from the feeder portion to the presentation face may be prevented (e.g., the flow of items is blocked). In the example illustrated in FIG. 2A, a portion of the presentation faces 204*b*, 206*b*, and/or 208*b* is used to block conveyance of items from the corresponding feeder portions 204*a*, 206*a*, and/or 208*a*; the corresponding gate portions 204*c*, 206*c*, and/or 208*c* may be hinges operatively coupled to presentation faces 204*b*, 206*b*, and/or 208*b*. In some embodiments, the gate structure is configured to move an element that is distinct from the corresponding presentation face in with moving to an open position and/or closed portion.

In some embodiments, the gate structure is mechanically operated (e.g., to move between the open position and the closed position) based at least in part on a weight (e.g., a weight of an item, if any) applied to the corresponding presentation face. The gate structure may include a biasing element that biases the gate structure to be oriented in the open position. If a force applied to the presentation face (e.g., corresponding to the weight of the item on the presentation face) exceeds the biasing of the gate structure, the gate structure may operate to orient in the closed position. In some embodiments, the gate structure is electromechanically operated. For example, the gate structure may receive a signal and based at least in part on the signal the gate structure may operate in a closed position or an open position. The signal may be provided by a computer, such as control computer 224. The signal to control the gate structure may be determined/provided based at least in part on information obtained by one or more sensors in the workspace. For example, image data obtained by camera 212 of kitting system 200 may be used in connection with determining whether to gate structure is to be oriented in the open position or closed position (e.g., based at least in part on a determination of whether an item is disposed on the corresponding presentation face). Information obtained by one or more other sensors may be used in connection with determining whether to control the gate structure is to be oriented in the open position or closed position. Examples of sensors that may be implemented to obtain such information include a weight sensor, a force sensor, a torque sensor, a pressure sensor, an infrared sensor, etc. The information used in connection with determining whether to control the gate structure to be oriented in the open position or closed position may be used to determine whether an item is on the corresponding presentation face, to determine whether an item(s) on the presentation face exceed a threshold value (e.g., a threshold weight, a threshold force), etc. As an example, a model of information obtained by the one or more sensors may be generated. The model may determine/define information that is indicative of whether an item is present on the presentation face, or whether a quantity of items present on the presentation face is less than a threshold quantity of items, etc. The control computer 224 may use the model to determine whether to control the gate structure to be oriented in the open position or the closed position. For example, in response to determining that an item is present on the presentation face, the control computer 224 may send a signal to the gate structure to cause the gate structure to move to a closed position (e.g., thereby preventing conveyance of further items to the presentation face).

As illustrated in FIG. 2A, a presentation face (e.g., presentation face 204*b*, presentation face 206*b*, and/or presentation face 208*b*) is movable. For example, the presentation face toggle between an empty position (denoted by 204*d*, 206*d*, and 208*d*) and an occupied position (denoted by 204*b*, 206*b*, and 208*b*). Although the example illustrated in FIG. 2A illustrates the presentation face toggling between two positions/orientations, the kitting shelf system 202 may be configured for the presentation face to be moved to orient in one of a plurality of positions/orientations. For example, the presentation face may be oriented in any one of the plurality of positions/orientations based at least in part on a context of the workspace (e.g., an item to be provided on the presentation face, a location of a robotic arm to pick the item, a size of the robotic arm, a location of a sensor or camera, etc.).

In various embodiments, the empty position corresponds to a position at which the presentation face is oriented to facilitate a flow/conveyance of one or more items from the feeder portion to the presentation face. For example, the empty position may correspond to a position at which the presentation face is oriented when a quantity of items on the presentation face is less than a threshold number. As another example, the empty position corresponds to a position at which the presentation face is oriented when the presentation face is empty (e.g., does not have any items disposed thereon). As another example, the empty position corresponds to a position at which the presentation face is oriented when a weight on (or force applied to) the presentation is less than a threshold weight (or threshold force). In some embodiments, each presentation face in a particular kitting shelf system (e.g., kitting shelf system 202) may have a same angle of orientation (e.g., such as an angle relative to a normal to the ground) when orientated in corresponding empty positions. In some embodiments, two or more presentation faces in a particular kitting shelf system (e.g., kitting shelf system 202) have different angles of orientation (e.g., such as an angle relative to a normal to the ground) when orientated in corresponding empty positions. As an example, a first set of one or more presentation faces has an angle of orientation that is different from an angle of orientation of a second set of one or more presentation faces. As another example, each presentation face within a particular kitting shelf system has a different angle of orientation (e.g., such as an angle relative to a normal to the ground) when orientated in a corresponding empty position. The shelves (e.g., at least one of the corresponding feeder portion and the kitting portion) on a kitting shelf system can be configured at different angles based on a height of the shelf relative to the ground. The configuring of shelves at different angles may permit a better line of sight for sensors in the workspace, such as camera 212, and such a configuration may improve the information pertaining to the workspace (e.g., identifiers on the items may be obtained more easily or accurately, etc.).

In some embodiments, a bottom shelf on which items are presented (e.g., a shelf from which an item may be obtained such as the shelf corresponding to feeder portion 208a) has a corresponding presentation face 208b that has less of a range of motion than presentation faces of higher shelves such as presentation face 204b and 206b. The presentation face on such a bottom shelf may be fixed relative to the feeder portion. For example, the presentation face on such a bottom shelf may be integrated with the feeder portion or not otherwise change positions relative to the feeder portion. Such a bottom shelf or the presentation face of such bottom shelf (e.g., presentation face 208b) may have a shallower pitch/angle than one or more higher shelves or of the presentation faces for the one or more higher shelves (e.g., presentation face 204b and/or 206b). In some embodiments, shelves (e.g., presentation faces of such shelves such as when an item is on the presentation face) has a progressively shallower pitch or angle the lower the shelf is on the kitting shelf system such as kitting system 200.

In various embodiments, the occupied position corresponds to a position at which the presentation face is oriented to facilitate picking of one or more items (e.g., by the robotic arm) from the presentation face. The presentation face may be oriented in the occupied position when conveyance/flow of one or more items from the feeder portion to the presentation face is to be prevented. In some embodiments, each presentation face in a particular kitting shelf system (e.g., kitting shelf system 202) may have a same angle of orientation (e.g., such as an angle relative to a normal to the ground) when orientated in corresponding empty positions. In some embodiments, two or more presentation faces in a particular kitting shelf system have different angles of orientation (e.g., such as an angle relative to a normal to the ground) when orientated in corresponding occupied positions. As an example, a first set of one or more presentation faces has an angle of orientation that is different from an angle of orientation of a second set of one or more presentation faces. As another example, each presentation face within a particular kitting shelf system has a different angle of orientation (e.g., such as an angle relative to a normal to the ground) when orientated in corresponding occupied positions. As illustrated in FIG. 2A, the shelves (e.g., at least one of the corresponding feeder portion and the kitting portion) on a kitting shelf system can be configured at different angles based on a height of the shelf relative to the ground. The configuring of shelves at different angles may permit a better line of sight for sensors in the workspace, such as camera 212, and such a configuration may improve the information pertaining to the workspace (e.g., identifiers on the items may be obtained more easily or accurately, etc.).

In some embodiments, the orientation of the presentation face may have a greater tilt downwards the lower the corresponding shelf is to the ground. Such an orientation of the presentation face may enhance one or more sensors (e.g., camera 212) to obtain information pertaining to the presentation shelf or one or more items/objects on the presentation face. In addition, such an orientation may enhance the ability of the robotic arm to engage an item with the end effector of the robotic arm. A robotic arm may have limitations with respect to its wrist extension capabilities/configurations and/or its wrist flexion capabilities/configurations. As an example, the orientation of the presentation face (e.g., at least in the occupied position) is configured based at least in part on an extent of wrist extension that is required by a robotic arm to pick the item/object from the presentation face). The shelf/presentation face may be configured based at least in part on the range of motion of a wrist of a robotic arm in the kitting shelf system (e.g., a range of motion with respect to wrist extension/flexion). An end effector or wrist component of the robotic arm may have size limitations that inhibit the ability of the robotic arm to engage (e.g., at certain angles and heights/locations) an item disposed on a presentation face. Accordingly, the orientation of the presentation face (e.g., at least in an occupied position) of a shelf may be configured to improve the likelihood/ability of the robotic arm to configure its position to engage an item/object on the presentation face with an end effector of the robotic arm at an orthogonal relative to the item/object. The orientation of the presentation face when in the occupied position can correspond to an orientation in which a tray/item disposed thereon is optimally angled (at each level/shelf) for a better vision from an onboard camera (e.g., a camera disposed in the workspace and/or on a robotic arm or chassis thereof). In some embodiments the orientation of the presentation face in the empty position and/or occupied position is based at least in part on a configuration of the corresponding gate structure. For example, if the gate structure is a hinge, the orientation of the presentation face in the empty position and/or occupied position is based at least in part on a range of motion of the hinge.

According to various embodiments, kitting shelf system 202 includes one or more feeder portions (e.g., 204a, 206a, and/or 208a). In some embodiments, the kitting shelf system 202 may have a single feeder portion that conveys one or more items to a plurality of presentation faces. In other embodiments, as illustrated in FIG. 2A, the kitting shelf system 202 has a single feeder portion for each presentation face (e.g., a one-to-one mapping of feeder portions to presentation faces). The feeder portion may be configured to convey an item to a presentation face. As an example, the conveyance of the item may be passive such as via gravity acting on an item disposed on the feeder portion (e.g., in the case that the feeder portion is configured to tilt towards the presentation face). As another example, the conveyance of the item may be at least partially active based on the feeder portion being configured with a conveyor that carries an item from an input location of the feeder portion to the presentation face. In various embodiments, the feeder portion configured to receive a succession of items on a receiving end (e.g., an input to the feeder portion) and convey the items to a destination end (e.g., an end that is operatively connected/coupled to a presentation face or that otherwise exits the feeder portion to the applicable presentation face). The succession of items may be manually loaded to the feeder portion or kitting shelf system (e.g., via a human operator 228), or the succession of items may be automatically loaded to the feeder portion (e.g., via a robotic arm/component, or based at least in part on the feeder portion being coupled to a chute that conveys items from a source flow/pile).

According to various embodiments, control computer 224 dynamically controls robot 210 to use one or more additional axes (e.g., axes in addition to the n-axis of the robot) in connection with implementing a task (e.g., grasping, moving, placing an item, etc.). Control computer 224 determines the plan or strategy based at least in part on (i) the n-axes corresponding to robot 210, and (ii) one or more additional axes. For example, the model for determining a plan/strategy includes the possibility of the robot moving with respect to the one or more additional axes (e.g., the solution space includes locations or configurations that are made possible and/or are deemed efficient in view of movement of the robot in the one or more additional axes). With respect to the example illustrated in FIG. 2A, the one or more additional axes include a dimension (e.g., a 7th axis) defined based on rail 222. Robot 210 can be controlled to be translated along the direction defined by rail 222. Control computer 224 determines the strategy for implementing a task with respect to an item at least in part by taking into consideration the n axes of the robot and one or more additional axes. The strategy includes a set of one or more commands to maneuver the robot with respect to at least a subset of the n axes of the robot and the one or more additional axes to perform the task with respect to the item.

In some embodiments, control computer 224 determines the strategy for implementing a task with respect to an item based at least in part on the one or more additional axes. For example, control computer 224 extends the solution space for movement of robot 210 while implementing a task with respect to an item to include movement along rail 222. In connection with implementing the strategy to perform the task, control computer 224 can cause robot 210 to move along the dimension defined by rail 222 (e.g., the carriage on which the corresponding robot is mounted to traverse rail 222) as the task is being implemented. As an example, robot 210 is moved along the direction defined by rail 222 while an item is grasped to move the item along a path/trajectory (e.g., a path or trajectory that may have been not possible or otherwise inefficient if the robot was not moved).

In various embodiments, a robotic system as disclosed herein includes and/or does one or more of the following, e.g., by operation of a control computer such as control computer 224:

Computer vision information is generated by merging data from multiple sensors, including one or more of 2D cameras, 3D (e.g., RGBD) cameras, infrared, and other sensors to generate a three-dimensional view of a workspace that includes one or more kitting shelf systems (which may correspondingly include one or more shelves of the kitting shelf system). The robotic system determines characteristics of items and/or debris or other abnormalities in the tree-dimensional view of the workspace.

Robotic system coordinates operation of multiple robots to avoid collisions, getting in each other's way, and contending to pick up the same item and/or place an item in the same destination location (e.g., receptacle on the conveyor) as another robot. The robotic system coordinates operation of a plurality of robots operating within a same workspace to perform kitting with respect to a plurality of items/object (e.g., to kit items in different receptacles or within a same receptacle). As an example, in various embodiments, the plurality of robots operate independently to pick and place items. As another example, the plurality of robots operate to independently pick and place items for different orders (e.g., to place different sets of items in different receptacles). If a risk of collision is detected, responsive action is taken to ensure the plurality of robots do not collide with one another during singulation.

Robotic system coordinates operation of multiple robots to ensure all items are placed in corresponding receptacles. For example, if robot A drops an item system tasks robot B to pick it up; item placed but with improper orientation is picked up and adjusted or moved to another location by same or another robot; two or more items for different orders are placed in a single receptacle results in a downstream robot picking one of the two or more items from the receptacle and placing the item in a new receptacle; etc.

Robotic system continuously updates motion planning for each robot and all of the robots together to achieve a desired collective throughput (e.g., to maximize collective throughput, to attain a predefined threshold of collective throughput, etc.). In response to determining that two or more robots have collided or will collide if moving according to their respective plans for kitting items, the robotic system implements an active measure to ensure that the two or more robots avoid collision or otherwise reset independent operation of the two or more robots.

In response to a determination that two robots independently are tasked to acquire the same item, the system picks one at random to get that item and the other moves on to the next item (e.g., identify, select, determine grasp strategy, pick, move according to plan, and place).

The robotic system can manage the independent operation of a plurality of robots to ensure that the robots select items at different times to avoid the same item being selected for singulation by two different robots.

Conveyor movement and/or speed controlled as needed to achieve a desired robot productivity (throughput) and to permit sufficient time for the robot to place an object into the desired receptacle.

In response to a determination that an item is misplaced or dropped, the system assigns a robot or, if needed, a human worker to pick the misplaced item up and place the item back in the applicable kitting shelf system (e.g., on a shelf such as via the feeder portion) or, if available or more optimal, on a receptacle on the conveyor.

Upstream robots controlled to intentionally leave some receptacles open for downstream robots to place items on the conveyor (e.g., in the corresponding receptacles).

Downstream robots controlled to correct errors from an upstream placing an item in a receptacle on the conveyor (e.g., to correct the placement of an item that rests in more than one receptacle such as a tray, or that rests on the conveyor rather than the applicable receptacle, to update a data structure with an association between an identifier for the item or kit/order with the receptacle in which the upstream robot placed the item, etc.).

Failure that cannot be corrected by same or another robot results in an alert being communicated to obtain human (or other robotic) intervention to resolve.

In response to a determination that a grip strength (e.g., a pressure attained by the end effector) is abnormal (e.g., less than is expected during normal operation), perform a diagnostic process that includes testing the grip strength on a predefined surface and in connection with determining whether remedial action is necessary with respect to the end effector.

Move/remove the debris within the workspace, or to reconfigure an item to be kitted (e.g., to improve the likelihood that the item is successfully picked from the shelf, or the presentation face of the shelf, and placed on the conveyor such as in a receptacle on the conveyor).

Use sensor data from the workspace environment state system to detect one or more characteristics (e.g., attributes) of the item selected for kitting, determine that grasping or releasing of the item is expected to improve in response to implementation of an active measure, and implement the active measure to improve the grasping or releasing of the item.

Use sensor data to determine that the robotic arm has grasped a plurality of items in connection with kitting of one of the items, determine a plan for releasing the plurality of items in order to place each item singly in a corresponding location in one or more receptacles on the conveyor or to place one of the items back on the shelf/presentation face of the kitting shelf system (e.g., determine a strategy for operating the end effector to release a first subset of the plurality of items at a different time from a second subset of the plurality of items).

Select a path for kitting an item to a receptacle on the conveyor based on an attribute of the item (e.g., a size of the selected item, a weight of the item, etc.) and/or one or more attributes (e.g., characteristics) of an item within a receptacle on the conveyor.

Determine a movement and speed of the robotic arm that picks an item from the kitting shelf system and places the item in the applicable receptacle based at least in part on a speed of a conveyor belt.

Determine a trajectory of the item to be kitted based at least in part on one or more of a characteristic of the item, a characteristic of the workspace environment, and/or a characteristic of the conveyor (e.g., a speed of the conveyor belt).

Determine a probability of successful kitting corresponding to one or more paths/trajectories of an item to be kitted, and select a path/trajectory along which the item is to be kitted based on the corresponding probability of success.

Determine a positioning of a robot arm and/or an end effector of the robot arm to obtain a successful grasp (e.g., as determined based on a probability of grasp success, a type of packaging of the item, a dimension of the item, an expected grip strength in relation to a threshold value, etc.). The positioning of the end effector can include controlling the robot arm or a wrist of the robot arm to move in order for the end effector be orthogonal to a surface of the item.

Update the ability of the robotic system to detect an empty receptacle. For example, the definition of an empty receptacle used by the robotic system to identify an empty receptacle is updated over time.

Determine a strategy to implement a task with respect to an item. The strategy is determined at least in part by taking into consideration the n axes of the robot and one or more additional axes. The strategy includes a set of one or more commands to maneuver the robot with respect to at least a subset of the n axes of the robot and the one or more additional axes to perform the task with respect to the item.

In response to determining to perform the task with respect to the item, the robotic system controls the robot to position the robot within the working area. For example, the robotic system controls to move the robot along a rail to the working area. In some embodiments, the robotic system obtains a plan and/or strategy for performing the task with respect to the item. As an example, the robotic system determines the plan and/or strategy based at least in part on a model of the working area and/or the item (e.g., one or more attributes associated with the item). The system determines whether to move the robot along the rail (e.g., along the 7th axis), to enable the robot to grasp, move, and/or place the item most efficiently, such as by using optimal poses and efficient movements etc.

Figure 2B:
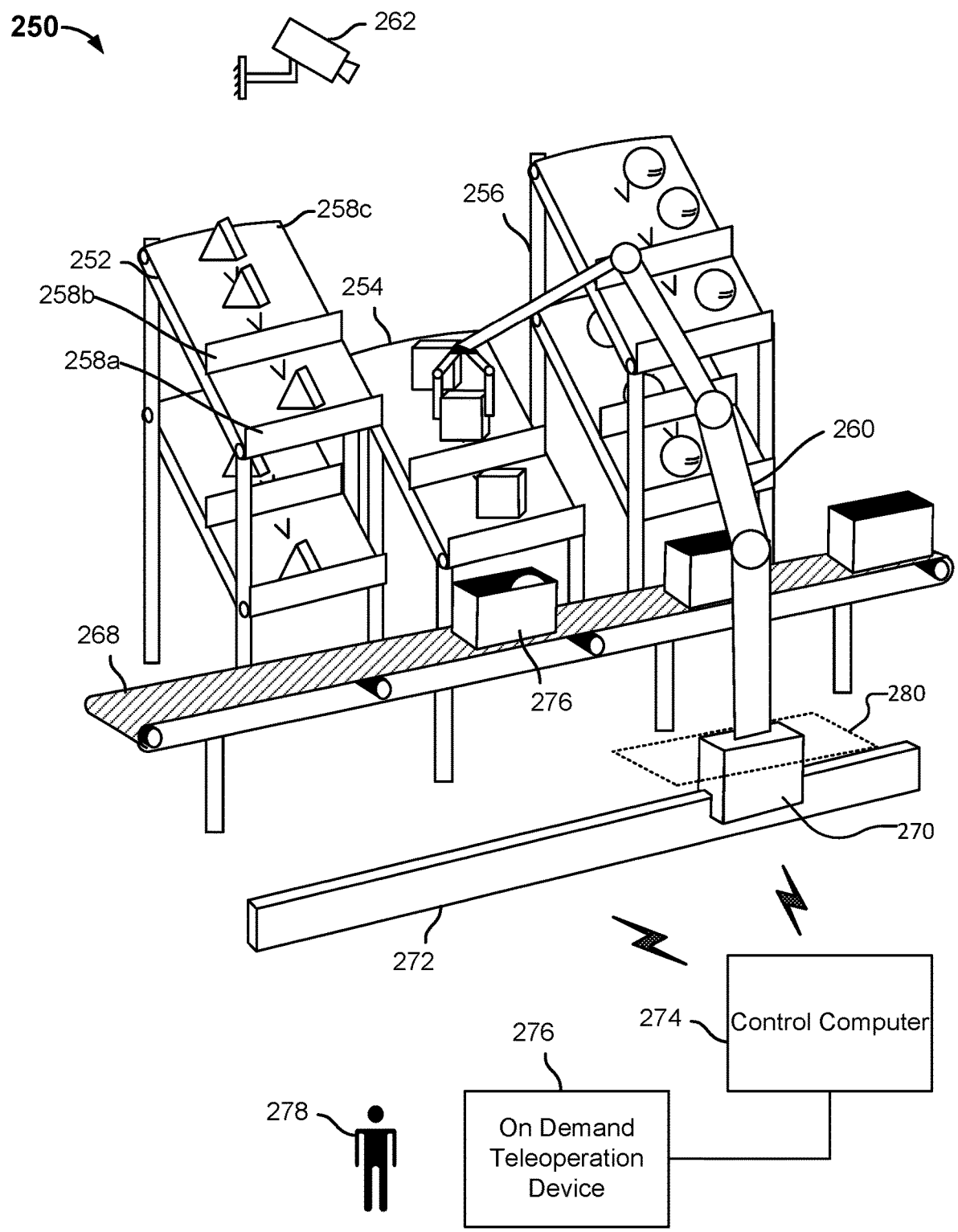
FIG. 2B is a block diagram illustrating a robotic line kitting system according to related art.

FIG. 2B is a block diagram illustrating a robotic line kitting system according to related art. According to various embodiments, kitting system 250 may implement process 1000 of FIG. 10, process 1100 of FIG. 11, and/or process 1200 of FIG. 12.

As illustrated in FIG. 2B, in various embodiments a kitting system 250 includes one or more kitting shelf systems (e.g., kitting shelf system 252, kitting shelf system 254, and/or kitting shelf system 256). In the case of kitting system 250 including a plurality of kitting shelf systems, the kitting shelf systems may be disposed along one side of a conveyor (e.g., conveyor 268), or the kitting shelf systems may be disposed on different sides of the conveyor.

In various embodiments, a kitting system 250 includes one or more robotic arms (e.g., robot 260). In the case of kitting system 250 including a plurality of robotic arms, the robotic arms may be disposed along one side of a conveyor (e.g., conveyor 268), or the robotic arms may be disposed on different sides of the conveyor. Further, a robotic arm may be disposed on a same side of the conveyor as one or more kitting shelf systems, or the robotic arm may be disposed on a side of the conveyor that is opposite to the one or more kitting shelf systems. In various embodiments, in the case of kitting system 250 including a plurality of robotic arms, a robotic arm is selected from among the plurality of robotic arms to obtain an item (or object from within an item) from a kitting shelf system based on a location of the robotic arm, an effectiveness of the particular robotic arm successfully picking the item (e.g., a computed likelihood of success), a reach of the particular robotic arm, a time within which the particular robotic arm will complete the picking and placing of the item, etc. The particular robotic arm selected to pick and place the item may be selected by control computer 274. For example, control computer 274 may store a model with respect to the workspace of kitting system 250 and/or one or more of the robotic arms within the workspace. The control computer may use the model to determine a robotic arm to pick and place an item, and/or a robotic arm to pick and place each of one or more items for a particular order (e.g., a single robotic arm may be used to kit the items for an order). In some embodiments, a robotic arm that is disposed on a same side as a kitting shelf system is more effective/efficient at picking and placing items from shelves on the kitting shelf system that are above a threshold height. For shelves below the threshold height, the contortion of the robotic arm required to reach an item on such shelves renders the robotic arm on the same side of the conveyor as the particular kitting shelf system inefficient. Further, the contortion of the robotic arm required to reach an item on such shelves renders the robotic arm with limited range/mobility with which to pick an item from a shelf below the height threshold. Accordingly, in cases of items on shelves below a threshold height, kitting system 250 may use a robot 260 on a side of the conveyor 268 that is opposite to the kitting shelf system from which the item is to be obtained.

Kitting shelf system 252 includes one or more shelves. In some embodiments, the one or more shelves respectively include one or more items disposed thereon. Different shelves within kitting shelf system 252 may include different items (e.g., a different type of item, items having one or more different identifiers such as serial numbers, model numbers, lot numbers, or the like). One or more of the kitting shelf system(s) may have a feeder portion, a gate structure, and a presentation face similar to those disclosed with respect to kitting system 200 of FIGS. 2A. As illustrated in FIG. 2B, the kitting shelf system comprises a shelf having a presentation face 258a, a gate structure 258b, and a feeder portion 258c.

In some embodiments, robot 260 is movable with respect to one or more of kitting shelf systems 252, 254, and 256 and/or with respect to a conveyor (e.g., conveyor 268) or other location at which a receptacle is disposed. In the example shown in FIG. 2B, robot 260 is mounted on carriage 270, which is configured to ride along a rail or other linear guide (e.g., rail 272) disposed alongside and substantially parallel to the conveyor 268, on a side opposite the kitting shelf system 252. In various embodiments, a motor, belt, chain, or other source of motive force is applied via a controller (not shown in FIG. 2B) to move the carriage 270 and attached robot 260 along the rail or guide (e.g., rail 272) to facilitate the automated retrieval of items from one or more kitting shelf systems, and the placement of items in receptacle 616a (e.g., a box, a tray, etc.) as the receptacle 276 is moved along conveyor 268. Control of robotic arm may be coordinated based at least in part on one or more items to be picked and placed in receptacle 276, a location of receptacle 276, and/or a path of receptacle 276 (e.g., based on a determined movement and/or speed of conveyor 268).

In some embodiments, kitting system 250 includes control computer 274. In the example shown, operation of kitting shelf system 252, conveyor 268; and robot 260, and/or carriage 270 are operated in a coordinated manner under the control of control computer 274. In the example shown, control computer 274 is in communication (e.g., wireless communication) with controllers, not shown in FIG. 2B, each configured to control operation of a corresponding element comprising kitting system 250, e.g., one or more of kitting shelf systems 252, 254, and/or 256; robot 260, conveyor 268, carriage 270, and/or receptacle source (not shown). Although wireless connections are shown in FIG. 2B, in various embodiments wired connections or a combination of wired and wireless connections may be used.

In the example shown in FIG. 2B, robot 260 has an end effector corresponding to a two-digit gripper. In various embodiments, robot 260 includes one or more other and/or different types of end effectors/retrieval tool, including without limitation a gripper having three or more digits; a gripper having digits with different attributes than as shown, e.g., cushioned digits, smaller digits, larger digits, etc.; and/or a retrieval tool that is not a gripper, such as one configured to pick up items using suction, friction, electrostatic force, magnetic force, etc. In some embodiments, the gripper of robot 260 may be interchanged with one or more different end effectors, depending on one or more attributes of an item to be retrieved, e.g., weight, fragility, compressibility, rigidity, size, shape, etc. In some embodiments, the gripper of robot 260 may be used to retrieve and use different end effectors (e.g., gripper-held tools) to pick and place items, depending on one or more attributes of the item to be retrieved, for example. One or more attributes of the items may be determined based at least in part on information obtained from one or more sensors such as camera 262.

In various embodiments, control computer 274 is configured, e.g., by software running on control computer 274, to receive data associated with an invoice, order, part list, pick list, or other list of items to be retrieved and packed together; determine a strategy/plan to fulfill the retrieve and pack the required items; and operate elements of kitting system 250, e.g., kitting shelf system 252, 254, and/or 256; conveyor 268; and robot 260 and/or carriage 270, in coordination to fulfill the requirement(s). In some embodiments, kitting system 250 includes a plurality of kitting shelf systems and/or a plurality of robotic arms, and one or more control computers are controlled to coordinate/operate elements of kitting system 250.

For example, in some embodiments, control computer 274 is configured to receive a list of items to be packed. Control computer 274 determines which items are associated with which of kitting shelf systems (or which items are associated with a particular shelf of a kitting shelf system such as kitting shelf system 252) and makes a plan to retrieve and pack the items. In some embodiments, computer 274 controls a box assembly machine (not shown) or a receptacle source module, and deposit a receptacle on conveyor 268 and controls the conveyor 268 to advance the receptacle to a position to be loaded with a first one or more items. The control computer 274 controls the carriage 270 and/or robot 260 as needed to position the robot 260 to retrieve the first one or more items from the associated a kitting shelf system (or a shelf of kitting shelf system 252). Control computer 274 may control kitting shelf system 252, 254, and/or 256, e.g., to ensure the require item(s) in the required quantities are present in the pickup zone (e.g., a presentation face) at the end of kitting shelf system 252, 254, and/or 256 (or a shelf of the kitting shelf system) nearest to the conveyor 268 and robot 260. Control computer 274 controls robot 260 to retrieve the item(s) from the corresponding pickup zone(s) and places the item(s) in the receptacle (e.g., receptacle 616a) before moving on to perform coordinated retrieval and packing of any further items required to be included in that particular kit. In response to a determination that all items have been retrieved and packed (e.g., according to a plan for kitting one or more items), control computer 274 controls conveyor 268 to advance the receptacle (e.g., receptacle 616a) to a next stage of fulfillment, not shown in FIG. 2B (e.g., a station at which the box is sealed, labeled, and sent to be shipped).

In the example shown in FIG. 2B, kitting shelf system 252 comprises angled shelves or angled conveyors (e.g., shelf comprising presentation face 258a, gate structure 258b, and feeder portion 258c) that are configured to be loaded, e.g., by human workers, robots, and/or other machines, or some combination thereof, from a back end (upper/left as shown in FIG. 2B). The kitting shelf system 252 may be loaded at the feeder portion or in a loader element (e.g., a chute) that conveys items to the respective feeder portions of the shelves. Items may be scanned, recognized by computer vision, etc. to determine and store on control computer 274 data associating the item and/or item type or other items attributes associated with each kitting shelf system. In various embodiments a mix of different types of kitting shelf systems may be included in a kitting system such as kitting system 250. For example, the items shown in FIG. 2B as being supplied via kitting shelf system 252 may be supplied in some embodiments via a stationary ramp down which the items are rolled. In some embodiments, a kitting shelf system may comprise any one of a plurality of structures and mechanisms to supply items to an associated pick zone, including without limitation a gravity type conveyor having a plurality of adjacent rollers, a ramp, a conveyor belt, a set of revolving bins, etc.

In some embodiments, kitting shelf system 252 comprises one or more gating mechanisms that control conveyance of items to or within angled shelves or angled conveyors (e.g., gate structure 258b). The one or more gating mechanisms may control the conveyance of one or more items to one or more presentation faces (e.g., presentation face 258a) of the kitting shelf system in connection with the kitting of the one or more items (e.g., retrieval of the item(s) by a robotic arm and placement of the item(s) into a corresponding receptacle(s)). The one or more gating mechanisms may be controlled by control computer 274 or the one or more gating mechanisms may be configured to operate mechanically (e.g., without intervention by a control computer). In various embodiments, the one or more gating mechanisms control conveyance of the one or more items based at least in part on a plan (e.g., a predetermined plan for kitting an item based at least in part on an order).

In various embodiments, kitting system 250 is initialized by having control computer 274 determine through automated processing, manual configuration, and/or a combination thereof the placement, type, capabilities, etc. of each kitting shelf system (e.g., kitting shelf system 252, 254, and/or 256) and the item(s) associated with each kitting shelf system. In addition, elements of kitting system 250 may register with the control computer 274. Registration may include admitting an element, such as each of the kitting shelf system, to a control network. In some embodiments, operational tests may be performed. For example, control computer 274 may test an ability to control a newly-registered element, such as by operating the conveyor belt of a kitting machine, such as kitting shelf system 252, in the forward and back directions, at various speeds, etc.

In various embodiments, elements of kitting system 250 may be added, removed, swapped out, etc. In such an instance, control computer 274 initializes and registers the new element, performs operational tests, and begins/resumes kitting operations, incorporating the newly added element, for example.

Referring further to FIG. 2B, in the example shown kitting system 250 includes a camera 262 (e.g., a video camera) configured to capture images (e.g., video images) of the elements comprised in kitting system 250. Camera 262 may be one of a plurality of sensors that obtains information pertaining to the workspace (e.g., the workspace corresponding to kitting system 250). For example, camera 262 may be one of a plurality of sensors used by control computer 274 to control the elements comprising system 100. For example, in the example shown, video generated by camera 262 and sent to control computer 274 may be used by control computer 274 to control the speed and/or direction of the conveyor belts comprised in the kitting shelf system 252 and/or a gating mechanism (e.g., 258b) in the kitting shelf system 252 to ensure a sufficient and not excessive number of items are available in the pickup zone (e.g., a presentation face 258a of kitting shelf system 252) and/or to position or reposition the items for retrieval by robot 260. In addition, camera 262 and/or other cameras and/or other sensors may be used to facilitate robot 260 picking up an item and/or placing the item in its receptacle (e.g., box). In various embodiments, a plurality of cameras may be deployed in a number of locations, including in the environment and on the respective elements comprising kitting system 250, to facilitate automated (and, if needed, human assisted) kitting operations. In various embodiments, sensors other than cameras may be deployed, including without limitation contact or limit switches, pressure sensors, weight sensors, and the like.

In various embodiments, one or more sensors (e.g., camera 262) is used to capture information pertaining to items associated with kitting shelf system 252, 254, and/or 256. For example, camera 262 may capture an image of one or more items on a shelf. As another example, if an item on a shelf is a tray or other receptacle, camera 262 may capture information pertaining to objects within the tray. Control computer 274 may use information pertaining to the workspace to determine a plan, and/or to control operation of robot 260 to pick an item (or an object from within the item) from kitting shelf system 252. Control computer 274 may use the information pertaining to the workspace in connection with determining a location of an object within a tray on a shelf; a quantity of objects within the tray; a type of object within the tray; an orientation of one or more objects within the tray; etc.

In various embodiments, control computer 274 is programmed to determine a plan to fulfill a kitting requirement based at least in part on a model of the robot 260 and other elements comprised in kitting system 250, e.g., kitting shelf system 252, 254, and/or 256; conveyor 268; a receptacle source module (e.g., a box assembly machine) (not shown); robot 260; and/or carriage 270. The respective models in various embodiments reflect capabilities and limitations of each respective element. For example, the shelves of kitting shelf system 252, 254, and/or 256 are in fixed positions in this example, but each may a conveyor belt capable of being moved in forward and back directions and/or at different speeds. In addition, the control computer 274 may use information stored in connection with initialization and/or configuration, e.g., which items are on which location(s) on which kitting shelf system (or on which shelf of which kitting shelf system), where each kitting shelf system and/or its associated pick up zone (e.g., presentation face(s)) is located, etc., to determine a plan to fulfill a requirement. In addition, control computer 274 may use data determine based at least in part on sensor data, such as video captured by camera 262, to make a plan to fulfill a requirement.

According to various embodiments, kitting of items from one or more kitting shelf systems is improved through use of a dynamic kitting method or system that determines a path or trajectory for kitting of an item using one or more of an attribute of the item to be singulated and an attribute of another item within the workspace (e.g., an item and/or receptacle on the conveyor). The dynamic kitting method or system may include an updating of the path or trajectory for kitting of an item in response detecting one or more of an attribute of the item to be kitted and an attribute of another item within the workspace (e.g., an item on the conveyor). The dynamic kitting method or system may include an updating of the conveyance of an item from a feeder portion of a kitting shelf system to a presentation face of the kitting shelf system in connection with kitting of an item (or object from an item on the kitting shelf system) in response to determining an attribute of the workspace. The attribute of the workspace used in connection with updating the plan for kitting the item/object may include an attribute of an item/object to be kitted, a quantity of objects within an item (e.g., a tray on a kitting shelf system), a speed of the conveyor, a characteristic associated with a receptacle on the conveyor, an orientation of the item on the kitting shelf system, an orientation of a presentation face of the kitting shelf system, etc. In some embodiments, the kitting system 250 (e.g., control computer 274) dynamically updates the plan for kitting the item during kitting based on a context of the workspace (e.g., a state or condition of the item, a property of the item, another item within the workspace, a speed of conveyor 268, an identifier of receptacle 276, etc.).

In various embodiments, control computer 274 is configured to formulate and/or update or reformulate a plan to fulfill a requirement, and to implement or attempt to implement the plan, by employing strategies to do a (next) task or subtask that have been programmed into and/or learned by control computer 274. Examples include, without limitation, strategies to use robot 260 to pick up a given item (or an object from an item on a presentation face of a kitting shelf system) based on attributes of the item (rigidity, fragility, shape, orientation, etc.). In some embodiments, control computer 274 is programmed to use a first (e.g., preferred or best) strategy to attempt to perform a task (e.g., pick up an item with robot 260), and if the first strategy fails then to determine and use an alternate strategy, if one is available (e.g., use the robot 260 to nudge the item (or object) then try again, operate the conveyor or other instrumentality of the kitting shelf system 252, 254, and/or 256 (or of a shelf of kitting shelf system), forward and/or backward a bit and try again, etc.). The preferred or best strategy can be determined based at least in part on a model associated with a likelihood of successful picking and placing the object, etc.

In the example shown in FIG. 2B, control computer 274 is connected to an on demand teleoperation device 626 operated by a human operator 278. While in FIG. 2B teleoperation device 275 is operated by a human operator, in some embodiments teleoperation device 275 may be operated by a non-human operator, such as a highly skilled robot.

In various embodiments, control computer 274 is configured to invoke on demand teleoperation based at least in part on a determination by control computer 274 that control computer 274 does not have an available strategy to continue/complete a kitting operation and/or a component task thereof through fully automated operation. For example, an item is dropped in a location from which the robot 260 cannot retrieve the item; or, an item has been attempted to be picked up a prescribed maximum number of attempts and has not successfully been retrieved; operation of and end effector deviates from a defined normal operation (e.g., if a suction cup is broken), etc. Based on such a determination, control computer 274 sends an alert or other communication to on demand teleoperation device 275, prompting human operator 278 to use teleoperation device 275 to operate one or more elements of kitting system 250—e.g., one or more of kitting shelf system 252, 254, and/or 256 (or shelf); conveyor 268; a receptacle source module (e.g., a box assembly machine) (not shown); robot 260; and/or carriage 268—to perform at least the task or subtask the kitting system 250 was not able to complete under fully automated control by control computer 274.

According to various embodiments, control computer 274 dynamically controls robot 260 to use one or more additional axes (e.g., axes in addition to the n-axis of the robot) in connection with implementing a task (e.g., grasping, moving, placing an item, etc.). Control computer 274 determines the plan or strategy based at least in part on (i) the n-axes corresponding to robot 210, and (ii) one or more additional axes. For example, the model for determining a plan/strategy includes the possibility of the robot moving with respect to the one or more additional axes (e.g., the solution space includes locations or configurations that are made possible and/or are deemed efficient in view of movement of the robot in the one or more additional axes). With respect to the example illustrated in FIG. 2A, the one or more additional axes include a dimension (e.g., a 7th axis) defined based on rail 272. Robot 210 can be controlled to be translated along the direction defined by rail 272. Control computer 274 determines the strategy for implementing a task with respect to an item at least in part by taking into consideration the n axes of the robot and one or more additional axes. The strategy includes a set of one or more commands to maneuver the robot with respect to at least a subset of the n axes of the robot and the one or more additional axes to perform the task with respect to the item.

In some embodiments, control computer 274 determines the strategy for implementing a task with respect to an item based at least in part on the one or more additional axes. For example, control computer 224 extends the solution space for movement of robot 260 while implementing a task with respect to an item to include movement along rail 272. In connection with implementing the strategy to perform the task, control computer 274 can cause robot 260 to move along the dimension defined by rail 272 (e.g., the carriage on which the corresponding robot is mounted traverses rail 272) as the task is being implemented. As an example, robot 260 is moved along the direction defined by rail 272 while an item is grasped to move the item along a path/trajectory (e.g., a path or trajectory that may have been not possible or otherwise inefficient if the robot was not moved). In the case that conveyor 268 is operating to carry receptacles (e.g., receptacle 276), at a time when robot 260 is to place an item in receptacle 276, receptacle 276 may be in a location for which the robot 260 is unable to place the item in receptacle. For example, constraints of the joints of robot 260 may prevent control computer 274 from positioning robot 260 in a configuration that facilitates placement of the item in receptacle 276 from a current position. Control computer 274 can control robot 260 to move along rail 272 to a position that facilitates placement of item to receptacle 276.

In the example shown in FIG. 2B, the system can determine a working area 280 corresponding to a location on the rail (or a relative location with respect to a kitting shelf system or the item, etc.). Working area 280 corresponds to the location at which robot 260 is moved and within which robot 260 performs a particular task such as the picking and placing of item from kitting shelf system 254 and placing the item in receptacle 276. Control computer 274 can control robot 260 and/or carriage 270 to initially move to working area 280 in response to determining that a task is to be performed. Control computer 274 can subsequently control robot 260 and/or carriage 270 to move along rail 272 to within a threshold distance of working area 280 to enable robot 260 to determine an optimal strategy (e.g., trajectory, configuration of the robot, coordinated movements of the robot) for performing the task with respect to the item at working area 280.

Although the above examples describe various embodiments in the context of a kitting system, various embodiments can be implemented in connection with various other systems such as a singulation system (e.g., in connection with control of the robot to singulate items) or a palletization system, etc.

Figure 3A:
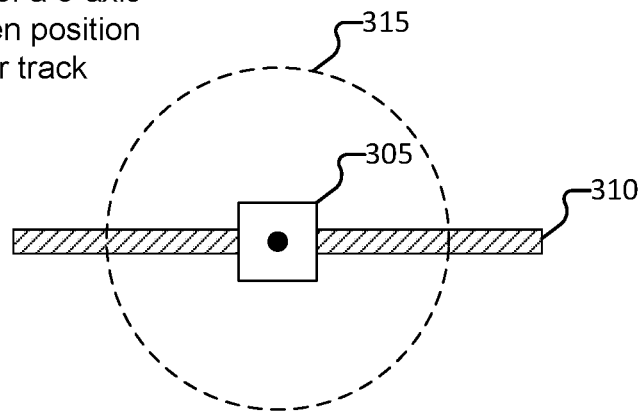
FIG. 3A is a diagram illustrating a reach space of a 6-axis robot.

FIG. 3A is a diagram illustrating a reach space of a 6-axis robot. As illustrated in FIG. 3A, system 300 comprises 6-axis robot 305. 6-axis robot 305 is mounted on a carriage that travels along rail 310. In the example shown, 6-axis robot 305 has a range 315 (also referred to herein as a reach space) within which 6-axis robot 305 is able to operate such as to perform tasks with respect to an item in the workspace.

According to related art, 6-axis robot 305 is controlled to travel along rail 310 to a particular position. The particular position can be a position within the workspace from which 6-axis robot 305 operates to perform a task with respect to the item. As an example, the particular position is determined based on range 315 of 6-axis robot 305. For example, system 300 stores a mapping of range 315 to 6-axis robot 305. System 300 determines a location of an item with respect to which 6-axis robot 305 is to perform a task, then determines the particular location on rail 310 to which 6-axis robot 305 is to be moved to perform the task based at least in part on the location of the item and the predefined/ prestored range 315 (e.g., so that the item is within range 315). In response to determining the particular location, system 300 controls 6-axis robot 305 (or the carriage on which 6-axis robot 305 is mounted) to travel along rail 310 to the particular location, and then while stopped at the particular location system 300 controls 6-axis robot 305 to perform the task with respect to the item. When 6-axis robot 305 is stopped at the particular location, control of the robot is generally limited to the 6 degrees of freedom corresponding to the 6-axis.

Figure 3B:
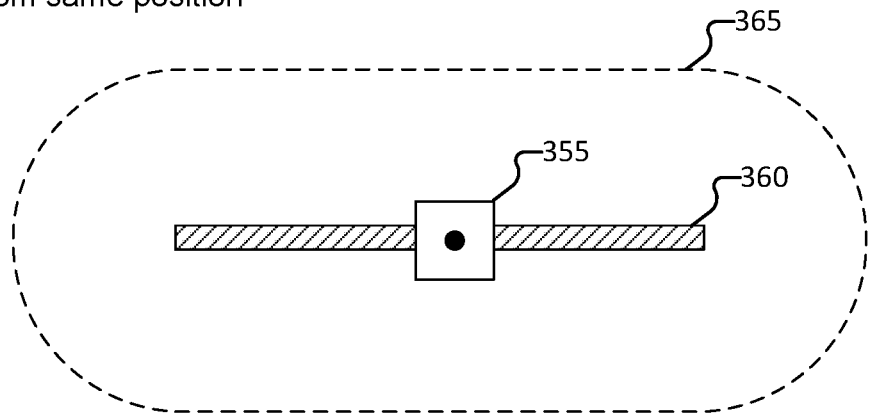
FIG. 3B is a diagram illustrating a reach space of a 7-axis robot according to various embodiments.

FIG. 3B is a diagram illustrating a reach space of a 7-axis robot according to various embodiments. In the example shown, system 350 comprises robot 355. In some embodiments, robot 355 is mounted on a carriage that travels along rail 360. System 350 controls to move robot 355 along rail 360 such as in connection with performing a task with respect to an item in the workspace.

According to various embodiments, system 300 determines a plan for performing a task based at least in part on 6 rotational axis (e.g., the 6-axes of a 6-axes robot) and one or more linear axes such as the axis defined by rail 360. For example, the solution space for performing a task from a particular location includes movement of robot at least 7-axis, including the 6-axis of a 6-axis robot and one or more linear axis.

As illustrated in FIG. 3B, robot 355 has a range 365 (also referred to herein as a reach space) within which 305 is able to operate such as to perform tasks with respect to an item in the workspace. For example, in comparing FIGS. 3A and 3B, range 315 of 6-axis robot 305 when at a particular location is significantly smaller than range 365 of robot 355 when operating from the same location along the corresponding rail. In some embodiments, the increase in range for robot 355 is based on the use of one or more linear axes in the solution space for determining a strategy for performing a task.

Related art systems do not implement axis in addition to the 6 axes of a 6-axis robot. Rather, a system uses different modules to control location of a robot along a rail and to control operation of the robot when at a particular location. Conversely, various embodiments integrate the one or more linear axis in a solution space for operating a robot. According to various embodiments, control of robot 355 along the one or more additional axes (e.g., one or more linear axis) is integrated with control of robot with respect to 6 other axes: (i) a first axis corresponding to a rotation of the robot around a base, (ii) a second axis corresponding to movement of a lower arm of the robot in a forward and backward direction, (iii) a third axis corresponding to movement to raise an upper arm of the robot, (iv) a fourth axis corresponding to rotation of the upper arm of the robot, (v) a fifth axis corresponding to a movement to raise a wrist of the robot, and (vi) a sixth axis corresponding to rotation of the wrist of the robot. As an example, system 350 determines that robot 355 has 7 degrees of freedom when system 350 is determining a strategy for performing a task (e.g., at a particular location along rail 360).

Figure 4A:
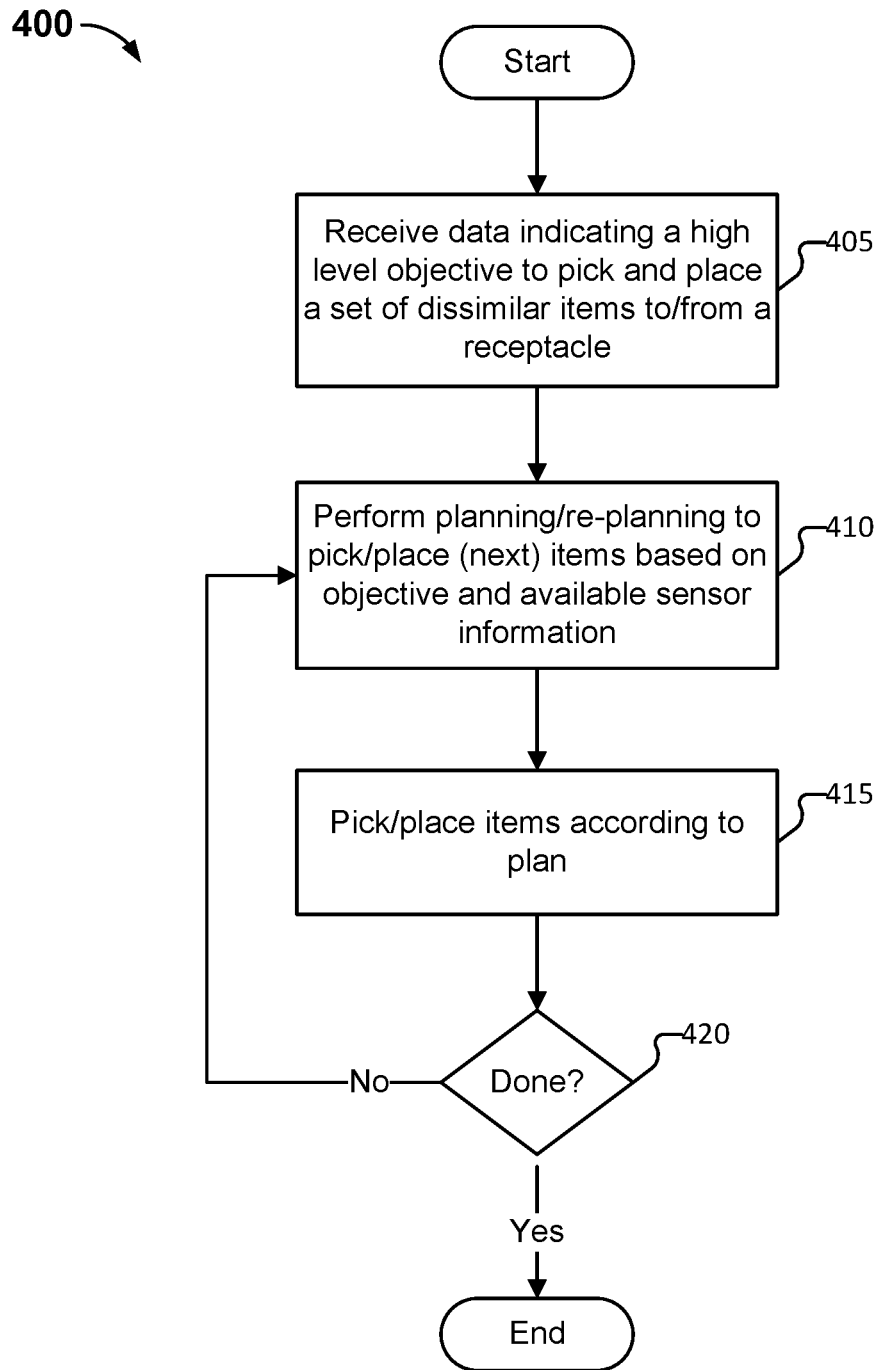
FIG. 4A is a flow chart illustrating an example of a process to palletize and/or depalletize an item according to various embodiments.

FIG. 4A is a flow chart illustrating an example of a process to palletize and/or depalletize an item according to various embodiments. In various embodiments, process 400 of FIG. 4A is performed by a control computer comprising a robotic system to palletize and/or depalletize heterogeneous items. In some embodiments, such robotic system comprises, or is similar to, a system described in U.S. patent application Ser. No. 17/343,606, the entirety of which are hereby incorporated for all purposes. The robotic system may comprise one or more robotic arms. One or more pallets may be disposed around each of the robotic arms. For example, a plurality of predefined zones may be set within proximity or within a threshold range of a robotic arm, and at least pallet may be placed in a predefined zone. As another example, a plurality of predefined zones may be set radially around a robotic arm, and a plurality of pallets may be respectively located in a corresponding predefined zone. A system may comprise one or more conveyors that carry items to/from a workspace for a robotic arm (e.g., at least part of the one or more conveyors may be within reach/range of the robotic arm).

In the example shown, at 405 data indicating a high level objective to pick and place a set of dissimilar items (i.e., the set includes two or more different types of item) to/from one or more platforms or receptacles, such as a pallet, is received. For example, a control computer may receive an input to load items arriving on a conveyor onto a pallet. Conversely, as another example, a control computer may receive an input to unload items from a pallet onto a conveyor. The input may correspond to a user selection via a user interface, etc. The input to load/unload items corresponds to a particular pallet or a particular robotic arm. For example, in the case of a plurality of pallets corresponding to the robotic arm (e.g., located within the predefined zones associated with the robotic arm), the user may selectively instruct the robotic arm to load/unload items on a pallet-by-pallet basis (e.g., for each pallet individually). As another example, in the case of a plurality of pallets corresponding to the robotic arm, the user may selectively instruct the robotic arm to load/unload a subset of the pallets, or all the pallets, corresponding to the robotic arm.

According to various embodiments, an input indicating explicitly the items expected and/or desired to be loaded, such as an invoice or manifest, may be received. For example, in response to receiving an order or an instruction to fulfill an order, a manifest or listing of items corresponding to the order may be generated (hereinafter referred to as the "manifest"). In connection with fulfillment of the order, the robotic system may be instructed to palletize the items corresponding to the manifest Palletizing the items for the manifest may include stacking items on one or more pallets. In the case of a plurality of pallets disposed within predefined zones corresponding to the robotic arm, the robotic arm may simultaneously (e.g., concurrently and/or contemporaneously) stack items corresponding the manifest on a plurality of pallets.

A pallet may have an identifier thereon and the robotic system may associate the identifier of the pallet with a manifest. For example, the robotic system may store (or have access to) a data storage that stores mappings of pallet identifiers to manifests. As another example, the predefined zone may be temporarily associated with a manifest. The association between the predefined zone and the manifest may be stored in a mapping of predefined zones to manifests. The robotic system may use the association between a manifest and a pallet identifier or predefined zone in which the pallet is located in connection with placing an item on a pallet. The simultaneous (e.g., concurrent or contemporaneous) stacking of items on a plurality of pallets corresponding to the same manifest provides greater flexibility in planning the manner by which items are to be stacked on a pallet. For example, the robotic system can determine the pallet on which the item fits best (e.g., results in a most efficiently packed stack and/or results in a better stack stability metric).

At 410, planning (or re-planning) is performed to generate a plan to pick/place items based on the high level objective received at 305 and available sensor information. The control computer uses 3D or other image data generated by one or more of cameras along with sensor data from sensors (e.g., weight sensors) to identify and determine a plan to pick, place, and stack on pallet (or other receptacle, etc.) items arriving via a conveyor.

According to various embodiments, the control computer generates a plan/strategy to pick/place items based at least in part on the one or more additional axes. For example, the control computer extends the solution space for movement of the robot while implementing a task with respect to an item to include movement along a rail. In connection with implementing the strategy to perform the task, control computer can cause the robot to move along the dimension defined by the rail (e.g., the carriage on which the corresponding robot is mounted traverses the rail) as the task is being implemented. As an example, the robot is moved along the direction defined by the rail while an item is grasped to move the item along a path/trajectory (e.g., a path or trajectory that may have been not possible or otherwise inefficient if the robot was not moved).

In some embodiments, the system may make a plan based at least in part on a manifest (e.g., invoice or other list corresponding to an order, etc.). A plan to stack items may be generated based on item size, weight, density, weight distribution, rigidity, capacity of the item and/or its box or other packaging to support weight stacked on top of the item, etc. The control computer in some embodiments controls the order in which items arrive at the loading location, such as via a conveyor. In some embodiments, items may arrive in an order not known a priori and/or the list of items may not be known. In some such embodiments, cameras and/or other sensors are used to identify items and/or their attributes, generate/update a plan to stack items on a pallet, and/or to determine strategies to grasp, pick up, move, and place each item in its corresponding place according to the stacking plan determined at 410.

In some embodiments, in response to determining that a task is to be implemented with respect to an item (e.g., that the item is to be moved from a pallet to a destination location), the control computer controls to move the robot to within proximity of the item (e.g., a source location or location at which the robot is to engage the item). For example, the control computer controls to move the robot to a working area. In some embodiments, the working area corresponds to an area (e.g., corresponding to a location of a base of the robot or carriage on which the robot is mounted) that is within a predefined distance of the item, or source location of the item. The predefined distance can be set by an administrator. The predefined distance can be determined based at least in part on a range of the corresponding robot. In connection with implementing the strategy to perform the task, the control computer controls to move the robot in the one or more additional dimensions such as along the direction defined by the rail to which the robot is mounted. Moving the robot in the one or more additional dimensions enables robot to use an efficient or optimal strategy for moving an end effector or item grasped by the end effector through the working area. In some embodiments, an extent to which the robot is moved in the one or more additional dimensions during implementation of a task is constrained by one or more predefined thresholds. For example, the control computer controls to move the robot with respect to the one or dimensions up to an extent that robot remains within proximity of the source location or working area. In some embodiments, the model used to determine the strategy for implementing the task is based at least in more predefined thresholds with respect to which a robot may move in the one or more directions while the robot is implementing the task (e.g., after the robot has been moved to the working area, etc.).

According to various embodiments, the robotic system determines the plan to pick/place the item in order to pack or stack the items in a manner that the pallets are stable and packed densely. As an example, one or more thresholds pertaining to the manner by which items are packed or stacked on a pallet may be used in connection with determining the plan to pick/place the item. The one or more thresholds may be set by a user (e.g., an administrator). In some embodiments, a threshold may be set based on a machine learning process such as a machine learning process that improves planning process such as based at least in part on historical information (e.g., historical information pertaining to the stacking of items on a pallet, or of the individual placement/attributes of an item). The one or more thresholds may include (i) a packing efficiency threshold pertaining to a measure of packing density of a pallet, (ii) a stability threshold pertaining to a measure of a stability of the stack of items on the pallet, (iii) a fit threshold pertaining to a measure of the manner by which an item fits on the pallet (e.g., on an existing stack, etc.). The robotic system may use the thresholds as respective minimum values that must be obtained (or expected to be obtained) by the expected placement of the item at a particular destination location.

In some embodiments, a model of items on a pallet may be generated. For example, the model may be generated for the stack of items on a pallet. The model may be updated as a new item is added to the pallet (e.g., placed on the pallet). Alternatively, or additionally, the model may be updated at predefined time intervals that may be configurable by a user/administrator. The model of items with respect to a particular pallet may be modeled each time an item is determined to be picked/placed by a robotic arm, and/or each time the robotic system determines that the item is associated with a manifest corresponding to one or more pallets. However, in some embodiments, the model of items with respect to a pallet may be cached and obtained in response to a determination that an item associated with a manifest corresponding to the item. The robotic system may obtain the cached model and update the model in response to a determination that one or more other items have been placed on the pallet since the model was generated. In some embodiments, the robotic system updates and caches the model after the robotic arm places an item on the pallet to avoid the model having to be computed/updated at a time that a next item is to be placed on the pallet.

In response to determining that an item is to be picked and placed on a pallet, the robotic system may determine a set of pallets on which the item may be placed based at least in part on a determination of a manifest with which the item is associated. In response to determining the manifest corresponding to the item, the robotic system may perform a lookup in a mapping of manifests to pallets to determine one or more pallets on which the item may be placed to allow the item to be included in the fulfillment of the manifest. In some cases, all of the one or more pallets are within range of a particular robotic arm (e.g., are within the predefined zones corresponding to the robotic arm). In other cases, a subset of the one or more pallets are within range of a particular robotic arm (e.g., a subset of the one or more pallets may not yet be placed in a zone for any robotic arm, and/or a subset of the one or more pallets may be placed in a predefined zone corresponding to a different robotic arm). Accordingly, the robotic system may further determine the one or more pallets on which the item may be placed by the robotic arm based on the mapping of manifests to pallets, and/or a mapping of pallets to robotic arms and/or predefined zones.

In response to determining that the item may be placed on one or more pallets corresponding to a robotic arm, the robotic system may determine the manner by which the item is to be placed on the one or more pallets. A pallet may correspond to a robotic arm if the pallet is currently in a predefined zone for the robotic arm. As an example, if the item may be placed on one of a plurality of pallets corresponding to a robotic arm, the robotic system may select one of the plurality of pallets on which to place the item. Selection of the pallet on which to place the item may include determining a pallet or stack on which the item is best fit (e.g., relative to the placing of the item on other pallets/stacks). In some embodiments, the robotic system uses the corresponding models of items with respect to the pallets in connection with determining the pallet or stack on which to place the item. For example, the robotic system may simulate/model the placing of the item on one or more of the pallets on which the item may be placed, and determine one or more expected characteristics associated with the pallet or items on the pallet if the item were placed on the pallet. The one or more characteristics associated may comprise one or more of a metric pertaining to a stability of the items on the pallet (e.g., a stability of the stack of item), a metric pertaining to a density of the items on the pallet, a fit of the item relative to other items on the pallet, etc.

In some embodiments, the robotic system simulates placing the item at different locations on a particular pallet to determine a location at which the item best fits based at least in part on at least a subset of the aforementioned one or more characteristics. The robotic system may simulate placing the item at a plurality of locations with respect to a particular pallet, and may perform such a simulation with respect to a plurality of the pallets on which the item may be placed (e.g., a plurality of pallets associated with the manifest to which the item belongs). The robotic system may determine the destination location of the item based at least in part on the one or more simulations of placing the item. For example, the robotic system may determine the destination location based at least in part on the expected one or more characteristics associated with placing an item at the various locations according to the one or more simulations. A composite score associated with placing an item at a particular location may be determined based at least in part on the one or more characteristics (e.g., density of the stack, stability of the stack, fit of the item relative to other items, etc.). In some embodiments, the one or more characteristics have corresponding weightings used in determining a composite score associated with placing the item at a particular location.

The robotic system may determine the destination location as corresponding to location having the highest corresponding composite score among the different simulations/models for placing the item on the pallet. In some embodiments, the destination location is determined based at least in part on the simulations and a cost function. For example, a set of destination locations for which the composite score satisfies (e.g., exceeds) a threshold value may be determined, and the robotic system may select, from among the set of destination locations, the destination location having the most efficient result (e.g., lowest cost) with respect the cost function as the destination location at which the item is to be placed. In some embodiments, the set of destination locations from which the destination location is selected is determined based at least in part on (i) each of the destination locations having characteristics that satisfy minimum characteristic values (e.g., characteristic values for fit, stability, efficiency, etc.), and (ii) each of the destination locations having a composite score that satisfies the threshold composite score value.

The stability of the items on a pallet may be impacted by one or more attributes associated with an item. The attributes may include a shape of an item, a center of gravity of an item (or an expected center of gravity of the item), a type of packing (e.g., a cardboard box, a polybag, etc.), a weight of the item, an indication that the item is fragile, etc. As an example, an item that is relatively light or an irregular shaped item may cause a stack of items to be relatively unstable if the item is placed at a lower part of the stack. In the case of an item that is a pillow, the stability of a stack of items may be improved by placing the pillow at the top or near the top of the stack compared to placement of the pillow at the bottom or near the bottom/middle of the stack. The robotic system may obtain one or more attributes associated with an item. For example, the robotic system may obtain the one or more attributes when the item is provided on the conveyor (e.g., as the item is brought within proximity of the robotic arm), or when the item is determined to be the next item to be picked up from the conveyor. In some embodiments, the obtaining the one or more attributes comprises obtaining (e.g., scanning) one or more identifiers on the item, such as a bar code, a QR code, a near field communication label/tag, etc. Attributes may be pre-stored in association with the item, the type of item, etc. For example, in response to obtaining an identifier associated with the item, the robotic system may perform a look up against a mapping of items (or identifiers of items) to attributes. In some embodiments, an attribute is obtained by one or more upstream sensors or computers and stored in association with the item. The robotic system may retrieve from a data structure the attributes associated with an item that were obtained by the one or more upstream sensors. A sensor or sensor array may be used in connection with determining a size of the item. The sensor or sensor array may be disposed on or around the conveyor, or within the workspace of the robotic arm. Additionally, or alternatively, the robotic system may determine one or more attributes associated with the item in response to picking up the item. For example, a weight of the item may be determined in response to picking up the item via one or more sensors such as a force sensor, or a current sensor, or other sensor that measures an amount of work expended to lift the item, etc. As another example, the robotic arm may move the item within a threshold range/area of one or more sensors that may obtain an identifier associated with the item (e.g., a barcode on the item), and the identifier may be used to obtain a pre-stored attribute.

The one or more attributes associated with an item may be used to determine the plan for picking/placing the item. For example, the robotic system may determine a trajectory along which the item is to be moved from a source location (e.g., a location on the conveyor) to the destination location (e.g., the location on the pallet on which the item is to be placed). As another example, the one or more attributes associated with the item may be used in connection with determining the destination location as simulating the placing of the item at different locations on the pallet, or at different locations on different pallets for the corresponding manifest.

In some embodiments, the robotic system determines the plan for picking/placing the item based on an efficiency or cost function associated moving the item from the source location to the destination location. As an example, the robotic system may determine the plan based on an optimization of the efficiency or cost function. As another example, the robotic system may determine the plan such that a minimum efficiency threshold and/or a minimum value threshold of a cost function is satisfied by the corresponding moving of the item from the source location to the destination location. One or more values pertaining to an efficiency of a plan may include an expected time for the robotic arm to move the item, a difference in height between the source location and the destination location, a distance (e.g., a Euclidian distance, etc.) between the source location and the destination location, etc. In some embodiments, a cost function comprises one or more variables pertaining to the picking/placing of the item at the destination location, an expected stability of the stack of items on the pallet (e.g., after the item is placed at the destination location), a measure of fit of the item at the destination location, a number of pallets to be used to palletize all items corresponding to a particular manifest, etc. The cost function may include one or more weightings for the one or more variables included in the cost function.

In some embodiments, a pallet may be deemed to correspond to a robotic arm if the pallet is currently in a predefined zone for the robotic arm and/or planned to be inserted into a predefined zone at a future time when a predefined zone is available. In such as case, the robotic system may determine that the item is to be placed on such a to-be inserted pallet, and the robotic system may determine the plan for picking and placing the item to comprise picking the item from the conveyor and placing the item in a buffer or staging area until such time that the corresponding pallet is inserted into the predefined zone and the item is determined to be placed on such pallet.

In some embodiments, in response to determining that no suitable locations on one or more pallets corresponding manifest to which the item belongs currently exist, the robotic system may determine to pick and place the item in a buffer or a staging area. The buffer or staging area may be a preset area within the workspace in which items are at least temporarily stored until the robotic system determines that an ideal location on one of the one or more pallets exists (e.g., a location for which criteria pertaining to stability, fit, and/or efficiency, etc. are satisfied). The robotic system may determine that placing one or more upstream items (e.g., items to be delivered via the conveyor within a threshold time and/or threshold number of items) on the pallet before the current item would result in a better stack (e.g., better fit, stability, efficiency, etc.). In response to such a determination, the robotic structure may control the robotic arm to pick and place the one or more upstream items before picking and placing the current item. As an example, the current item may be moved temporarily to the buffer/staging area while, or until such time that, the robotic arm stacks the one or more upstream items.

According to various embodiments, a set of paths or trajectories for picking and placing an item is determined, and the path or trajectory along which the item is to be moved is selected from the set of paths or trajectories. The path or trajectory may be selected based on various properties associated with the corresponding paths or trajectories within the set. Examples of the properties associated with the corresponding paths or trajectories that may be used in connection with selecting the path or trajectory include a speed with which the item is to be moved, a destination location at which the item is to be picked, a probability of success that the item is to picked and placed at the destination location according to the particular path or trajectory, an indication of whether another item or object within the workspace intersects with the particular path or trajectory, an indication that a region or area in the workspace is restricted intersects with the particular path or trajectory, etc. In some embodiments, the probability of success that the item is to be picked and placed at the destination location according to the particular path or trajectory is determined for at least a subset of the set of paths or trajectories, and the path or trajectory is selected based on the corresponding probability of success relative to the probability of success corresponding to other paths or trajectories. As an example, the path or trajectory is selected in response to determining that the probability of success corresponding to the path or trajectory exceeds a threshold probability, or exceeds a threshold number or percentage of other paths or trajectories within the subset.

At 415, items are picked (e.g., grasped from the conveyor, in the example shown in FIG. 1), moved through a (predetermined/planned) trajectory to a location near where the item is to be placed, and placed at the destination location according to the plan determined and/or updated at 410.

In various embodiments, the control computer controls the robot (e.g., an n-axis robot) to move with respect to one or more additional axes (e.g., an axis in addition to the n-axes of the robot) in connection with picking the item, moving the item, and/or placing the item. For example, the control computer controls to move the robot along a rail to the working area at which robot is positioned to perform a task, and to move the robot along the rail to a location within a threshold distance of the working area to facilitate the picking, moving, and placing the item through the working area (e.g., if the movement along a 7th axis is a more cost effective or more optimal strategy such as based on a cost function or a likelihood of success associated with the strategy).

In various embodiments, a packing plan may include planned use of stackable trays, crates, boxes, bins, or other containers to group smaller and/or irregularly shaped items and pack as a more readily stacked unit. In some embodiments, in a depalletizing operation a robotic system as disclosed herein is configured to recognize such containers, open them if needed, and empty them by removing individual items. Once emptied, the container is moved to a staging location, from which in various embodiments other robots and/or human workers may retrieve and move them out of the way.

In the example shown, (re-)planning and plan implementation (410, 415) continue until the high-level objective (405) is completed (420), at which the process 400 ends. In various embodiments, re-planning (410) may be triggered by conditions such as arrival of an item that is not expected and/or cannot be identified, a sensor reading indicating an attribute has a value other than what was expected based on item identification and/or associated item model information, etc. Other examples of unexpected conditions include, without limitation, determining that an expected item is missing, reevaluating item identification and determining an item is other than as originally identified, detecting an item weight or other attribute inconsistent with the item as identified, dropping or needing to re-grasp the item, determining that a later-arriving item is too heavy to be stacked on one or more other items as contemplated by the original and/or current plan, and detecting instability in the set of items as stacked on the receptacle.

Figure 4B:
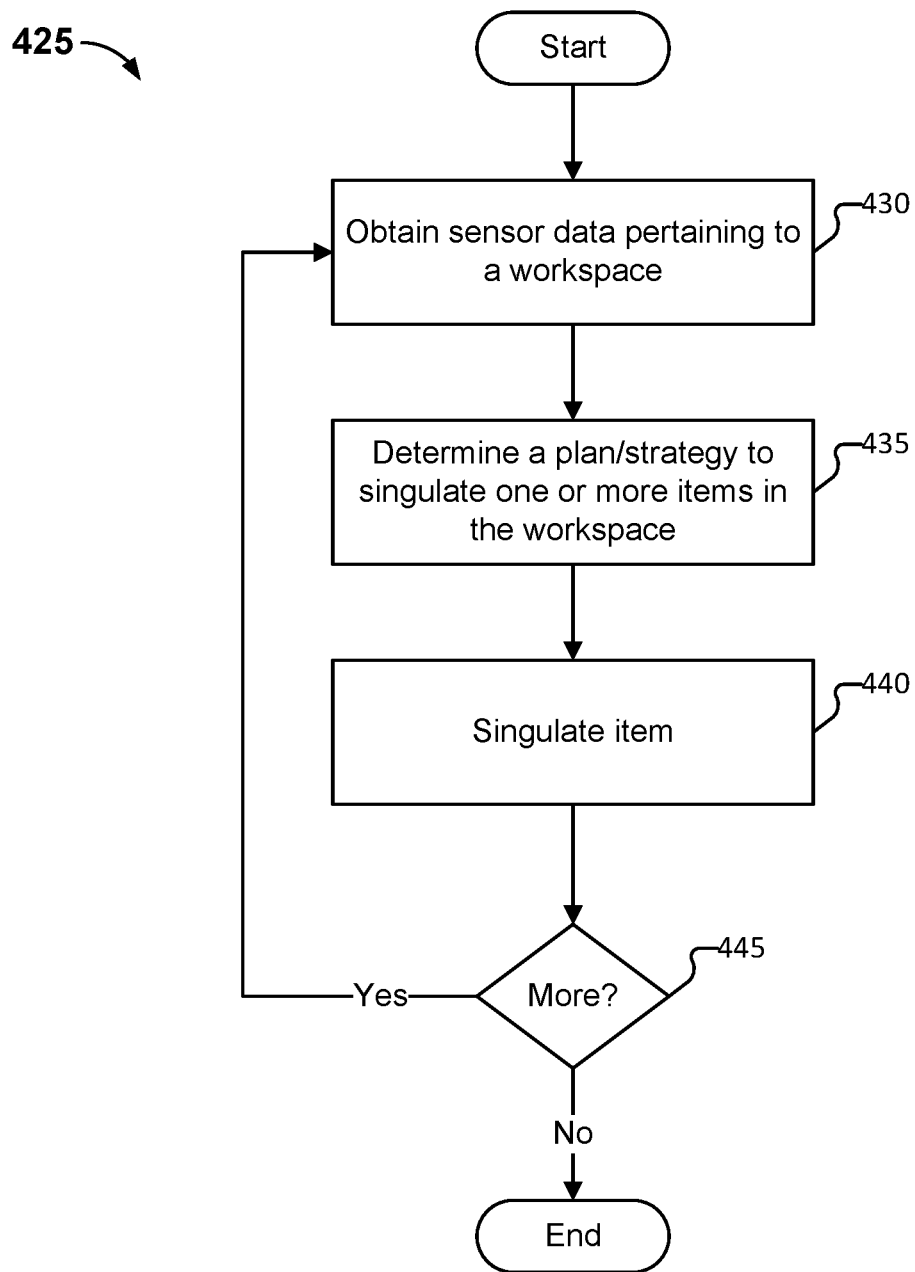
FIG. 4B is a flow chart illustrating an example of a process to singulate an item according to various embodiments.

FIG. 4B is a flow chart illustrating an example of a process to singulate an item according to various embodiments. In some embodiments, process 425 is implemented by a robot system operating to singulate one or more items within a workspace. The robot system includes one or more processors which operate, including by performing the process 425, to cause a robotic structure (e.g., a robotic arm) to pick and place items for sorting.

At 430, sensor data pertaining to the workspace is obtained. In some embodiments, a robotic system obtains the sensor data pertaining to the workspace from one or more sensors operating within the system. In some embodiments, such robotic system comprises, or is similar to, a system described in U.S. patent application Ser. No. 17/202,040, the entirety of which are hereby incorporated for all purposes. As an example, the sensor data is obtained based at least in part on outputs from image sensors (e.g., 2D or 3D cameras), an infrared sensor array, a laser array, a scale, a gyroscope, a current sensor, a voltage sensor, a power sensor, a force sensor, a pressure sensor, and the like.

According to various embodiments, the obtained sensor data pertaining to the workspace comprises information from which a model of the workspace may be generated. For example, one or more characteristics associated with the workspace is determined based at least in part on the sensor data. The sensor data can be used in connection with determining at least one characteristic of one or more items within the workspace such as items in the source pile/flow of the chute, or an item grasped by the robotic arm. In some embodiments, the sensor data is used in connection with determining one or more characteristics of the conveyor such as determining the slots on the conveyor that are empty or unreserved, determining a speed of the conveyor, and/or determining the characteristics of at least one slot or of at least one item already on the conveyor.

At 445, a plan or strategy to singulate one or more items in the workspace is determined. In some embodiments, a robotic system determines the plan or strategy to pick at least one item from a source pile/flow in the workspace and to singly place the at least one item in a slot on the conveyor. The plan or strategy to singulate the one or more items is determined in various embodiments on a robot-by-robot basis such that if the robotic system includes a plurality of robots, each robot operates independent of the other robot(s).

According to various embodiments, the plan or strategy to singulate the one or more items in the workspace is determined based at least in part on the sensor data. For example, the plan or strategy to singulate the one or more items includes selecting an item within the source pile/flow that is to be singulated. The selected item can be identified from among other items or objects within the workspace based at least in part on the sensor data (e.g., the boundaries of the item and other items or objects within the workspace can be determined). As an example, one or more characteristics pertaining to the selected item is determined based at least in part on the sensor data. The one or more characteristics pertaining to the selected item can include a dimension of the item, a packaging of the item, one or more identifiers or labels on the item (e.g., an indicator that the item is fragile, a shipping label on the item, etc.), an estimated weight of the item, and the like, or any combination thereof. As another example, the plan to singulate the one or more items includes determining a location on the conveyance structure (e.g., a slot on the conveyor) at which the robotic structure (e.g., the robotic arm) is to singly place the item. The location on the conveyor at which the item is to be placed can be determined based at least in part on a timestamp, a speed of the conveyor, and one or more characteristics of a slot in the conveyor (e.g., an indication of whether the slot is occupied or reserved), and the like, or any combination thereof. As another example, the plan or strategy to singulate the one or more items includes determining a path or trajectory of the item along which the robotic arm is to move the item during singulation. The path or trajectory of the item along which the item is to be moved can be determined based at least in part on a location of one or more other objects within the workspace such as a frame of the chute, other items in the source pile/flow, items on the conveyor, other robots operating within the workspace, a reserved airspace for operation of other robots, sensors within the workspace, etc. For example, the path or trajectory of the item is determined to move a part of the item comprising an identifier (e.g., a shipping label) to an area at which a scanner is able to scan the identifier, or the path or trajectory of the item is determined to maximize a likelihood that the identifier on the item is read by one or more scanners along the path or trajectory.

According to various embodiments, the plan or strategy to singulate the one or more items is determined based at least in part on a cost associated with moving the one or more items. The system may determine the plan or strategy for moving an item based at least in part a cost of moving the item such as by determining a plan or strategy that minimizes a cost of moving the item. To minimize the cost of moving the item may include optimizing the cost subject to one or more predetermined conditions or constraints. In some embodiments, the system determines the plan or strategy for moving the item in a manner that moving the item according to the plan or strategy is expected to cost less than a cost value threshold. The costs associated with moving the item may be based at least in part on an attribute associated with the item (e.g., a size of the item), a location in the workspace from which the item is to be picked (e.g., a location on the chute), a destination location on the conveyor at which the item is to be placed, etc. In some embodiments, the presence of one or more other items or objects in the workspace (e.g., an item already on the conveyor) may impact a cost of moving an item according to a path/trajectory, etc.

The plan or strategy is determined based at least in part on one or more constraints associated with the robot or a model corresponding to the robot, which is generated based at least in part on one or more constraints associated with the robot (e.g., the degrees of freedom of the robot, a range across the various degrees of freedom of the robot, etc.)

According to various embodiments, the robot is an n-axis robot. For example, the robot is a 6-axis robot. The computer system determines a plan/strategy for controlling the robot to pick and place items (e.g., to singulate items) based on a solution space defined at least on the n-axis of the robot. N may be a positive integer. For example, the control computer determines a plan and/or strategy for performing the task (e.g., grasping the item from a source location, moving the item, and placing the item at a destination location, etc.). The control computer determines a path or trajectory along which the robot, or an item grasped by the robot, moves (e.g., a trajectory of the corresponding end effector). In some embodiments, the control computer uses a model that is based at least in part on the corresponding n-axes of the robot. For example, the control computer determines (e.g., selects) a plan/strategy (e.g., a path or trajectory) based on a set of constraints or solutions (e.g., the solution space). The set of constraints or solutions is based at least in part on the n-axes of the robot. As an example, the n-axes of the robot help define a set of possible locations and/or possible configurations of the robot. The set of possible locations and/or possible configurations can correspond to an oblong-shaped area (e.g., an ovoid), and locations within the oblong-shaped area can may be excluded from the set of possible locations and/or possible configurations because the robot is unable to position itself in the location or configuration because of constraints such as constraints of the robot joints, or because such locations or configurations do not satisfy a threshold such as an efficiency threshold (e.g., the robot has difficulty configuring itself in such a configuration, etc.). The control computer can determine the plan based at least in part on determining an optimal plan (e.g., an optimal path), such optimal plan including an additional degree of freedom corresponding to the one or more additional axis (e.g., moving the robot to a location within a threshold distance of the working area where the robot is operating). The control computer can determine the plan based at least in part on determining a plan that satisfies one or more thresholds such as a maximum cost threshold (e.g., the cost can be determined according to a predefined cost function of the model, etc.). Various other thresholds can be implemented, such as an efficiency threshold, a time threshold, a speed threshold, etc.

At 440, the item is singulated. In some embodiments, the item is singulated in response to the plan or strategy for singulating the item being determined. For example, a robotic arm is operated to pick one or more items from the workspace and place each item singly in a corresponding location in a singulation conveyor. The singulation of the item comprises picking the item from the workspace (e.g., from the source pile/flow) and singly placing the item on the conveyor. The robot system singulates the item based at least in part on the plan or strategy for singulating the item.

In connection with singulating the item, the control computer controls to move the robot in the one or more additional dimensions such as along the direction defined by a rail to which the robot is mounted. Moving the robot in the one or more additional dimensions enables robot to use an efficient or optimal strategy for moving an end effector or item grasped by the end effector through the working area. In some embodiments, an extent to which the robot is moved in the one or more additional dimensions during implementation of a task is constrained by one or more predefined thresholds. For example, the control computer controls to move the robot with respect to the one or dimensions up to an extent that robot remains within proximity of the source location or working area.

At 445, a determination is made as to whether further items are to be singulated. If there are more items, a further iteration of steps 430, 435, 440, and 445 is performed, and successive iterations are performed until it is determined at 445 that there are no more items in the chute (or other receptacle or source) to be picked and placed.

Figure 4C:
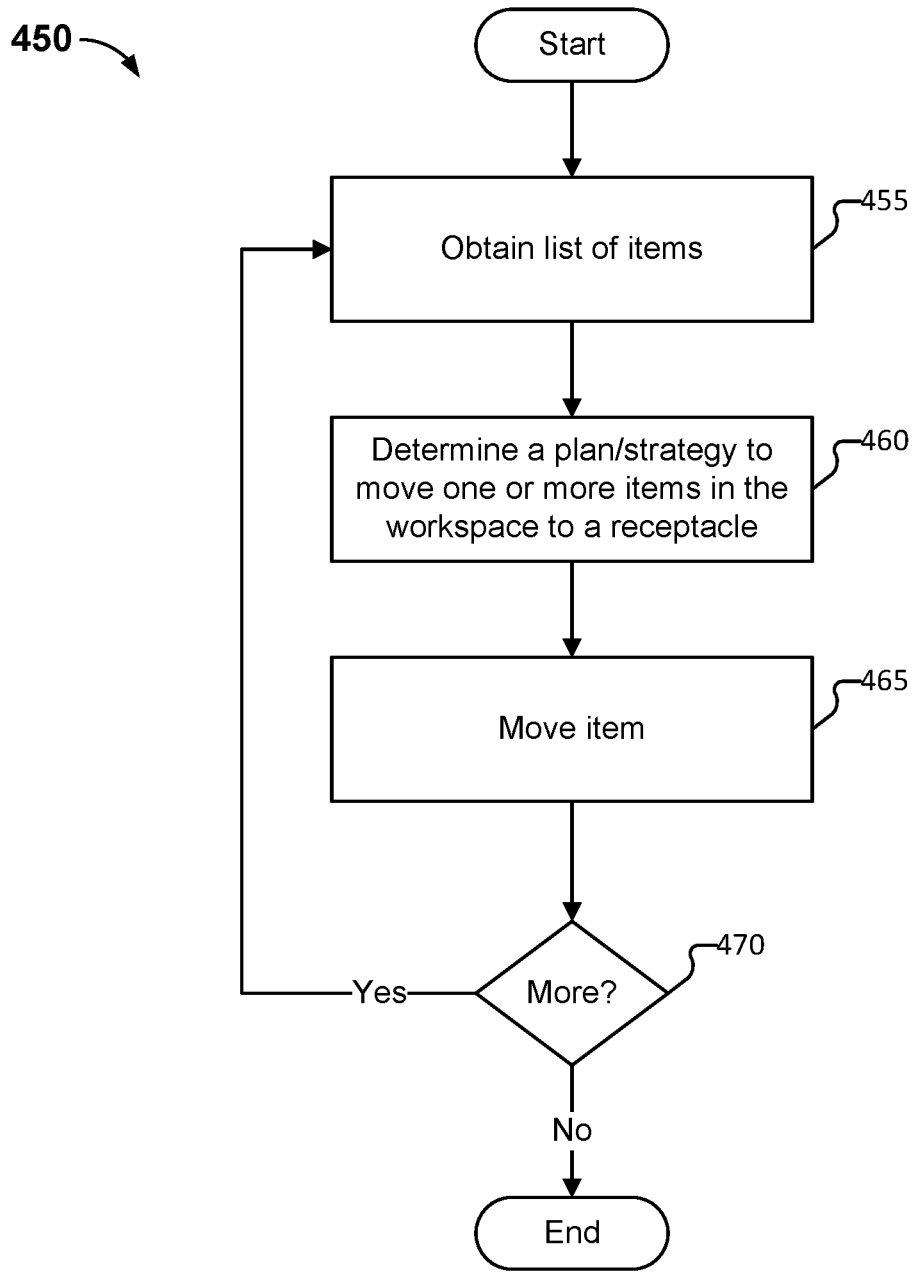
FIG. 4C is a flow chart illustrating an example of a process to assemble a kit of items to various embodiments.

FIG. 4C is a flow chart illustrating an example of a process to assemble a kit of items to various embodiments. In some embodiments, process 450 is implemented by a robot system operating to kit one or more items within a workspace. The robot system includes one or more processors which operate, including by performing the process 450, to cause a robotic structure (e.g., a robotic arm) to pick and place items for assembling a set of items into a kit.

At 455, a list of items is obtained. In some embodiments, a robotic system obtains a list of items to assembly into one or more kits. The robotic system can be a kitting system, such as kitting system 200 of FIG. 2A. The list of items may be obtained from an invoice or manifest such as an invoice or manifest corresponding to an order, or otherwise obtained from an order or information indicating that a set of items is to be provided to another location. The list of items may be obtained from a data structure such as a data structure shared with a warehouse system or with another robotic system.

At 460, a plan or strategy to move one or more items in the workspace is determined. In some embodiments, a robotic system determines the plan or strategy to pick at least one item from a shelf (e.g., a shelf of a shelf machine) in the workspace and to place the at least one item in a receptacle such as a box, tray, tote, bag, or other receptacle. The receptacle may be on a conveyor. The plan or strategy pick and place the one or more items may be determined in various embodiments on a robot-by-robot basis such that if the robotic system includes a plurality of robots, each robot operates independent of the other robot(s).

The plan or strategy to move the one or more items may be determined based at least in part on sensor data pertaining to the workspace. In some embodiments, a robotic system obtains the sensor data pertaining to the workspace from one or more sensors operating within the system. As an example, the sensor data is obtained based at least in part on outputs from image sensors (e.g., 2D or 3D cameras), an infrared sensor array, a laser array, a scale, a gyroscope, a current sensor, a voltage sensor, a power sensor, a force sensor, a pressure sensor, and the like.

According to various embodiments, the obtained sensor data pertaining to the workspace comprises information from which a model of the workspace may be generated. For example, one or more characteristics associated with the workspace is determined based at least in part on the sensor data. The sensor data can be used in connection with determining at least one characteristic of one or more items within the workspace such as items on a shelf or on a shelf system, or an item grasped by the robotic arm. In some embodiments, the sensor data is used in connection with determining one or more characteristics of the conveyor such as determining the slots or receptacles on the conveyor that are empty or unreserved, determining a speed of the conveyor, and/or determining the characteristics of at least one slot or of at least one item already on the conveyor.

According to various embodiments, the plan or strategy to move the one or more items in the workspace is determined based at least in part on the sensor data. For example, the plan or strategy to move the one or more items includes selecting an item within that is to be moved. The selected item can be identified from among other items or objects within the workspace (e.g., other items on shelves) based at least in part on the list of items and/or sensor data (e.g., the boundaries of the item and other items or objects within the workspace can be determined). As an example, one or more characteristics pertaining to the selected item is determined based at least in part on the sensor data. The one or more characteristics pertaining to the selected item can include a dimension of the item, a packaging of the item, one or more identifiers or labels on the item (e.g., an indicator that the item is fragile, a shipping label on the item, etc.), an estimated weight of the item, and the like, or any combination thereof. As another example, the plan to move the one or more items includes determining a location on the conveyor (e.g., a slot or receptacle on the conveyor) at which the robotic structure (e.g., the robotic arm) is to place the item. The location on the conveyor at which the item is to be placed can be determined based at least in part on a timestamp, a speed of the conveyor, and one or more characteristics of a slot or receptacle in the conveyor (e.g., an indication of whether the slot is occupied or reserved, an identifier associated with the slot or receptacle such as in the case that an identifier on a receptacle is mapped to a manifest, etc.), and the like, or any combination thereof. As another example, the plan or strategy to move the one or more items includes determining a path or trajectory of the item along which the robotic arm is to move the item. The path or trajectory of the item along which the item is to be moved can be determined based at least in part on a location of one or more other objects within the workspace such as a frame of the chute, other items in on a shelf or shelf system, items on the conveyor, other robots operating within the workspace, a reserved airspace for operation of other robots, sensors within the workspace, etc. For example, the path or trajectory of the item is determined to move a part of the item comprising an identifier (e.g., a shipping label) to an area at which a scanner is able to scan the identifier, or the path or trajectory of the item is determined to maximize a likelihood that the identifier on the item is read by one or more scanners along the path or trajectory.

According to various embodiments, the plan or strategy to move the one or more items is determined based at least in part on a cost associated with moving the one or more items. The system may determine the plan or strategy for moving an item based at least in part a cost of moving the item such as by determining a plan or strategy that minimizes a cost of moving the item. To minimize the cost of moving the item may include optimizing the cost subject to one or more predetermined conditions or constraints. In some embodiments, the system determines the plan or strategy for moving the item in a manner that moving the item according to the plan or strategy is expected to cost less than a cost value threshold. The costs associated with moving the item may be based at least in part on an attribute associated with the item (e.g., a size of the item), a location in the workspace from which the item is to be picked (e.g., a location on the shelf or shelf system), a destination location on the conveyor at which the item is to be placed, a particular receptacle in which to place the item (e.g., different receptacles may be located on different conveyors), etc. In some embodiments, the presence of one or more other items or objects in the workspace (e.g., an item or receptacle already on the conveyor, an item already in the receptacle to which the current item is to be moved, etc.) may impact a cost of moving an item according to a path/trajectory, etc.

According to various embodiments, the plan or strategy to move the one or more items in the workspace is determined based at least in part on a constraint of the corresponding robot, or a model corresponding to such robot. The plan or strategy to move the one or more items includes a determination of whether move the robot along one or more additional axes while picking and placing a particular item. For example, the robot is controlled to move to a general working area corresponding to the workspace at which the robot is to engage the item, and the robot is controlled to move along one or more additional axes within a threshold distance of the working area such as to facilitate the robot to avoid an awkward configuration or to enable the robot to move the item along a trajectory that would have not been possible if the robot was static with respect to the one or more additional axes (e.g., if the robot was maintained in a single location in the working area).

At 465, the item is moved. In some embodiments, the item is picked and placed in response to the plan or strategy to move the one or more items being determined. For example, a robot is operated to pick one or more items from the workspace and place each item in a corresponding location in a receptacle. The singulation of the item comprises picking the item from the workspace (e.g., from the corresponding shelf) and placing the item on the conveyor or otherwise in the applicable receptacle. The robot system picks and places the item based at least in part on the plan or strategy for moving the item.

At 470, a determination is made as to whether further items are to be picked and placed, such as in connection with assembling/packing a kit. If there are more items, a further iteration of steps 455, 460, and 465 is performed, and successive iterations are performed until it is determined at 470 that there are no more items in the chute (or other receptacle or source) to be picked and placed.

Figure 5A:
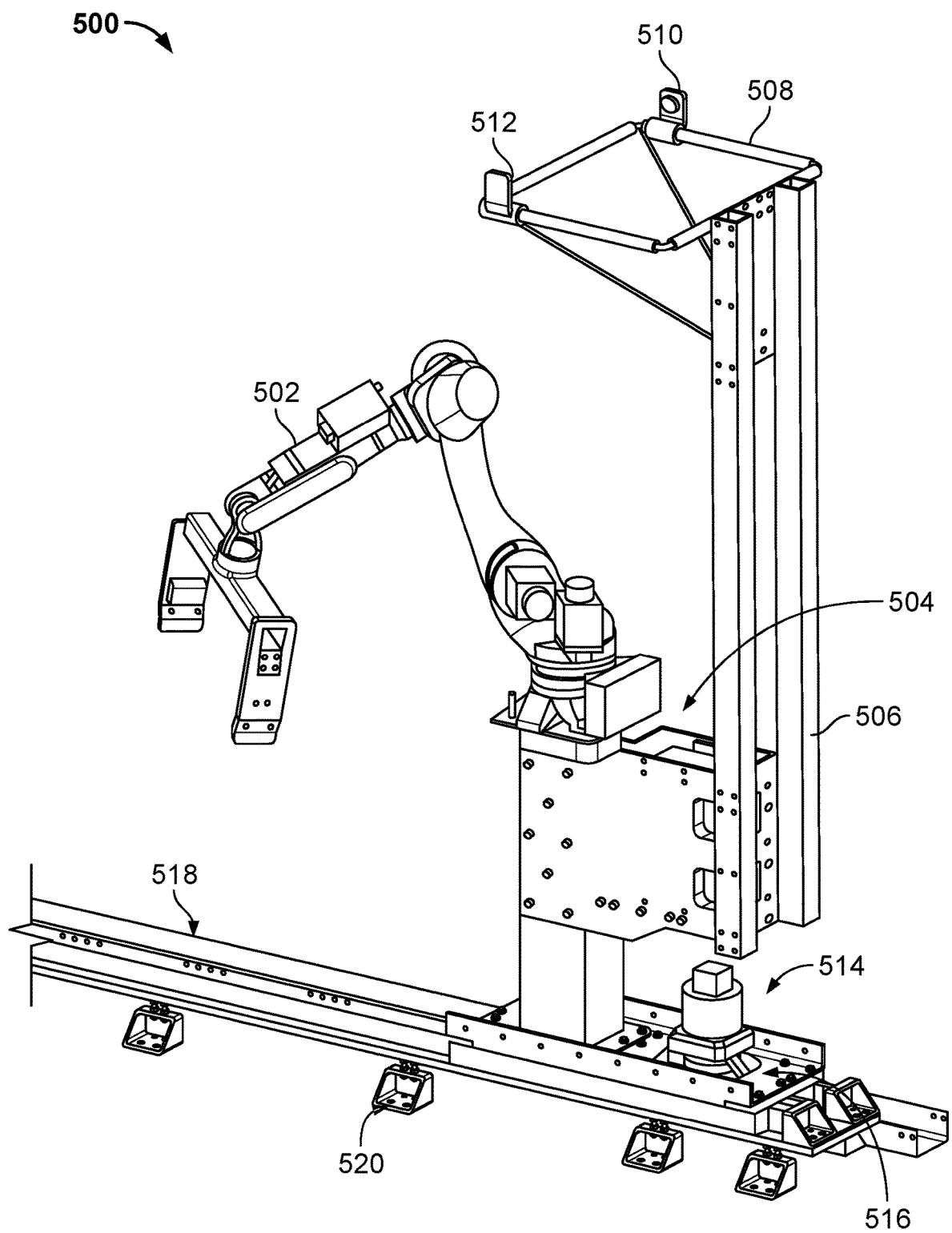
FIG. 5A is a diagram of a robotic system according to various embodiments.

FIG. 5A is a diagram of a robotic system according to various embodiments. In the example shown, robotic system 500 includes a robot 502 (e.g., a robotic arm) and rail 518. Robot 502 is an n-axis robot that is implemented to perform singulation, kitting, or palletizing/de-palletizing items. In the example illustrated in FIG. 5A, robot 502 is a 6-axis robot. Robot 502 comprises an end effector, which can be selected or configured based on a type of task to be performed and/or the item with respect to which the task is to be performed. Examples of types of end effectors can include a pneumatic-controlled end effector, a pincer, a suction-based end effector such as a configuration of one or more suction cups, a hand, a gripper, a magnet, etc. Various other types of end effectors may be implemented.

According to various embodiments, robotic system 500 moves robot 502 along one or more additional axes in connection with performing a task with respect to an item. For example, rail 518 corresponds to an additional axis (e.g., a 7th axis) of robotic system 500. The system (e.g., a control computer) controls robot 502 to operate to implement a strategy to perform a task using one or more of the n-axis of the robot 502 and the additional axes defined by rail 518. In contrast to related art systems that moves a robot along a rail to a predefined location and then performs a task while remaining in a static location with respect to the rail, robotic system 500 leverages the additional axes defined by rail 518 in connection with performing the task in the working area. The use of the additional axes enables robot 502 to reach certain locations or to move an item along a trajectory, which respectively may have been inefficient or not possible (e.g., based on constraints of the joints of the robot) if the robot is maintained in a static position relative to the rail while performing the task.

In connection with using the additional axes as an additional degree of freedom of robot 502, robot 502 is configured to attenuate, reduce, or otherwise be resilient with respect to backlash or other forces that are generated when robot 502 is moved or operating to move an item. Robotic system 500 comprises an extremely stiff and secure mounting position for robot 502 in order to avoid backlash during operation.

According to various embodiments, robot 502 comprises carriage 504. Carriage 504 can be a customizable carriage so that carriage can be customized according to the implementation of robot 502.

Carriage 504 can provide support for cameras, sensors, etc. In the example shown, carriage 504 includes a superstructure comprising vertical structure 506 and upper frame 508 provides mounting locations for 3D cameras 510, 512. Various other sensors can be mounted on upper frame 508. In various embodiments, one or more 3D cameras may be placed near the base of the robot. In some embodiments, one or more sensors mounted to carriage 504 (e.g., to the vertical structure 506 and/or upper frame 508) extend a range of a vision by robotic system 500. The cameras, sensors, etc. can obtain information pertaining to the working area of robot 502, such as image data, etc. The image data can be used in connection with detection of an item within the working area, identification of an obstacle within the working area, etc. In various embodiments, the image data may be used to do one or more of the following: avoid collisions with other robots, receptacles (e.g., tray stacks, pallets, trays etc.), and other items present in the workspace; plan trajectories; and position the end effector of robot 502 and/or an item (e.g., tray, box, package, etc.) in the grasp of the end effector of robot 502 in at least an initial position under position control.

In some embodiments, the cameras 510 and 512 are included in a vision system used to control of a robotic system as disclosed herein. In some embodiments, the vision system is designed to self-calibrate. The robot uses a marker that is installed on one of its joints and exposes the marker to the cameras in the system, e.g., cameras 510 and 512, which recognize the marker and perform a pose estimation to understand their own pose in world coordinates. The robot plans its motion using collision avoidance to get the marker into a position close to the cameras to get a high-quality calibration.

Carriage 504 provides a strong and rigid mounting position for robot 502. The mounting position can be customizable such as according to a particular robot 502 mounted thereon, or an application for which robot 502 is being deployed. For example, in the case of applications in which robot 502 will be moving large items (e.g., heavy items) or in which robot 502 will be operating at relatively fast speeds and accelerations, carriage 504 is configured to be relatively more robust (e.g., more rigid, stronger, etc.) so that robot 502 is not significantly impacted (or not impacted) by backlash or other forces generated during operation of robot 502.

In some embodiments, robotic system 500 comprises an integrated drivetrain 514. Integrated drivetrain 514 can comprise a drivetrain assembly that provides for control of the robot along the additional axis defined by rail 518. For example, integrated drivetrain 514 is controlled to cause robot 502 to move along rail 518, such as in connection with implementing a particular task. Integrated drivetrain 514 uses the one or more additional axes (e.g., the additional axis defined by rail 518) as an additional degree of freedom for the robot itself. In some embodiments, robotic system 500 comprises software that enables control to move robot 502 along rail 518 during implementation of a task. Firmware for related art robots does not expose (or integrate) control of movement of the robot along a rail to which robot is mounted. In contrast, various embodiments provide linear drivetrain (with respect to rail 518) that provides a similar level of controllability to the other n-axis of robot 502.

According to various embodiments, carriage 504 is configured to have a channel or opening via which lines or cables (e.g., air lines for providing suction, power lines, network cables, communication lines from sensors, etc.) are routed. The carriage 504 can be shaped to channel the lines or cables in a manner that prevents the lines or cables from interfering with operation of the robot, etc.

In some embodiments, robotic system 500 comprises a mechanism to adjust backlash in a rack and pinion powertrain assembly 516 (also referred to herein as backlash adjustment mechanism or tuning module). Backlash adjustment mechanism 516 is used to adjust the extent to which robot 502 is subject to backlash or other forces during operation. In a rack and pinion powertrain assembly, an extent to which the gears are engaged with one another can impact an amount of backlash or other force experienced by robot 502. As an example, an extent to which teeth of corresponding gears are engaged impacts amount of backlash or other force experienced by robot 502 and the movability of robot 502 along rail 518. If the gears are not sufficiently engaged, the corresponding teeth of the gears can rattle (e.g., space between teeth of corresponding gears can cause robot 502 to be subject to backlash). Conversely, if gears are engaged to too much, the gears can seize up thereby preventing (or inhibiting) rotation of gears which thus prevents (or inhibits) translation of robot 502 (e.g., the carriage on which robot is mounted) along rail 518. Various embodiments thus comprise a backlash adjustment mechanism with respect to integrated drivetrain 514 to allow for controlled turning of the powertrain (e.g., to allow a use to finely tune backlash, such as via engagement of complementary teeth of gears).

According to various embodiments, backlash adjustment mechanism 516 comprises a mounting frame, a shoulder fastener, and an adjustable length coupling device.

The mounting frame has an opening defined therein to receive an operative end of a drive assembly. An operative end of the drive assembly has a power-driven pinion mounted on or near a distal end of the operative end of the drive assembly. The drive assembly has a mounting flange that is larger than the opening. In some embodiments, the mounting frame and mounting flange include complementary sets of holes each set including a hole in the mounting frame and a corresponding hole in the mounting flange.

The shoulder fastener is positioned through a first complementary set of holes at a first end of the mounting flange to movably couple the mounting flange to the mounting frame. The fastener is fastened in a manner such that the mounting flange and drive assembly have freedom to pivot about a longitudinal axis of the first complementary set of holes.

The adjustable length coupling device has a first end coupled mechanically to the mounting plate and a second end coupled mechanically to the mounting flange at a location substantially opposite the first end of the mounting flange. The first end of the adjustable length coupling device is coupled to the mounting plate and the second end of the adjustable length coupling device is coupled to the mounting flange such that adjustment of the length of the coupling device causes the mounting flange and components of the drive assembly attached directly or indirectly to the mounting flange to rotate about said longitudinal axis of the first complementary set of holes resulting in a corresponding adjustment to the backlash of the rack and pinion powertrain assembly.

According to various embodiments, rail 518 extends along at least one direction. Rail 518 can correspond to an additional axis along which robot 502 can be moved in connection with performing a task. In some embodiments, rail 518 comprises a plurality of rail segments. The rail segments are coupled to one another to form a continuous rail. In some embodiments, rail 518 comprises one or more anchors (or rail feet) which rail 518 uses to rest on the ground (or via which rail 518 is anchored to the ground such by bolts provided in through holes of the one or more anchors. In some embodiments, the one or more anchors (or the coupling of the corresponding rail segments to the one or more anchors) are adjustable to level rail 518 across the additional axis defined by rail 518 and/or to align corresponding rail segments.

Figure 5B:
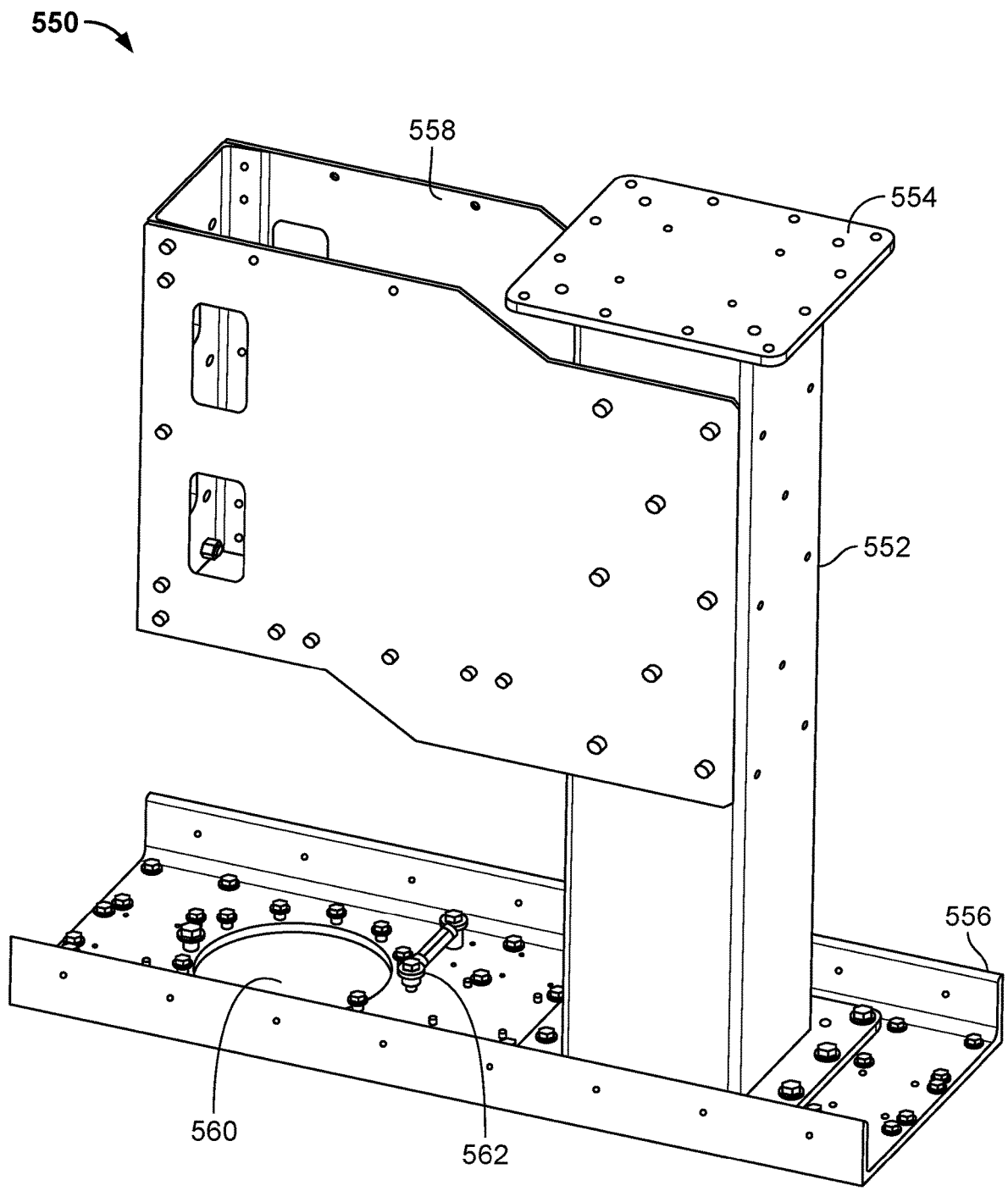
FIG. 5B is diagram of a carriage assembly of a robotic system according to various embodiments.

FIG. 5B is diagram of a carriage assembly of a robotic system according to various embodiments. In some embodiments, carriage 550 corresponds to, or is similar to, carriage 504. In the example shown, carriage 550 comprises riser 552, mounting plate 554, and base 556. A robot can be mounted to mounting plate 554 to enable a robotic system to move robot along a rail, etc. The mounting plate 554 can provide a rigid/stiff support for robot such that if robot is securely mounted to mounting plate 554 backlash is reduced or attenuated. In some cases, if a sufficiently rigid mounting plate 554 and riser 552 are implemented, then backlash may be eliminated. For example, riser 552 and mounting plate 554 are rigid and do not translate backlash or other forces to a robot mounted on mounting plate 554 (or riser 552 and mounting plate 554 attenuate the backlash or other forces, such as to only translate insignificant backlash). In some embodiments, the robot is an off-the-shelf robot that is commercially available by various robot manufacturers.

Base 556 provides support for riser 552 and is coupled to (e.g., disposed on) the rails along which carriage 550 traverses. Base 556 can correspond to a mounting frame (e.g., a mounting frame for the backlash adjustment mechanism). Base 556 comprises an opening 560. Opening 560 is configured to receive an operative end of a drive assembly. The operative end of the drive assembly can a power-driven pinion mounted on or near a distal end of the operative end of the drive assembly. Base 556 further comprises adjustable length coupling device 562 to adjust/tune a backlash of the robotic system (e.g., to tune an engagement of gears in the powertrain).

In some embodiments, carriage 550 comprises support structure 558. Support structure 558 can provide a customizable support for mounting cameras, sensors, etc. For example, a vertical structure (e.g., vertical structure 506 of robotic system 500) is coupled to support structure 558, and such a vertical structure can extend a vision of the robotic system such as by providing a vantage of the workspace. Support structure 458 can be provided to provide clearance between a vertical structure and a working area within which the mounted robot operates.

Figure 6:
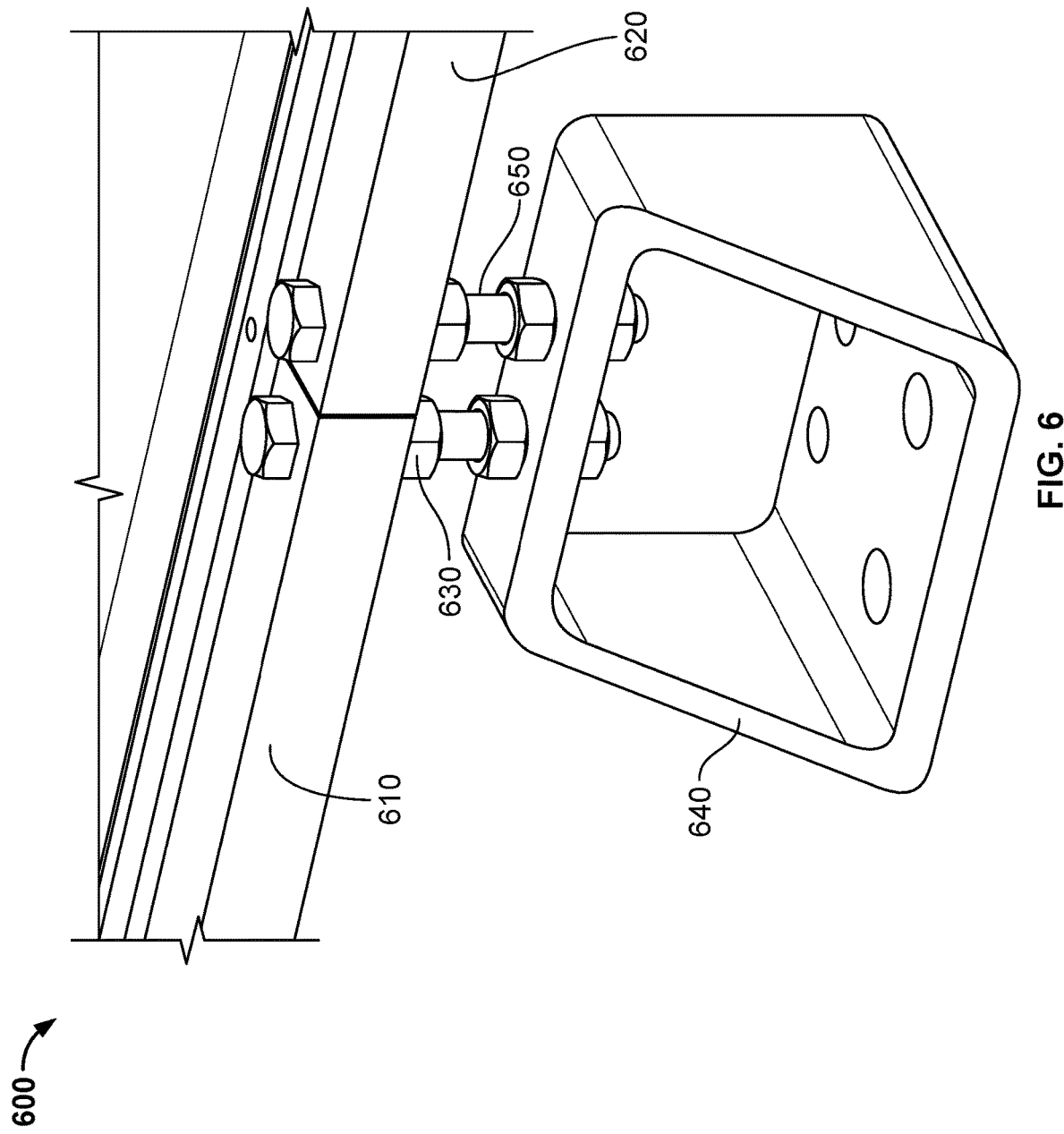
FIG. 6 is diagram of an anchoring mechanism for a guide rail of a robotic system according to various embodiments.

FIG. 6 is diagram of an anchoring mechanism for a guide rail of a robotic system according to various embodiments. In some embodiments, a robotic system comprises an anchoring mechanism to ensure proper levelling of a guide rail (e.g., a guide mechanism such as rail 518 of robotic system 500 of FIG. 5A). The anchoring mechanism can also be used to provide alignment among rail segments. According to various embodiments, the anchoring mechanism is configured to securely anchor the rail at a location at which the robotic system is deployed.

In the example shown, an anchoring point 600 of the anchoring mechanism is illustrated. Anchoring mechanism comprises a foot 640 that provides support for a rail. In the example shown, foot 640 provides support for rail segments 610 and 620 of a rail. The foot can have one or more mechanisms for coupling foot 640 to a ground or surface of the location at which the robotic system is deployed. For example, foot 640 can comprise one or more through holes via which a bolt is inserted to couple foot 640 to the ground or other surface.

According to various embodiments, the anchoring mechanism comprises a levelling mechanism. For example, the levelling mechanism is integrated with anchoring mechanism. For example, as illustrated, anchoring point 600 comprises leveling mechanism 630. Levelling mechanism 630 can be used to finely adjust individual rail segment, such as rail segment 610. Anchoring point 600 can comprise a plurality of levelling mechanisms 630 and 650 to provide levelling control with respect to each of the rail segments directly supported by anchoring point 600 (e.g., levelling mechanism 630 is used to adjust rail segment 610 and levelling mechanism 650 is used to adjust rail segment 620). The levelling mechanism 630 can be a screw or bolt that couples the rail segment 610 to anchoring point 600 (e.g., to foot 640). The levelling mechanism can be adjusted to ensure that corresponding rail segments are aligned (e.g., that rail segment 610 and segment 620 are aligned) and that the rail supported by the rails segments is level.

Figure 7:
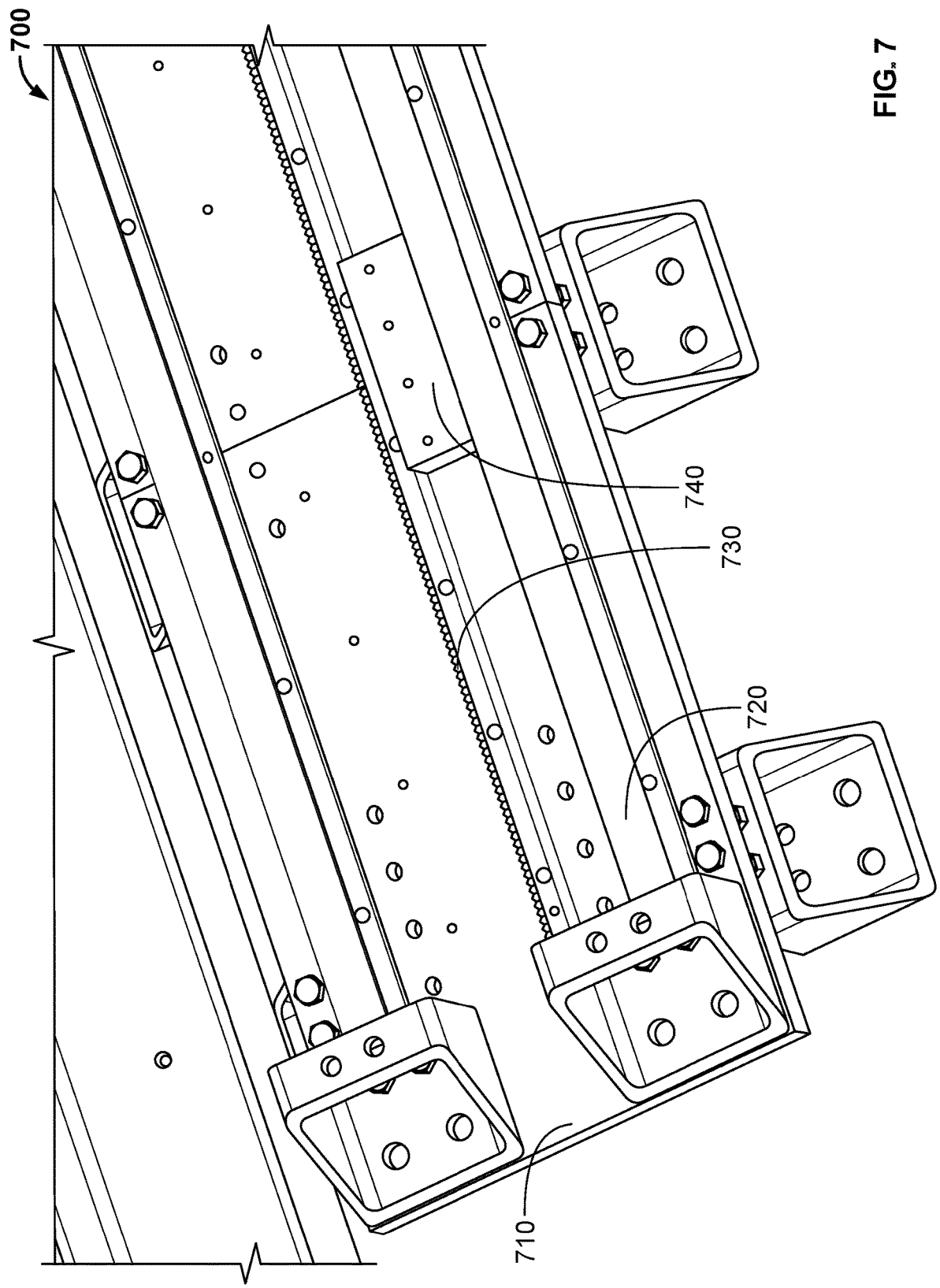
FIG. 7 is diagram of a guide rail of a robotic system according to various embodiments.

FIG. 7 is diagram of a guide rail of a robotic system according to various embodiments. In some embodiments, a robotic system comprises a guide mechanism 700 that enables a robotic system to move a robotic arm (e.g., a robot mounted to a carriage) along a rail. Guide mechanism ensure that the robotic arm securely and efficiently traverses the rail.

According to various embodiments, guide mechanism 700 comprises a plurality of rail segments that are aligned (and levelled) to provide support for a rail that extends along an axis (e.g., an axis that can be used to increase the degrees of freedom for controlling a robot to perform a task). In the example shown, a first rail segment and a second rail segment are provided. The first fail segment comprises base plate 710. Base plate 710 provides support for the rail and is anchored to the ground via an anchoring mechanism (e.g., a foot, etc.). The base plates for the plurality of rail segments can be configured to require minimal precision-machined features. In some embodiments, only mounting holes that couple a base plate to the anchoring mechanism, a rail 720 and a gear rack 730 requires precision machining. The minimal precision-machined features of the base plate reduce the cost of the robotic system and allow for a quick deployment/installation of the robotic system.

Guide mechanism 700 includes a rail 720 along which a carriage (e.g., to which a robot is mounted) traverses. In some embodiments, guide mechanism 700 includes gear rack 730 with which a powertrain assembly comprised in the carriage interfaces to control movement of the carriage along rail 720.

In some embodiments, a guide tool 740 (also referred to herein as an alignment tool) is used to align one or more of the base plates, the gear rack, and the rail(s). In some embodiments, the guide tool 740 is used to align all of the base plates, the gear rack, and the rail(s). For example, a single guide tool 740 is used to align the base plates, the gear rack, and the rail(s) with respect to a set of two rail segments. Guide tool 740 is inserted and a position of guide tool 740 is set using pins that extent through guide tool 740 to corresponding holes or recesses in the rail segments being aligned/installed. After the guide mechanism is properly aligned/calibrated (e.g., the various rail segments are levelled, etc.), guide tool 740 is removed during normal operation of the robotic system. Guide tool 740 is a cost effective and very quick mechanism for ensuring proper installation and/or alignment of the rail segments of a guide mechanism 700.

According to various embodiments, the use of a set of rail segments to constitute a length of guide mechanism 700 ensures that the robotic system is extensible for different configurations (e.g., configurations set based on customer preference, or intended operation for which robot is being deployed). As an example, the length of the rail is adjustable/configurable because of the use of a set of rail segments to constitute a length of guide mechanism 700. To increase the length of the rail additional rail segments can be installed. Conversely, to decrease the length of the rail certain rail segments can be removed. In some embodiments, each of the rail segments has the same dimensions (e.g., at least in the direction along which the rail extends).

Figure 8A:
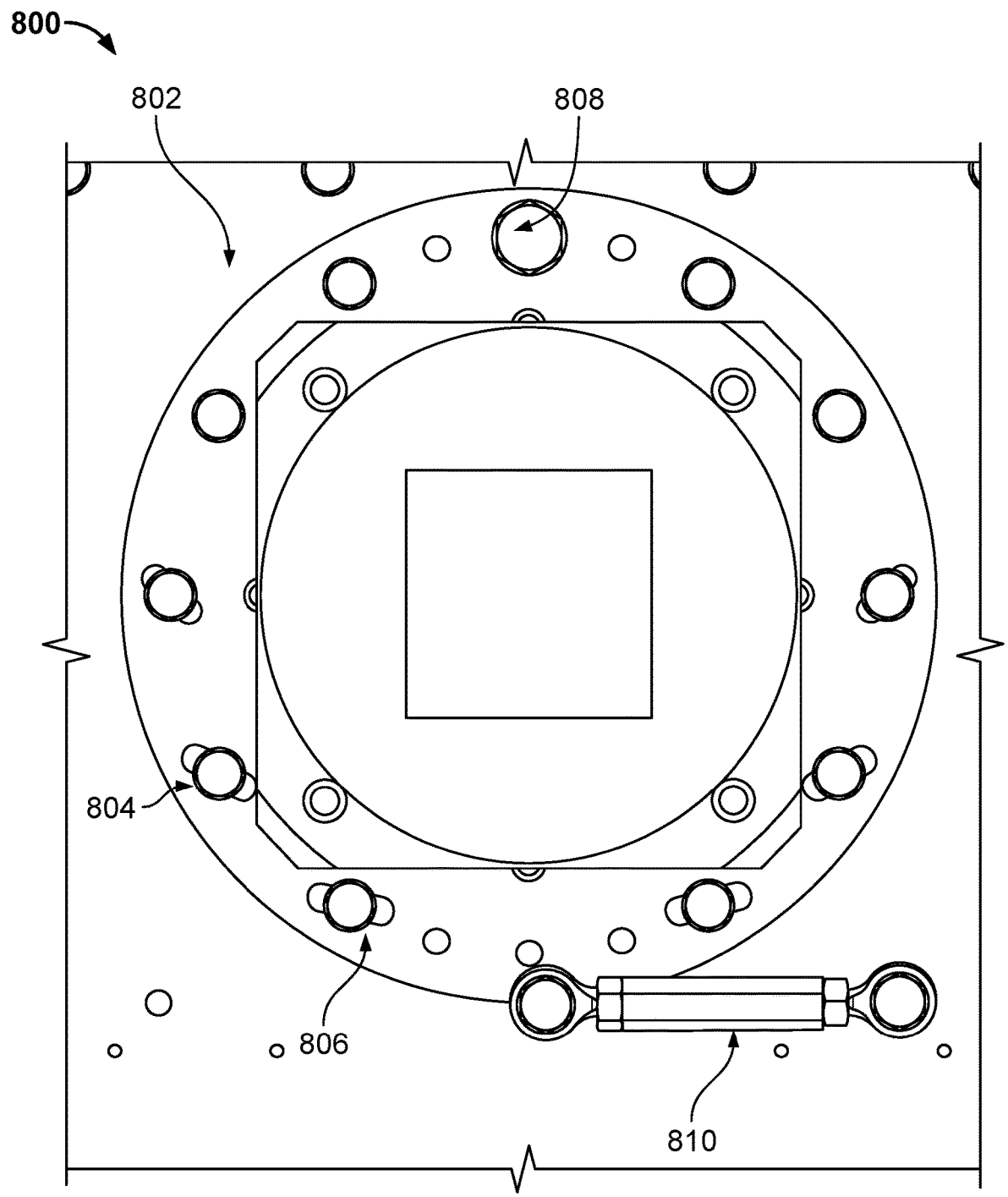
FIG. 8A is diagram of a backlash adjustment mechanism according to various embodiments.

FIG. 8A is diagram of a backlash adjustment mechanism according to various embodiments. In some embodiments, adjustable backlash mechanism corresponds to, or is similar to, backlash adjustment mechanism 516 of robotic system 500 of FIG. 5A.

Backlash adjustment mechanism 800 is used to adjust the extent to which a robot is subject to backlash or other forces during operation. In a rack and pinion powertrain assembly, an extent to which the gears are engaged with one another can impact an amount of backlash or other force experienced by the robot. As an example, an extent to which teeth of corresponding gears are engaged impacts amount of backlash or other force experienced by the robot and the movability of the robot along a rail. If the gears are not sufficiently engaged, the corresponding teeth of the gears can rattle (e.g., space between teeth of corresponding gears can cause the robot to be subject to backlash). Conversely, if gears are engaged to too much, the gears can seize up thereby preventing (or inhibiting) rotation of gears which thus prevents (or inhibits) translation of the robot (e.g., the carriage on which robot is mounted) along the rail.

In the example shown, backlash adjustment mechanism 800 comprises a mounting frame 802 with which a powertrain assembly is mounted to a carriage (e.g., the carriage to which a robot is mounted and that traverses a rail, etc.) and a plurality of slots via which the powertrain assembly is coupled. For example, backlash adjustment mechanism 800 comprises a plurality of slots and corresponding fasteners (e.g., slots and fasteners 804, 806) with which the powertrain assembly is coupled to carriage. The plurality of slots and corresponding fasteners securely lock the powertrain in place during operation.

In some embodiments, backlash adjustment mechanism 800 comprises a shoulder bolt 808. Shoulder bolt 808 can serve as a pivot point for the mounting of the powertrain assembly. As an example, at least a subset of the plurality of slots (e.g., to which fasteners are inserted for coupling the powertrain assembly) are centered around the pivot point to which shoulder bolt 808 is inserted. The shoulder bolt 808 can be used to insert the powertrain assembly and align the powertrain assembly with the carriage. For example, shoulder bolt 708 is inserted to the pivot point as the powertrain assembly is installed at the carriage. The powertrain assembly can be rotated around shoulder bolt 808 until the holes (e.g., the slots) in the mounting frame 802 are aligned with the carriage, at which point the fasteners can be correspondingly inserted in the plurality of holes and configured (e.g., tightened) to securely couple the powertrain assembly to the carriage. The slots can be oval shaped to allow for quick alignment of the slots with corresponding holes/recesses in the carriage or other surface to which the powertrain assembly is to be mounted.

According to various embodiments, backlash adjustment mechanism 800 comprises adjustable length coupling device 810. Adjustable length coupling device 810 is actuated (e.g., turned) to adjust the backlash of the robotic system (or at least with respect to the powertrain of the robotic system). In some embodiments, backlash adjustment mechanism 800 (e.g., adjustable length coupling device 810) adjusts a position of the pinion relative to a rack gear with which the pinion is configured to be engaged mechanically when the operative end of the drive assembly is passed through the opening in the mounting frame.

Figure 8B:
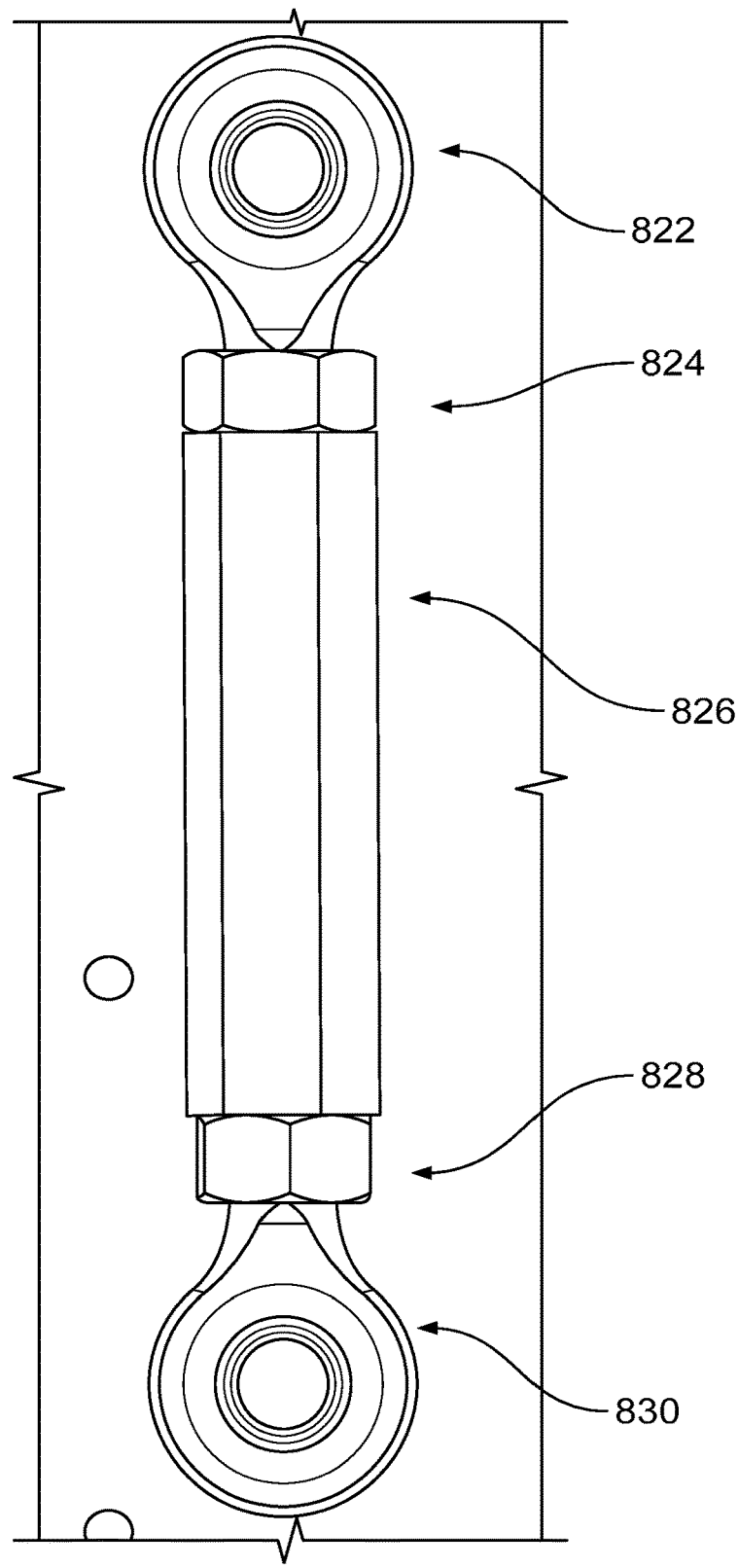
FIG. 8B is diagram of an adjustable length coupling device according to various embodiments.

FIG. 8B is diagram of an adjustable length coupling device according to various embodiments. In some embodiments, adjustable length coupling device 820 correspond to, or is similar to adjustable length coupling device 810 of backlash adjustment mechanism 800 of FIG. 8A.

Adjustable length coupling device 820 has a first end 822 coupled mechanically to the mounting plate and a second end 830 coupled mechanically to the mounting flange at a location substantially opposite the first end 822 of the mounting flange. The first end 822 of the adjustable length coupling device is coupled to the mounting plate and the second end 830 of the adjustable length coupling device is coupled to the mounting flange such that adjustment of the length of the coupling device causes the mounting flange and components of the drive assembly attached directly or indirectly to the mounting flange to rotate about said longitudinal axis of the first complementary set of holes resulting in a corresponding adjustment to the backlash of the rack and pinion powertrain assembly.

In some embodiments, adjustable length coupling device 820 is a turnbuckle having a first end 822 and a second end 830. The turnbuckle comprises a threaded end fitting at each end. Turning the turnbuckle body in one direction brings end fittings closer together. For example, turning the turnbuckle body adjusts (e.g., increases) the tension between the end fittings. Conversely, turning the turnbuckle body in an opposite direction pushes end fittings further apart (e.g., decreases the tension between the end fittings).

According to various embodiments, adjustable length coupling device 820 (e.g., a turnbuckle) is cost effective, easy to manufacture, and easy to adjust. Further, in some embodiments, adjustable length coupling device 820 does not require highly precise parts or expertise to actuate. Upon installation and calibration of the robotic system, a setting of the turnbuckle can be saved to facilitate ease in reconfiguring the robotic system. For example, the turnbuckle can be marked with the location corresponding to the setting of the turnbuckle when calibrated. The implementation of turnbuckle as the adjustable length coupling device 820 improves the easy with which the robotic system can be maintained. For example, if the robotic system is to be maintained, the turnbuckle can be actuated to completely disengage the drivetrain from the baseplate gears (e.g., the gear(s) on the guide mechanism), and the carriage can be freely moved such as to move the carriage and robot from its current location to a desired location along the rail to provide sufficient space for maintenance. Upon completion of the maintenance operations, the robotic system can be quickly reconfigured by repositioning the drivetrain with respect to the gears on the guide mechanism. For example, the turnbuckle can be turned to the calibrated position (e.g., using the marked spot/setting of the turnbuckle corresponding to position when the robotic system is calibrated). Such actuation of the turnbuckle and calibration of the robotic system can be performed without precise measurement.

According to various embodiments, the turnbuckle is fixed at a side corresponding to the gear rack (e.g., the gear(s) on the guide mechanism) such that when the turnbuckle is actuated the turnbuckle pulls the powertrain.

Figure 9:
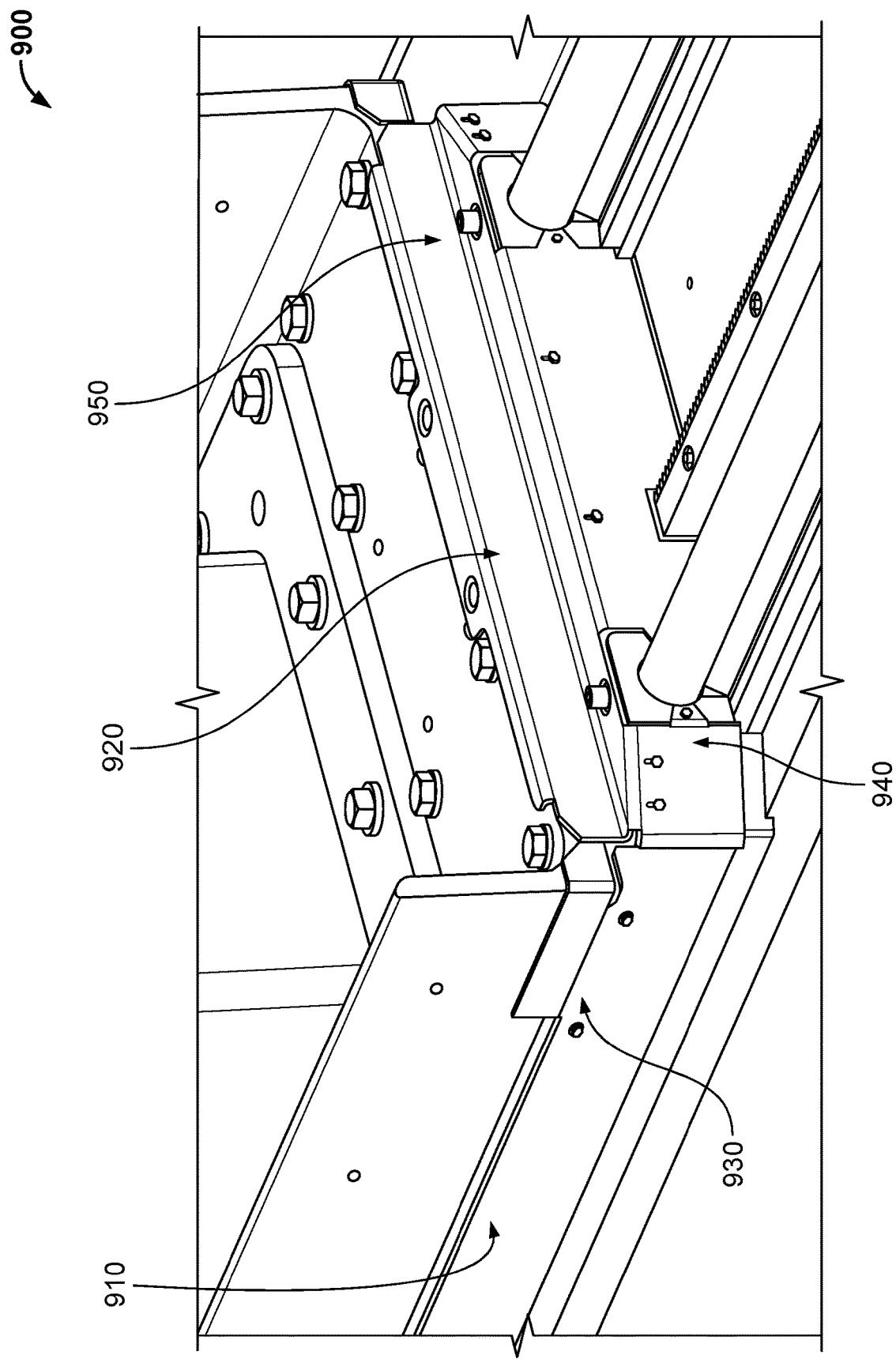
FIG. 9 is a diagram of a carriage for a robotic system according to various embodiments.

FIG. 9 is a diagram of a carriage for a robotic system according to various embodiments. In the example shown, the carriage has an integrated mechanism 900 that provides one or more of cleaning, tubing, and protecting the rail and/or carriage.

According to various embodiments, integrated mechanism 900 comprises one or more of a side skirt 910, a side skirt 920, a set of one or more wipers 940, and/or a set of one or more lubrication ports (e.g., lubrication port 950).

In some embodiments, side skirt 910 and/or side skirt 920 is coupled to the carriage. In the example shown, side skirt 910 is magnetically mounted to the carriage via magnet 930. The magnetic mounting allows for easy access for maintenance.

In some embodiments, the set of one or more wipers 940 is used to remove dirt and particulate matter from the rails. As the carriage traverses the rails, the set of one or more wipers 940 wipe/remove any such dirt or particulate matter that has accumulated on the rails.

In some embodiments, the set of one or more lubrication ports (e.g., lubrication port 950) is configured to channel lubrication from an opening (at which lubrication is introduced to the system) to a surface of the rails. The lubrication port allows for easy maintenance of the rails via an efficient mechanism for providing lubricant to the interface between the rails and the carriage.

Figure 10:
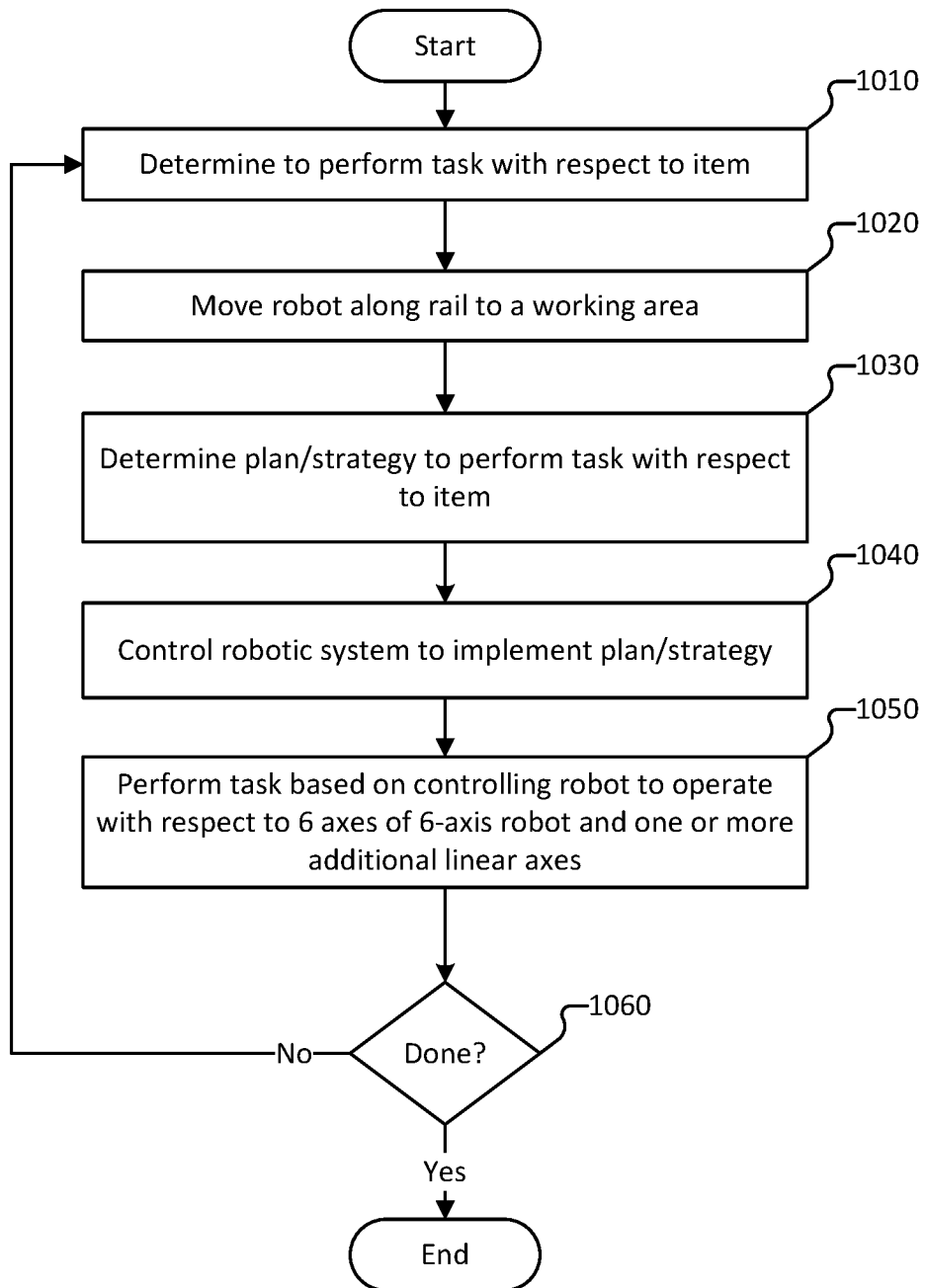
FIG. 10 is a flow diagram of a method for controlling an n-axis robot to move within one or more additional axes in connection with performing a task with respect to an item.

FIG. 10 is a flow diagram of a method for controlling an n-axis robot to move within one or more additional axes in connection with performing a task with respect to an item.

At 1010, a determination to perform a task with respect to an item is made. The system determines to perform the task in connection with performing one or more of singulation operations, kitting operations, and palletizing/depalletizing operations. As an example, the system uses image data of the workspace (or image data of a working area within the workspace at which the robot is to perform the task) to characterize the item (e.g., determine one or more attributes of the item) and/or uses the image data/attributes of the item to select an item with respect to which the operation is to be performed.

At 1020, a robot is moved along a rail to a working area. In response to determining that the system is to perform a task with respect to an item, the system (e.g., a control computer) controls to move the robot (or a carriage on which the robot is mounted) along a rail to the working area. In some embodiments, the system coarsely/broadly determines the location at which (e.g., the location can correspond to the determined working area) the robot is to move based at least in part on the determination to perform the task with respect to the item. As an example, the system controls a powertrain comprised in, or mounted on, the carriage to cause the carriage/robot to move along the rail. The system controls to control the powertrain can be integrated with the controls for the system to control the robot (e.g., the robotic arm used to grasp, move, and place items). For example, to control the powertrain can be integrated with the controls for the system to control the robot in a manner that enables the robotic system to use the rail as an additional axis for the robot (e.g., an additional degree of freedom of the robot) when the system is controlling the robot to perform the task.

In some embodiments, the system comprises a set of drivers and/or application programming interfaces (APIs) with respect to each of the n-axes for the n-axis robot. The system further comprises a set of drivers and/or application programming interfaces (APIs) for the one or more additional axes. Accordingly, the system can use the corresponding driver to control the robot to operate with respect to a particular axis. In some embodiments, the set of drivers includes a driver(s) for one or more motors to be controlled to operate the robot with respect to the corresponding axis (e.g., one of the n-axes of the n-axis robot or one of the additional axes). For example, the system comprises a driver to control the motor comprised in the powertrain assembly used to move the robot along the rail.

At 1030, a plan and/or strategy to perform the task with respect to the item is made. The system determines the plan or strategy to perform the task with respect to the item. The system determines the plan/strategy based at least in part on image data from a vision system (e.g., image data for the workspace such as obtained by sensors within or around the workspace and/or sensors or cameras mounted to the robot or carriage).

According to various embodiments, the system dynamically controls the robot use one or more additional axes (e.g., axes in addition to the n-axis of the robot) in connection with implementing a task (e.g., grasping, moving, placing an item, etc.). The system determines the plan or strategy based at least in part on (i) the n-axes corresponding to the robot, and (ii) one or more additional axes. In addition, the system determines the strategy based at least in part on the image data corresponding to the workspace, such as using the presence of other robots, items, or other obstacles in connection with planning a trajectory of the item or end effector (e.g., a space within the working area that is occupied by part of the robotic arm, etc.). For example, the model for determining a plan/strategy includes the possibility of the robot moving with respect to the one or more additional axes (e.g., the solution space includes locations or configurations that are made possible and/or are deemed efficient in view of movement of the robot in the one or more additional axes). In the example robotic system comprising a rail on which the robot is carried (e.g., mounted to a carriage disposed on the rail), the one or more additional axes includes a dimension (e.g., a 7th axis) defined based on rail. The system can control to translate the robot along the direction defined by rail. According to various embodiments, the system determines the strategy for implementing a task with respect to an item at least in part by taking into consideration the n axes of the robot and one or more additional axes (e.g. use the one or more additional axes while the item is grasped by the robot, or otherwise after the system has moved the robot to a coarsely defined working area at which the task is to be performed). The strategy includes a set of one or more commands to maneuver the robot with respect to at least a subset of the n axes of the robot and the one or more additional axes to perform the task with respect to the item.

In some embodiments, the system determines the strategy for implementing a task with respect to an item based at least in part on the one or more additional axes. For example, the system extends the solution space for movement of a robot while implementing a task with respect to an item to include movement along a rail to which the robot is operatively mounted.

At 1040, a robotic system is controlled to implement the plan and/or strategy.

In connection with implementing the strategy to perform the task, the system can cause the robot to move along the dimension defined by the rail (e.g., the carriage on which the corresponding robot is mounted traverses the rail) as the task is being implemented. As an example, the robot is moved along the direction defined by the rail while an item is grasped to move the item along a path/trajectory (e.g., a path or trajectory that may have been not possible or otherwise inefficient if the robot was not moved).

At 1050, the task is performed based on controlling the robot to operate with respect to 6 axes of 6-axis robot and one or more additional linear axes. In some embodiments, in response to moving the robot to the working area, the system performs the task based at least in part on controlling robot to operate with respect to (i) a first axis corresponding to a rotation of the robot around a base, (ii) a second axis corresponding to movement of a lower arm of the robot in a forward and backward direction, (iii) a third axis corresponding to movement to raise an upper arm of the robot, (iv) a fourth axis corresponding to rotation of the upper arm of the robot, (v) a fifth axis corresponding to a movement to raise a wrist of the robot, (vi) a sixth axis corresponding to rotation of the wrist of the robot, and (vii) one or more additional linear axes. In some embodiments, axes corresponding to (i)-(vii) correspond to degrees of freedom of the robot. The system controls the robot to move to a working area and then controls the robot according to such degrees of freedom to perform the task (e.g., with respect to the item). As an example, the system controls the robot (and powertrain mounted on the carriage) to perform the task. As another example, the powertrain mounted on the carriage is deemed a degree of freedom of robot to in connection with determining a plan to perform a task when a robot is moved to a particular workspace.

At 1060, a determination is made as to whether process 1000 is complete. In some embodiments, process 1000 is determined to be complete in response to a determination that the task has been performed with respect to the item, no further tasks are to be performed with respect to other items, an administrator indicates that process 1000 is to be paused or stopped, etc. In response to a determination that process 1000 is complete, process 1000 ends. In response to a determination that process 1000 is not complete, process 1000 returns to 1010.

Figure 11:
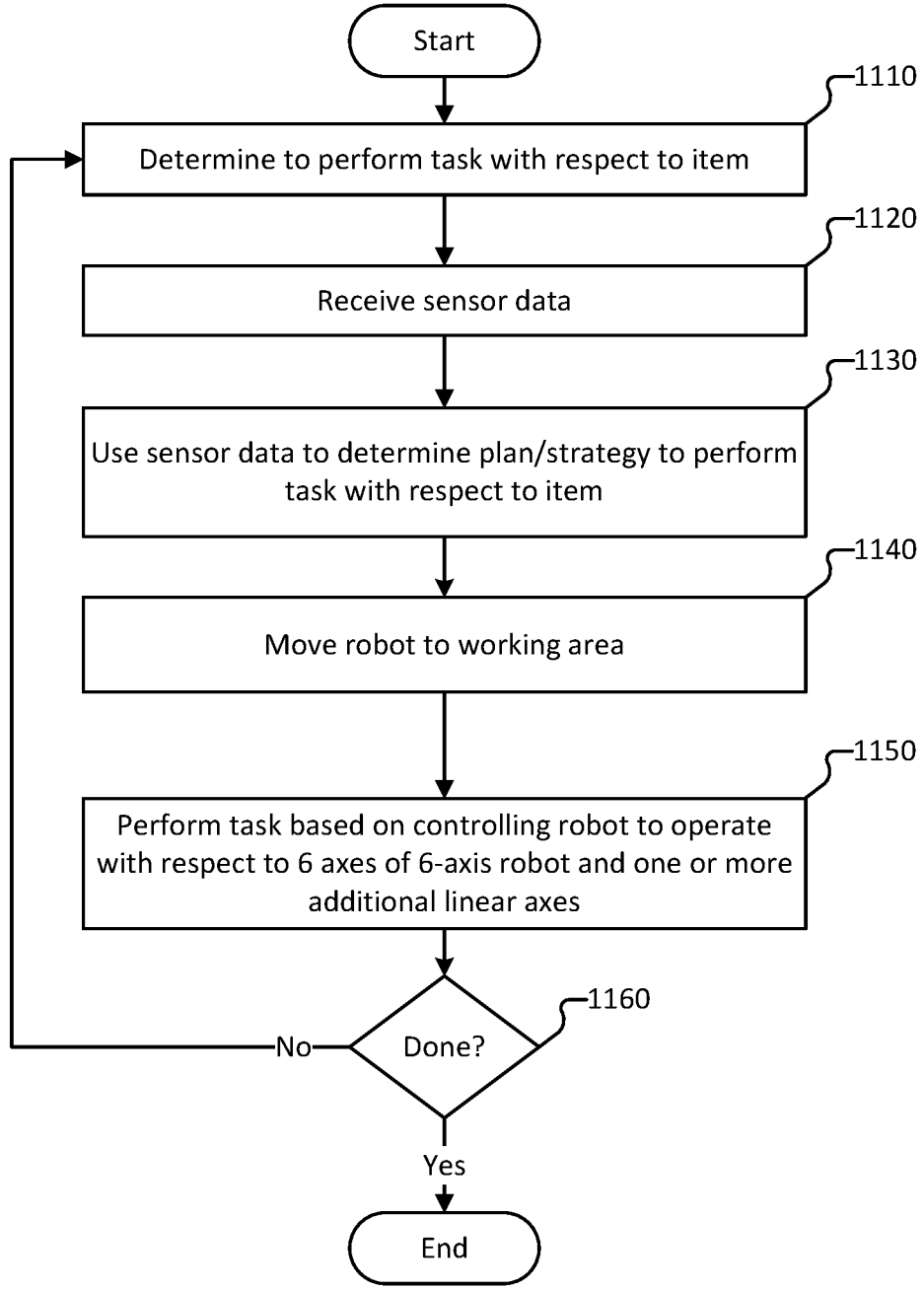
FIG. 11 is a flow diagram of a method for controlling an n-axis robot to move within one or more additional axes in connection with performing a task with respect to an item.

FIG. 11 is a flow diagram of a method for controlling an n-axis robot to move within one or more additional axes in connection with performing a task with respect to an item.

At 1110, a determination to perform a task with respect to an item is made. The system determines to perform the task in connection with performing one or more of singulation operations, kitting operations, and palletizing/depalletizing operations. As an example, the system uses image data of the workspace (or image data of a working area within the workspace at which the robot is to perform the task) to characterize the item (e.g., determine one or more attributes of the item) and/or uses the image data/attributes of the item to select an item with respect to which the operation is to be performed.

At 1120, sensor data is received. The system receives sensor data from one or more sensors and/or cameras within the workspace. For example, the system receives sensor data from one or more sensors/cameras mounted on a robot (e.g., mounted to a superstructure that is mounted to the carriage, etc.). The system can determine a model of the workspace (or working area at which a robot is to be dynamically located during performance of the task).

At 1130, the sensor data is used to determine a plan and/or a strategy to perform the task with respect to the item. In some embodiments, the system determines a strategy to perform the task. Determining the strategy can include determining a trajectory along which the item is to be moved through the workspace (e.g., a working area within the workspace at which the robot is to be operated to perform the task). 1130 can correspond to, or be similar to, 1030 of process 1000 of FIG. 10. The strategy to perform the task can include a set of commands to move the robot to a working area identified as a location at which the robot is to be dynamically located while performing the task. The working area can be in proximity to the item (e.g., such that the robot is within the range the item to be able to engage the item, etc.).

At 1140, a robot is moved along a rail to a working area. 1140 can correspond to, or be similar to, 1020 of process 1000 of FIG. 10.

At 1150, the task is performed based on controlling the robot to operate with respect to 6 axes of 6-axis robot and one or more additional linear axes. In some embodiments, in response to moving the robot to the working area, the system performs the task based at least in part on controlling robot to operate with respect to (i) a first axis corresponding to a rotation of the robot around a base, (ii) a second axis corresponding to movement of a lower arm of the robot in a forward and backward direction, (iii) a third axis corresponding to movement to raise an upper arm of the robot, (iv) a fourth axis corresponding to rotation of the upper arm of the robot, (v) a fifth axis corresponding to a movement to raise a wrist of the robot, (vi) a sixth axis corresponding to rotation of the wrist of the robot, and (vii) one or more additional linear axes. In some embodiments, axes corresponding to (i)-(vii) correspond to degrees of freedom of the robot. The system controls the robot to move to a working area and then controls the robot according to such degrees of freedom to perform the task (e.g., with respect to the item).

In some embodiments, 1160 and 1170 are performed contemporaneously. For example, the robotic system is controlled to move the robot along the one or more additional axes while the task is being performed.

At 1160, a determination is made as to whether process 1100 is complete. In some embodiments, process 1100 is determined to be complete in response to a determination that the task has been performed with respect to the item, no further tasks are to be performed with respect to other items, an administrator indicates that process 1100 is to be paused or stopped, etc. In response to a determination that process 1100 is complete, process 1100 ends. In response to a determination that process 1100 is not complete, process 1100 returns to 1110.

Figure 12:
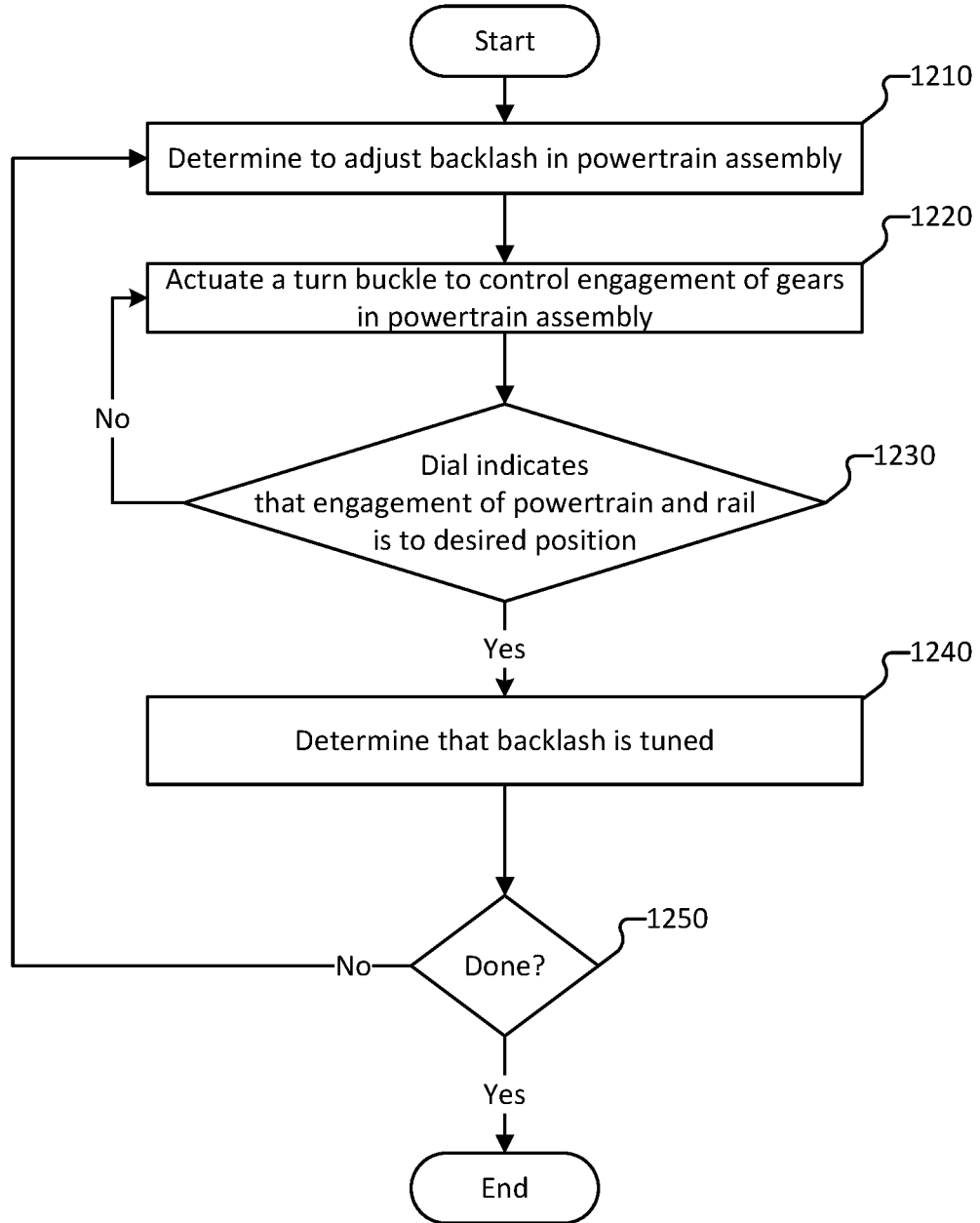
FIG. 12 is a flow diagram of a method for adjusting a backlash in a powertrain assembly according to various embodiments.

FIG. 12 is a flow diagram of a method for adjusting a backlash in a powertrain assembly according to various embodiments.

At 1210, a determination is made to adjust a backlash in a powertrain assembly. The determination can be made based on measured forces generated during operation of the robot in the system or a measure of a backlash to which the robot is subject. In some embodiments, the determination to adjust the backlash is made during installation or calibration of the system.

At 1220, a turnbuckle is actuated to control engagement of gears in the powertrain assembly. The turnbuckles can be actuated manually by a user. In some embodiments, actuation of the turnbuckle is controlled by a control computer. For example, the system can automatically calibrate the system to adjust backlash experienced in the system based on data obtained by one or more sensors (e.g., a force sensor, etc. coupled to the robot or otherwise within the workspace). In some embodiments, in response to determining that the measured backlash or other forces exceeds a threshold, the system automatically calibrates the system (e.g., the system automatically actuates the turnbuckle to control the engagement of the gears). In some embodiments, in response to determining a speed with which the carriage traverses the rail is less than a predefined speed threshold, or that friction caused during traversal along the rail exceeds a predefined friction threshold, the system determines to actuate the turnbuckle such as to decrease the engagement of the gears, etc.

At 1230, a determination is made as to whether a dial indicates that engagement of the powertrain and the rail is in a desired position. In some embodiments, the determination of whether the dial indicates that the powertrain and the gear rack are in a desired relative position is made manually by a user, such as by visible inspection, etc. In some embodiments, the determination of whether the dial indicates that the powertrain and the gear rack are in a desired relative position is made automatically by the system, such as based at least in part on data obtained by the sensors (e.g., the system determines whether the carriage and robot are operating within predefined thresholds, such as thresholds corresponding to a backlash or other force to which the robot is subject).

In response to a determination that the dial does not indicates that engagement of the powertrain and the rail is not in a desired position at 1230, process 1200 returns to 1220 at which the turnbuckle is actuated. Process 1200 iterates over 1220 and 1230 until the powertrain and rail are in the desired position. For example, 1220 and 1230 are performed until a desired engagement between the gears in the powertrain assembly is attained.

In response to a determination that the dial indicates that engagement of the powertrain and the rail is in the desired position at 1230, process 1200 proceeds to 1240 at which a determination is made that the backlash is tuned. For example, the tuning of the engagement between the gears improves the backlash (e.g., reduces or attenuates the backlash) caused by forces generated while moving and/or operating the powertrain and/or a robot mounted on a carriage that is driven by the powertrain. In some embodiments, the tuning of the engagement between the gears allows the robotic system to move at relatively higher speeds and relatively faster accelerations.

At 1250, a determination is made as to whether process 1100 is complete. In some embodiments, process 1200 is determined to be complete in response to a determination that the backlash has been tuned to a desired level, that no further adjustment to the backlash is needed or desired, an administrator indicates that process 1200 is to be paused or stopped, etc. In response to a determination that process 1200 is complete, process 1200 ends. In response to a determination that process 1200 is not complete, process 1200 returns to 1210.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic control system, comprising
a memory configured to store a model of a robot having a plurality of axes of control including at least a first linear axis and one or more rotational axes, wherein the model is used to determine a solution space for controlling the robot that includes a possibility of the robot moving with respect to the first linear axis and the one or more rotational axes; and
one or more processors coupled to the memory and configured to:
determine to perform a task, the task including a pick/place operation with respect to an item in a robot workspace;
move the robot along the first linear axis to a first location that is within proximity of an item in the robot workspace, wherein:
the solution space for moving the robot comprises a set of solutions for controlling the robot when the robot is in proximity to the item; and
the solution space includes (i) a first set of solutions enabled by controlling the robot to perform the task at the first location by moving with respect to one or more rotational axes without further movement with respect to the first linear axis, and (ii) a second set of solutions enabled by controlling the robot to perform the task at the first location by moving with respect to one or more rotational axes and the first linear axis;

select a selected solution from the solution space; and
control the robot to perform the task according to the selected solution.

2. The robotic control system of claim 1, wherein the first linear axis includes a linear axis corresponding to a rail or other linear conveyance on which the robot is mounted.

3. The robotic control system of claim 1, wherein the selected solution includes controlling the robot to move an end effector of the robot to a particular location.

4. The robotic control system of claim 1, wherein:
the solution space includes (i) the first set of solutions enabled by controlling the robot to move with respect to one or more rotational axes without movement with respect to the first linear axis to perform the task, and (ii) the second set of solutions enabled by controlling the robot to move with respect to one or more rotational axes and the first linear axis to perform the task; and
the selected solution is selected from the second set of solutions in response to a determination that the selected solution has a lower cost to move an end effector to a particular location than a solution in the first set of solutions according to which the end effector is moved to the particular location.

5. The robotic control system of claim 1, wherein the selected solution is selected based at least in part on a predefined cost function.

6. The robotic control system of claim 1, wherein the selected solution is selected from among a plurality of solutions comprised in the solution space based at least in part on a predefined cost function.

7. The robotic control system of claim 1, wherein the one or more processors are further configured to:
receive data indicating the task;
obtain sensor data; and
use the sensor data to:
determine, based at least in part on the model, the solution space for controlling the robot to perform the task; and
determine a strategy to perform the task in accordance with the selected solution.

8. The robotic control system of claim 7, wherein the strategy to perform the task is determined based at least in part on a cost function with respect to movement or orientations of the robot.

9. The robotic control system of claim 8, wherein the cost function indicates a higher cost for the robot to perform the task using a set of predefined orientations of a robotic arm of the robot.

10. The robotic control system of claim 8, wherein:
the cost function indicates a higher cost for using a predefined awkward pose of a robotic arm of the robot; and
the predefined awkward pose corresponds to an orientation of the robotic arm that does not satisfy an efficiency threshold or a cost threshold.

11. The robotic control system of claim 7, wherein the strategy to perform the task is determined based at least in part on a cost function with respect to a speed or efficiency to perform the task according to various combinations of movement along the first linear axis and the one or more rotational axes.

12. The robotic control system of claim 11, wherein the strategy to perform the task is determined based on a minimum success threshold indicating a likelihood that the performing the task in accordance with a particular strategy is expected to be successful.

13. The robotic system of claim 1, wherein the robot is a 6-axis robot.

14. The robotic system of claim 13, wherein the 6-axis robot is configured to operate within a 7th-axis corresponding to the first linear axis.

15. The system of claim 1, wherein:
the solution in the first set of solutions according to which the end effector is moved to the particular location includes orienting the robot in an awkward pose in connection with performing the task;
the selected solution includes moving the robot along the first linear axis in a manner that enables the robot to move an end effector to a particular location while avoiding orienting the robot in the awkward pose; and
the awkward pose corresponds to an orientation of the robot that does not satisfy an efficiency threshold or a cost threshold.

16. The robotic system of claim 1, wherein: the first set of solutions includes solutions enabled controlling the robot to initially move the robot along the first linear axis and to subsequently move the robot with respect to one or more rotational axes without simultaneous movement with respect to the first linear axis.

17. The robot of claim 1, wherein the one or more processors are further configured to:
receive data indicating the task;
obtain sensor data; and
use the sensor data to:
determine, based at least in part on the model, the solution space for controlling the robot to perform the task; and
determine a strategy to perform the task in accordance with the selected solution.

18. The robot of claim 17, wherein the strategy to perform the task is determined based at least in part on a cost function with respect to movement or orientations of the robot.

19. A robot comprising:
a plurality of motors each associated with a corresponding one of a plurality of axes of control of the robot, the axes of control including at least a linear axis and one or more rotational axes;
a plurality of motor controllers each associated with one of the motors;
a communication interface; and
one or more processors coupled to the motor controllers and the communication interface, the one or more processors being configured to receive via the communication interface a set of control signals to cause the robot to move in a specific manner with respect to each of two or more of said axes of control to perform a task based at least in part on a solution space associated with different solutions for performing the task, including at least the linear axis, and to send commands to corresponding ones of the motor controllers to control the motors to cause the robot to move in the specific manner,
wherein:
the task includes performing a pick/place operation with respect to an item in a robot workspace;
the linear axis includes a first linear axis corresponding to a rail or other linear conveyance on which the robot is mounted;
the one or more processors are further configured to:
move the robot along the linear axis to a first location that is within proximity of an item in the robot workspace; and
control the robot to perform the task according to a selected solution that is selected from a solution space, the solution space being determined based on a model of possible movements of the robot with respect to the linear axis and the one or more rotational axes;

the solution space for moving the robot comprises a set of solutions for controlling the robot when the robot is in proximity to the item; and the solution space includes (i) a first set of solutions enabled by controlling the robot to perform the task at the first location by moving with respect to one or more rotational axes without further movement with respect to the first linear axis, and (ii) a second set of solutions enabled by controlling the robot to perform the task at the first location by moving with respect to one or more rotational axes and the first linear axis.

20. The robot of claim 19, wherein the selected solution is selected based at least in part on a predefined cost function.

* * * * *